United States Patent [19]

Granger

[11] Patent Number: 4,916,545

[45] Date of Patent: Apr. 10, 1990

[54] ELECTRONIC GRAPHIC ARTS SCREENER THAT SUPPRESSES MOIRE PATTERNS USING PSEUDO-RANDOM FONT SELECTION

[75] Inventor: Edward M. Granger, Rochester, N.Y.

[73] Assignee: Eastman Kodak Company, Rochester, N.Y.

[21] Appl. No.: 272,592

[22] Filed: Nov. 16, 1988

[51] Int. Cl.[4] .............................................. H04N 1/40
[52] U.S. Cl. ...................................... 358/456; 358/78
[58] Field of Search ...................... 358/283, 280, 75, 78

[56] References Cited

U.S. PATENT DOCUMENTS

| | | | |
|---|---|---|---|
| 3,688,033 | 8/1972 | Hell et al. | 178/15 |
| 3,806,641 | 4/1974 | Crooks | 358/283 |
| 3,916,096 | 10/1975 | Everett et al. | 358/283 |
| 3,922,484 | 11/1975 | Keller | 358/283 |
| 3,997,911 | 12/1976 | Perriman et al. | 358/75 |
| 4,012,584 | 3/1977 | Gascoigne | 358/302 |
| 4,051,536 | 9/1977 | Roetling | 358/298 |
| 4,084,183 | 4/1978 | Keller et al. | 358/75 |
| 4,149,194 | 4/1979 | Holladay | 358/283 |
| 4,185,304 | 1/1980 | Holladay | 358/298 |

(List continued on next page.)

OTHER PUBLICATIONS

P. G. Roetling et al, "Tone Reproduction and Screen Design for Pictorial Electrographic Printing", Journal of Applied Photographic Engineering, Fall 1979, vol. 5, No. 4, pp. 179–182.

P. G. Roetling, "Analysis of Detail and Spurious Signals in Halftone Images", Journal of Applied Photographic Engineering, Winter 1977, vol. 3, No. 1, pp. 12–17.

P. G. Roetling, "Binary Approximation of Continuous Tone Images", Photographic Science and Engineering, Apr. 1977, vol. 21, No. 2, pp. 60–65.

P. G. Roetling, "Halftone Method with Edge Enhancement and Moire Suppression", Journal of the Optical Society of America, Oct. 1976, vol. 66, No. 10, pp. 985–989.

T. M. Holladay, "An Optimum Algorithm for Halftone Generation for Displays and Hard Copies", SID Digest, 1979, pp. 102–103.

D. Kermisch et al, "Fourier Spectrum of Halftone Images", Journal of the Optical Society of America, Jun. 1975, vol. 65, No. 6, pp. 716–723.

Primary Examiner—Howard W. Britton
Attorney, Agent, or Firm—Dennis R. Arndt

[57] ABSTRACT

Apparatus for a digital screener (30) and methods for use therein are disclosed for producing relatively smooth halftone dots at substantially any arbitrary screen angle and for suppressing a substantial source of screener induced Moire patterns that would otherwise appear in a reproduced color image generated by a raster based marking engine (20). Specifically, relatively smooth dots are generated and this Moire is suppressed by randomly varying the dot fonts that are used to write successive halftone dots in the screened image. A pseudo-random value is used to select one of a number, illustratively sixteen, of available halftone dot fonts. Each dot font can take on nearly any pattern (shape) as long as it is somewhat different from that of the other fonts, provided the patterns of all the dot fonts are relatively smooth, apart from normal dot boundary irregularities due to quantization. Once a particular font is chosen to produce any halftone dot in the screened image, no random variations are added to the font pattern. The random variation inherent in the selection of any particular dot font coupled with the dissimilarity among the patterns for the individual dot fonts, for any given contone value, substantially suppresses Moire patterns that might otherwise appear in the screened image. Moreover, writing a selected dot font without imparting any random variations to the shape of the font itself avoids any excessively jagged halftone dot edges other than dot boundary irregularities which normally occur from quantization. The use of sheared halftone dot fonts and a halftone dot font selection process that relies on constrained randomization are also disclosed herein.

21 Claims, 26 Drawing Sheets

U.S. PATENT DOCUMENTS

| | | | |
|---|---|---|---|
| 4,193,096 | 3/1980 | Stoffel | 358/260 |
| 4,203,154 | 5/1980 | Lampson et al. | 364/200 |
| 4,214,277 | 7/1980 | Urich | 358/283 |
| 4,245,258 | 1/1981 | Holladay | 358/282 |
| 4,246,614 | 1/1981 | Knox | 358/283 |
| 4,281,312 | 7/1981 | Knudson | 340/146.3 |
| 4,350,996 | 9/1982 | Rosenfeld | 358/75 |
| 4,419,690 | 12/1983 | Hammes | 358/75 |
| 4,447,831 | 5/1984 | Adsett | 358/283 |
| 4,449,150 | 5/1984 | Kato | 358/283 |
| 4,456,924 | 6/1984 | Rosenfeld | 358/75 |
| 4,493,049 | 1/1985 | Donohue et al. | 364/900 |
| 4,499,489 | 2/1985 | Gall et al. | 358/75 |
| 4,532,503 | 7/1985 | Pennebaker | 340/728 |
| 4,547,812 | 10/1985 | Waller et al. | 358/283 |
| 4,566,042 | 1/1986 | Cahill | 358/300 |
| 4,606,069 | 8/1986 | Johnsen | 382/56 |
| 4,633,327 | 12/1986 | Roetling | 358/283 |
| 4,647,962 | 3/1987 | Rosen et al. | 358/78 |
| 4,661,859 | 4/1987 | Mailloux et al. | 358/283 |
| 4,667,247 | 5/1987 | Karow | 358/280 |
| 4,692,879 | 9/1987 | Ikuta | 364/518 |
| 4,700,235 | 10/1987 | Gall | 358/283 |
| 4,717,954 | 1/1988 | Fujita et al. | 358/80 |
| 4,727,430 | 2/1988 | Miwa | 358/283 |
| 4,752,822 | 6/1988 | Kawamura | 358/80 |
| 4,821,109 | 4/1989 | Roe | 358/283 |
| 4,823,189 | 4/1989 | Haines | 358/283 |
| 4,827,352 | 5/1989 | Yoneda | 358/283 |

CIRCULAR HALFTONE DOT PATTERNS –
0° SCREEN ANGLE

CIRCULAR HALFTONE DOT PATTERNS –
15° SCREEN ANGLE

ELLIPTICAL HALFTONE DOT PATTERNS—
0° SCREEN ANGLE

MACRO PIXEL 235j
MICRO PIXEL 429
PRINTED HALFTONE DOT 423
MICRO RASTERS 240

ELLIPTICAL HALFTONE DOT PATTERNS—
15° SCREEN ANGLE 433  435
β = 15°

ELLIPTICAL HALFTONE DOT PATTERNS—
45° SCREEN ANGLE 453  455  MACRO PIXEL 235j
β = 45°

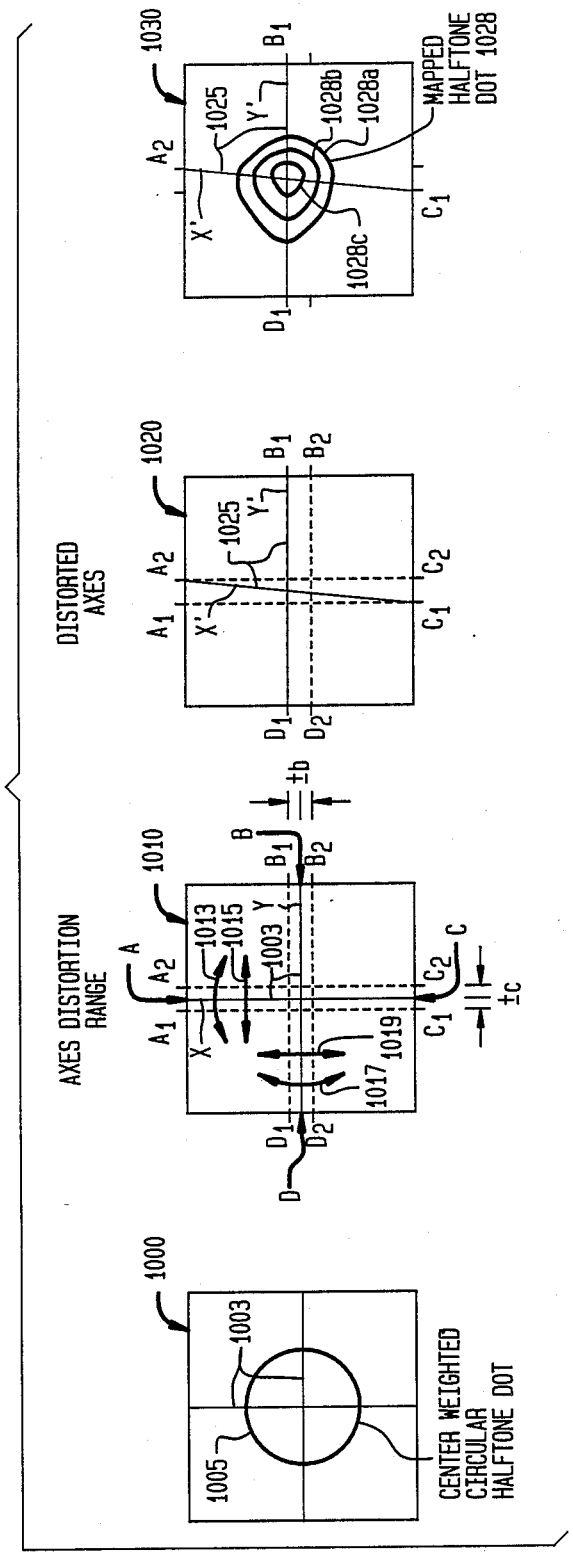

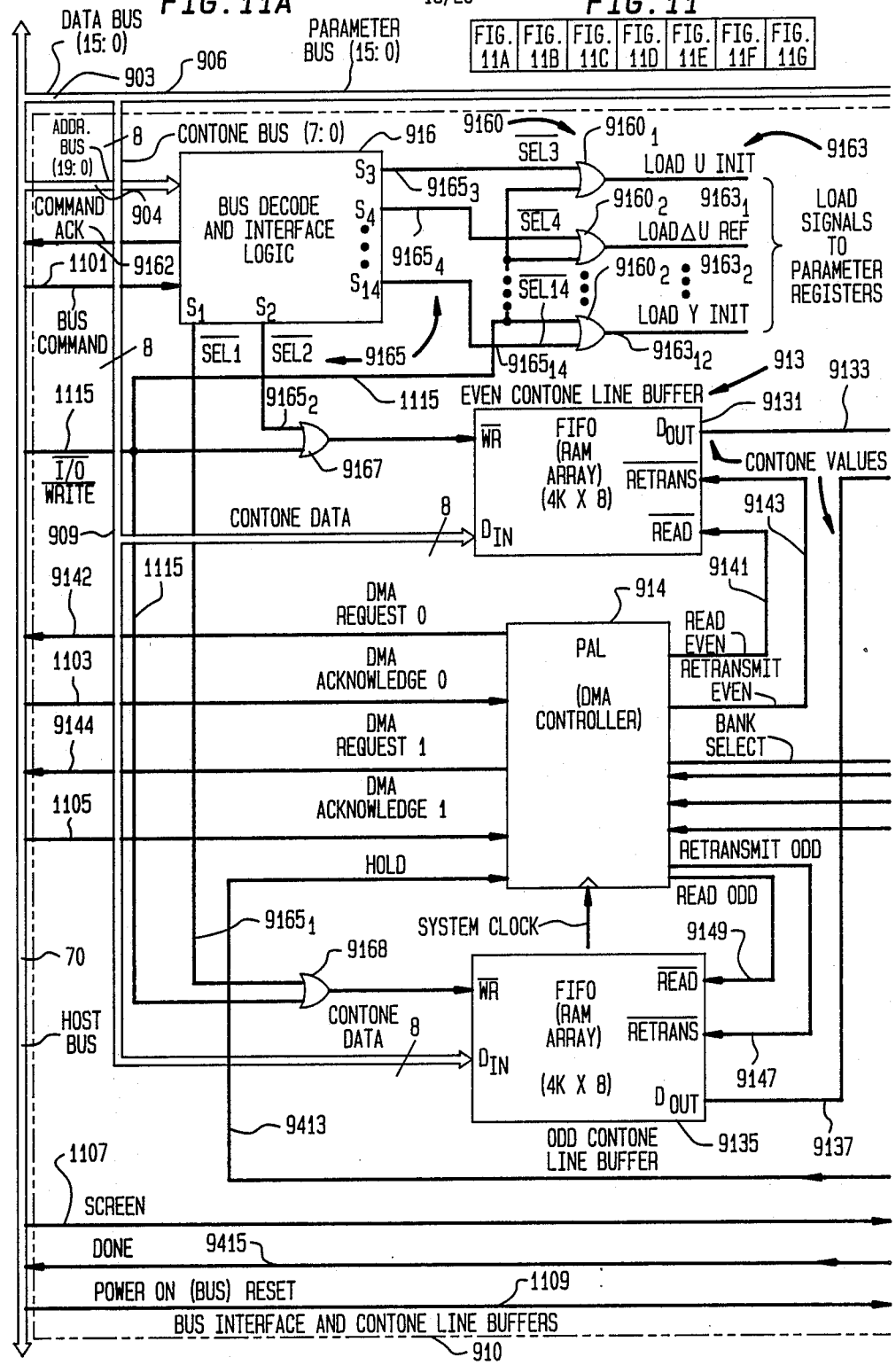

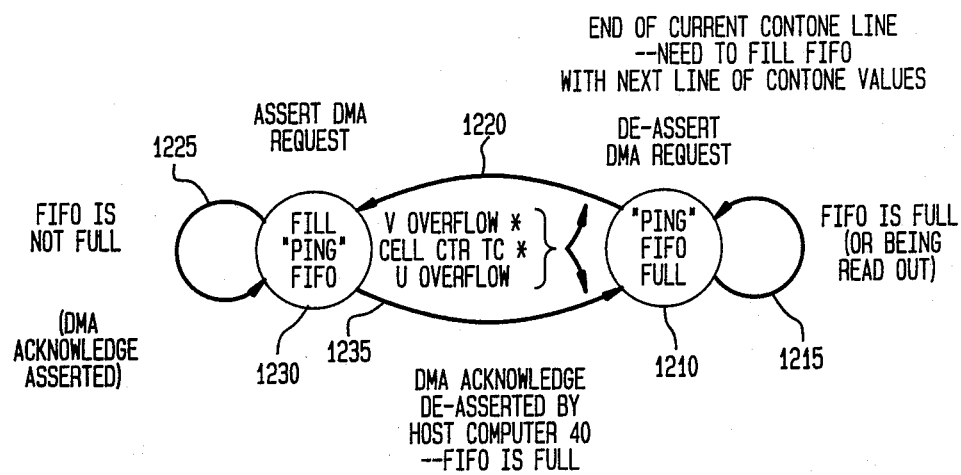
FIG. 12A — FIFO FILL OPERATION — DMA CONTROLLER PAL 914 STATE DIAGRAMS
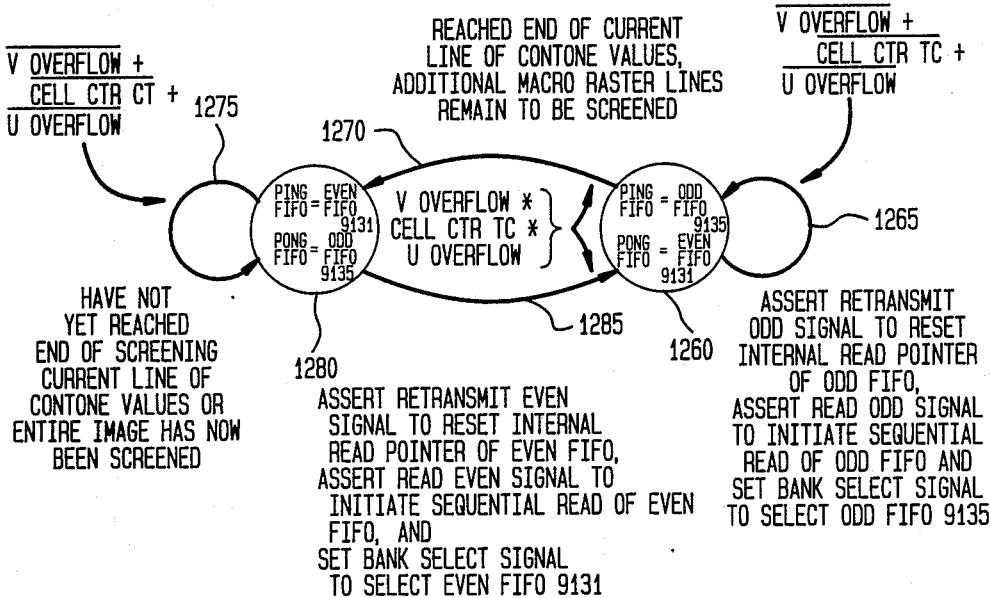
FIG. 12B — FIFO SWAP OPERATION (A) APPLY PULSES TO LOAD INPUTS
TO X START ADDER 9535 AND
Y START ADDER 9615 TO
SELECT PRIOR OUTPUT OF THESE ADDERS AS
INPUT (B) THERETO:

X $START_t \leftarrow X\ START_{t-1} + \Delta X$ SLOW

Y $START_t \leftarrow Y\ START_{t-1} + \Delta Y$ SLOW (B) GENERATE END OF LINE (EOL) EVENT (C) APPLY PULSES TO MUX SELECT
AND LOAD INPUTS TO V POSITION ADDER 9347,
X POSITION ADDER 9537 AND Y POSITION
ADDER 9617 TO SET CORRESPONDING
OUTPUTS TO INITIAL VALUES
FOR SAMPLING LINE FOR NEXT
MICRO RASTER:

V $POSITION_{t+2} \leftarrow V_{INIT} + \Delta V_{REF}$

X $POSITION_{t+2} \leftarrow X\ START_t + \Delta X$ FAST

Y $POSITION_{t+2} \leftarrow Y\ START_t + \Delta Y$ FAST

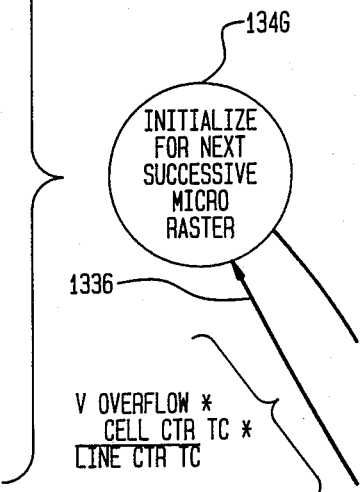

1346 INITIALIZE FOR NEXT SUCCESSIVE MICRO RASTER

1336

V OVERFLOW *
CELL CTR TC *
LINE CTR TC (SCREENING OF CURRENT
MICRO RASTER LINE IS COMPLETE,
ADDITIONAL MACRO RASTER LINES
REMAIN TO BE SCREENED)

| FIG. 13A | FIG. 13B |

GENERATE APPROPRIATE CONTROL
SIGNALS FROM HOST PROCESSOR
TO RESET SCREENER

SCREEN

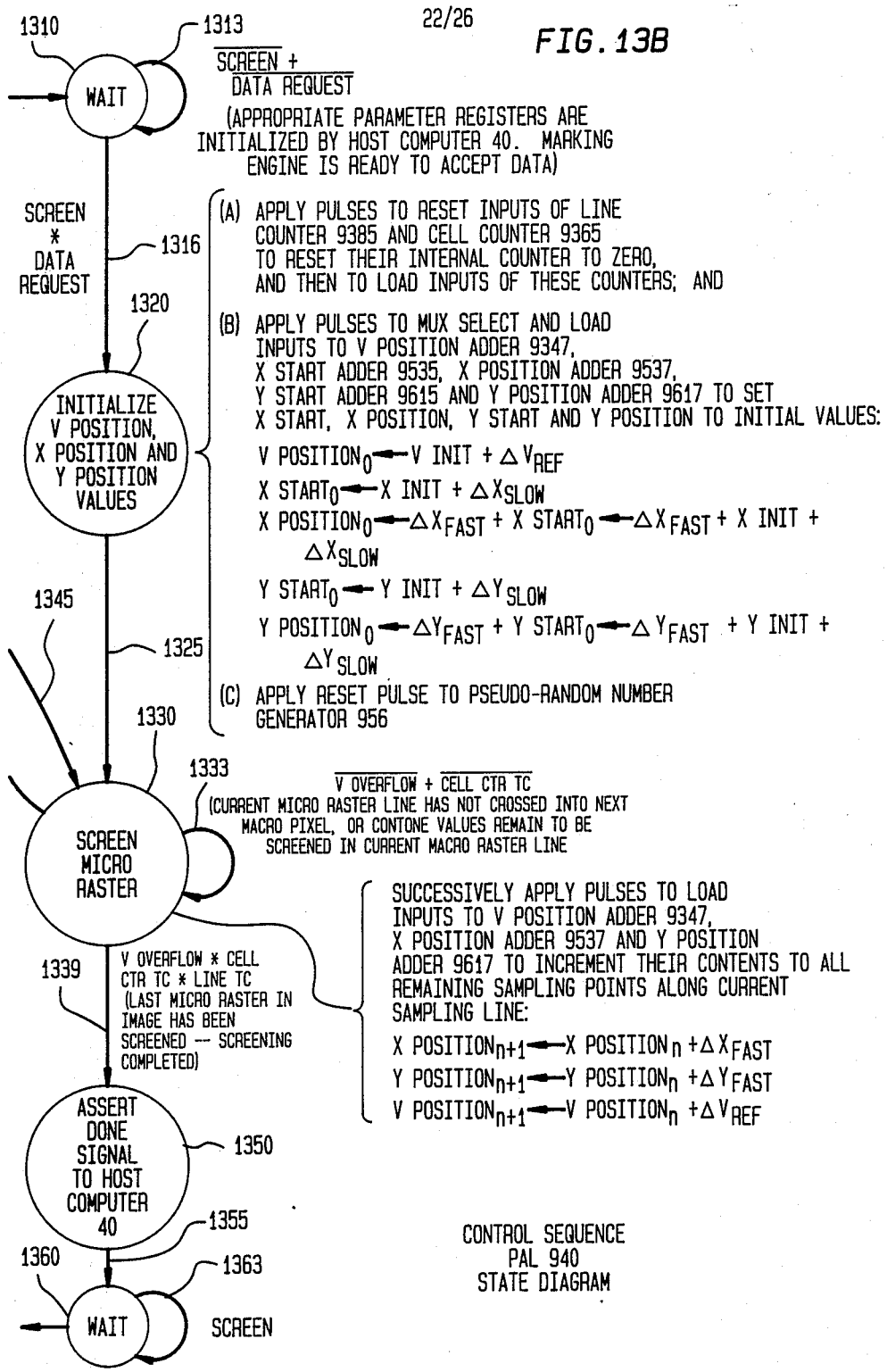

AXES DISTORTION DETERMINED THROUGH CONSTANT RANDOMIZATION

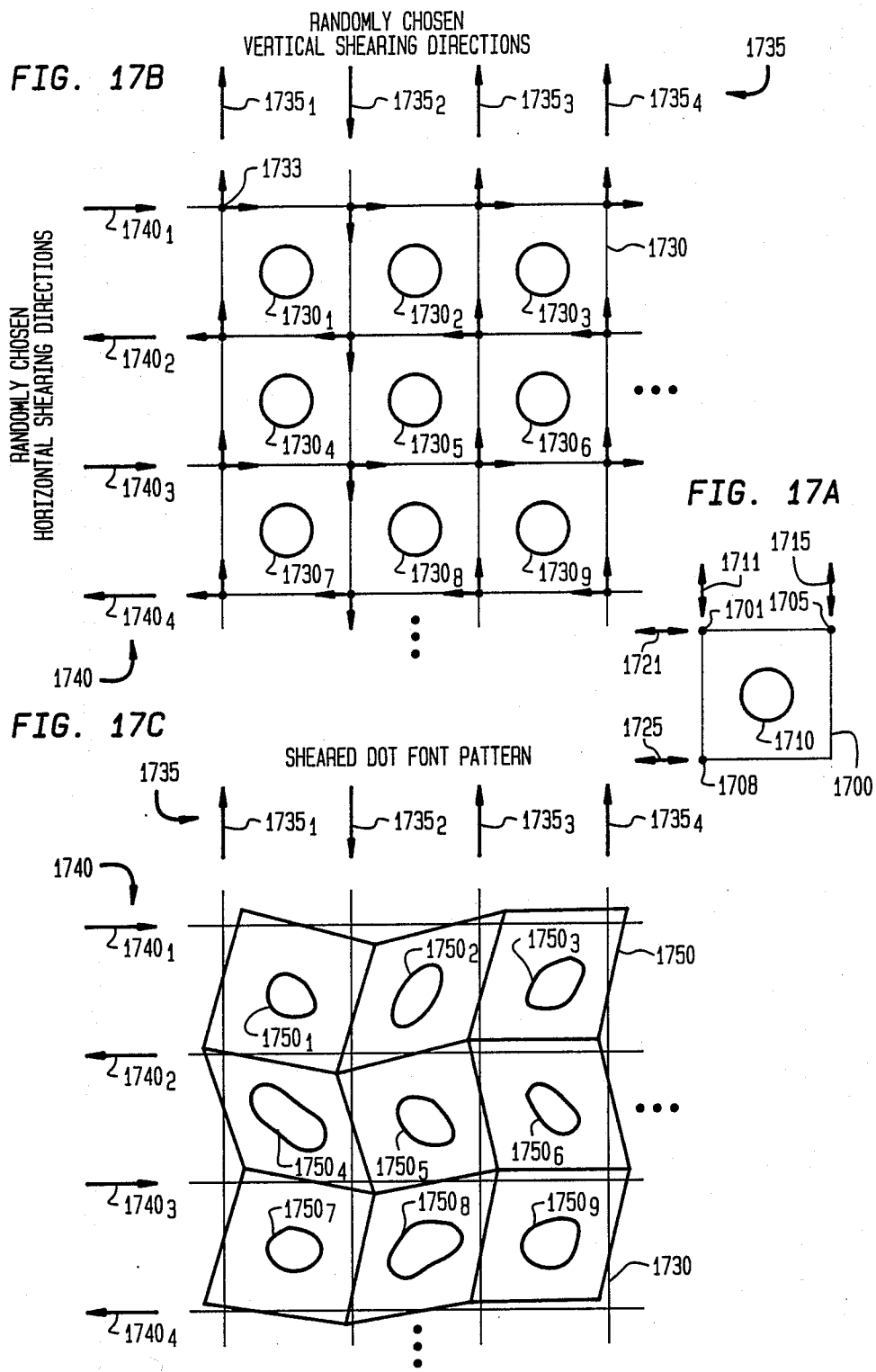

ELECTRONIC GRAPHIC ARTS SCREENER THAT SUPPRESSES MOIRE PATTERNS USING PSEUDO-RANDOM FONT SELECTION

CROSS REFERENCE TO RELATED APPLICATIONS

This application describes and claims subject matter that is also described in two co-pending United States patent applications from applicants E. M. Granger et al entitled: "ELECTRONIC GRAPHIC ARTS SCREENER" that has been filed simultaneously herewith and assigned Ser. No. 07/272,568 and "APPARATUS FOR ADDRESSING A FONT TO SUPPRESS MOIRE PATTERNS OCCURRING THEREBY AND A METHOD FOR USE THEREIN" that has also been filed simultaneously herewith and assigned Ser. No. 07/272,591.

TECHNICAL FIELD OF THE INVENTION

The invention relates to electronic processing of color images for use in graphics arts applications, and specifically to a digital screener that operates at substantially any arbitrary screen angle and more specifically to apparatus and to an accompanying method for use in such a screener that produces relatively smooth halftone dots and suppresses a substantial source of screener induced Moire patterns that would otherwise appear in a reproduced color image.

BACKGROUND ART

Graphic arts applications frequently require the accurate reproduction of a high resolution color image (i.e. an artwork), such as a photograph, a color drawing, a color layout and the like. A typical application might involve printing a high resolution color image on a page of a periodical, such as a magazine, or a corporate annual report.

Color images are oftentimes generated either photographically, on suitable film, or electronically, on video tape or other suitable electronic media. When generated, these images share a basic characteristic: they are recorded on a continuous tone (hereinafter referred to as "contone") basis. As such, the color existing at any point in the image is recorded by an amplitude value, either exposure in the case of film or a voltage level in the case of electronic media.

Color reproduction equipment takes advantage of the principle that any color can be separated into a specific linear combination of four primary subtrative colors (cyan, yellow, magenta and black—CYMB) in which the amount of each primary color is set to a predetermined amount. In the case of printed reproductions of an image, use of primary color printing obviates the need to use a differently colored ink for each different color in the image. As such, each image is converted into a succession of three or four color separations, in which each separation is essentially a negative (or positive) transparency with an altered tone reproducing characteristic that carries the color information for only one of the primary colors. A separation is frequently made by photographing or electronically scanning an artwork through an appropriately colored filter. If, illustratively, a digital scanner is used, then each resulting contone value is frequently an eight binary bit number that represents the relative intensity of a corresponding primary color between a range of "0" (no intensity) to "255" (full intensity). A set or file of corresponding contone values would then exist for each separation.

Unfortunately, modern printing presses do not possess the capability of applying differential amounts of ink to any location in an image. Rather, these presses are only designed to either apply or not apply a single amount of ink to any given location. Therefore, a printing press is unable to directly print a contone separation. To successfully circumvent this problem, halftone separations are used instead. An image formed from halftone separations encodes the color information inherent in a color image from amplitude modulated form into a spatial (area) modulated form, in terms of dot size, which is subsequently converted by the human eye into a desired color. Specifically, it has been known in the art for quite some time that, for black and white images, a number of small black dots of a corresponding size, when printed over an area and later viewed at a distance, will be spatially integrated by a human eye into an intermediate shade of grey. The size of the dot can be varied from 100%, i.e. a full dot, through 50%, a half dot, to 0% (at which no dot is printed) to yield the color black, gray or white. Hence, by smoothly changing dot sizes (areas), smooth corresponding tonal variations will be generated in the reproduced image. Given this, the art has taught for some time that a full color image can be formed by properly overlaying single color halftone reproductions for all of the primary subtractive colors, where each reproduction is formed from a halftone dot separation that contains dots of appropriate sizes and in one of these primary colors. Clearly, as size of the dots decreases, an increasing amount of detail can be encoded in a dot pattern and hence in the reproduced image. For that reason, in graphic arts applications, a halftone separation utilizes very small dots to yield a dot pitch (resolution) ranging from 85 to as much as 200 dots/inch (approximately 33 to 79 dots/centimeter).

With this in mind, one would at first blush think that printing a color image for graphic arts use should be a fairly simple process. Specifically, a color image could first be converted into corresponding continuous tone separations. Each of these contone separations could then be converted into a corresponding half tone separation. A printing plate could then be manufactured from each halftone separation and subsequently be mounted to a printing press. Thereafter, paper or other similar media could be run through the press in such a fashion so as to produce properly registered superimposed halftone images for all the subtractive primary colors thereby generating a full color reproduction of the original image.

Unfortunately, in practice, accurately printing a color image is oftentimes a very tedious, problematic and time consuming manual process that requires a substantial level of skill. First, the process of converting a contone separation into a halftone separation, this process commonly being referred to as "screening", is a time consuming manual process in and of itself. Second, various phenomena, each of which disadvantageously degrades an image, often occur in a reproduced halftoned color image. Moreover, the complete extent to which each of these phenomena is present in the reproduced image is often known only at a rather late point in the printing process thereby necessitating the use of tedious and time consuming iterative trial and error experimentation to adequately eliminate these phenomena.

Screening is traditionally accomplished photographically. Where each color separation in the form of negative type transparency has been made (i.e. "indirect color separation photography"), a separate screening step is performed to yield a halftone positive. Specifically, a contact screen, now typically a flexible transparency (such as illustratively a positive type KODAK Magenta Contact screen or a KODAK MARK MLR type contact screen) that contains a precise two dimensional grid-like pattern of vignetted dots (having a sinusoidal density pattern) at a resolution of 85 to 200 lines/inch (approximately 33 to 79 lines/centimeter), is placed in direct intimate contact over the emulsion side of a piece of high contrast orthochromatic film, such as KODALITH Ortho film 2556, type 3 (KODAK, KODALITH and MARK MLR are trademarks of Eastman Kodak Company), in a vacuum holder located in the back of a suitable vertical process camera. These films are commonly referred to as "lith" films. As such, incoming light will pass into the camera and then through the contact screen to selectively expose certain areas on the film. A color separation is positioned on the copyboard of the process camera such that the center of the separation is centered over the lense of the camera. Thereafter, light is projected onto the separation to uniformly illuminate the film plane in the process camera. The camera lense is then opened, and a suitable time exposure is made. Each area on the lith film where light was blocked by a dot in the screen will, with a positive type screen, remain white when developed to yield a positive halftone image. All other areas in the lith film that have been exposed to light passing through this screen will become black when developed. In lieu of using a process camera, a vacuum printing frame can be used where the separation transparency is mounted against one side of the screen with the lith film abuttingly mounted against the other side of the screen and light being shined directly through the separation, screen and onto the emulsion side of the lith film. In any event, the amount (density) of light passing through the screen and reflected from or passing through a contone separation at any given location will determine the size of the resulting dot (circular or square with a conventional screen, or elliptical with an elliptical screen) that will occur at a corresponding location on the developed lith film. The lightest areas on the separation will reflect or transmit therethrough the most light and will produce the largest dots. The darkest areas on the separation will reflect or transmit therethrough the least light and hence will produce the smallest dots. Once the lith film has been appropriately exposed, it is then chemically developed to yield a halftone separation. This entire photographic process is then repeated for each of the remaining color separations to generate the remaining halftone separations. Alternatively, in direct color separation photography, separate screened negative type color separations are directly generated from an original color image rather than from a color separation. Here, an appropriate color filter is typically placed onto the lense of the process camera to separate out a primary color from the original image. A negative type screen, such as a KODAK Gray Contact Screen (Negative type) or a KODAK MARK GSR screen for generating reflection copy with a process camera or a KODAK MARK GMR screen for use with a color transparency of the image mounted in a vacuum mounting frame, can be used to directly generate the negative halftone separation from the image (MARK GSR and MARK GMR are trademarks of the Eastman Kodak Company). The remainder of the screening process is substantially identical to that discussed above.

Unfortunately, photographic screening processes possess several major drawbacks. First, because of the large number of manual steps involved, photographic screening is time consuming. Second, a camera operator that performs this process must possess a very high level of skill in order to obtain accurate results. In particular, the operator must accurately regulate the exposure light to assure that lith film is evenly illuminated. Additional exposures, such as shadow and highlight exposures, of a lith film may also be necessary to achieve proper tonal rendition in a halftone separation. The operator also needs to recognize and compensate for the fact that subtle differences in the reproduced image may arise if he changes from an old screen to a new screen in which the latter has smaller tolerances and hence a more sharply defined dot pattern than the former screen or if he changes from one type of lith film to another. Furthermore, the operator must reduce all stray non-image forming light (commonly referred to as flare) that reaches the lith film to a minimal amount. Moreover, the operator must use proper techniques in developing the exposed lith film in order to assure that acceptable tonal rendition occurs in the reproduced color image.

In addition, the dot patterns existing in each of the superimposed halftone reproductions in a full color image frequently interact with each other to produce a low frequency spatial beat (interference) pattern that appears as a repeating rosette pattern in the image and is commonly referred to as a Moire pattern (hereinafter referred to as Moire). If the beat pattern is sufficiently low, Moire is very visible, quite unsightly and highly objectionable to a viewer. To reduce visible Moire, each halftone separation is produced at a different screen angle. The screen angle is defined as the angle between the rows of dots on the screen and the vertical (or horizontal) axis of the lith film or the scanned image. For four color (CYMB) printing, screen angles of 45, 75, 90 and 105 degrees for black, magenta, yellow and cyan screens, respectively, are commonly used. Either the individual screens can be suitably rotated or pre-angled screens, such as KODAK Pre-Angled Gray or Magenta contact screens, can be used. In either case, use of differently angled screens shifts the beat patterns to a relatively high frequency where the Moire is far less noticeable, if at all, to a viewer. While such preset screen angles are often used, the amount of Moire that actually exists in any printed full color image is not known until that image is actually printed.

In addition to screening induced Moire, a full color image can contain undesirable artifacts, such as spots, streaks or the like, that also need to be removed. Often this entails that the coloration of a region of one or more of the separations or of the underlying contone image itself needs to be changed, by one or more techniques, such as tinting, opaquing or "air brushing", to eliminate the artifact. Unfortunately, it is frequently not known a priori, until a point is reached much later in the color printing process, i.e. when a proof and oftentimes a press sheet, as described below, is analyzed, whether use of any of these techniques will effectively remove the artifact and, if such a technique is selected for use, the full extent to which it should be used in order to satisfactorily remove the artifact.

During printing, dot gain also presents a problem. Printing paper absorbs ink. As such, whenever a dot is printed on a page, the ink used to print that dot diffuses into a printed page and as a result creates a slightly larger dot than that intended on the surface of the page. This affect is exacerbated inasmuch as ink is forced against the page by impression pressure exerted onto the page by the printing press. In any event, the visual enlargement in area covered by a dot on a printed page over the area contained in a corresponding halftone separation is referred to as dot gain. Frequently, dot gain is not uniform over all dot sizes and is greatest for dot sizes lying between 30–70% (middletones). Dot gain variations frequently occur between different types of paper (least for a good coated stock, increasing for an uncoated stock and greatest for a soft stock such as newsprint), different presses, and due to normal press variations between different presses of the same type and/or the same press being operated on different days. Therefore, to generate an accurate press sheet, smaller dots, i.e. dots reduced in size by the applicable dot gain, than those that would otherwise be contained in the halftone separations must be generated during screening. Unfortunately, due to normal press variations, the exact amount of dot gain that is expected is generally not known until an actual press sheet is run.

To verify the accuracy of the color printing process and to enable appropriate adjustments to be made at various stages in the printing process in order to correct image defects and improve reproduction accuracy, a test image, frequently referred to as a "proof" is generated from the halftone separations once they are made. After a proof is generated, it is presented as being representative of the reproduced image which will be produced by a printing press in order to determine the accuracy of the printed image. Oftentimes, the proof contains unexpected and unsightly Moire patterns that arose from the interaction of Moire in the image itself with that introduced by use of the angled screens. Frequently, these Moire patterns can be rendered invisible by further rotation of one or more of the screens to a different screen angle. Unfortunately, the exact change in the screen angle is frequently very hard to discern from the resulting Moire pattern itself and instead must be determined through trial and error experimentation. Unexpected artifacts can also exist in the proof thereby necessitating that various changes must be made to one or more of the separations. As such, this requires that a one or more new halftone separations must be generated or at least changed, a new proof must be produced and then analyzed, with this "proofing" process being iteratively repeated until the objectionable Moire and all objectionable artifacts are eliminated from the proof. Now, once an acceptable proof is made thereby indicating that a printed image based on the separations will likely present a desired depiction of the original artwork, a separate printing plate, such as an aluminum sheet with an appropriate organic film coating, is then made for each halftone separation. At this point, a full color test print, commonly referred to as a "press sheet", is produced from these plates onto a sheet of actual paper stock that is to be used to carry the reproduced image, with this operation frequently being referred to as a "press run". The press sheet is then examined to discern all imperfections that exist in the image reproduced therein. Owing to unexpected dot gain, existence of any artifacts in the press sheet and tonal variations occurring in the press run between the press sheet and the original artwork, further adjustments in the coloration or screen angle of the separations may need to be made with the entire process, i.e. both the proofing and the press run processes, being repeated until an acceptable press sheet is produced. Specifically, if a portion of the artifact remains in the press sheet after one or more of the separations has been changed as set forth above or if an artifact is introduced through interaction of the superimposed halftoned reproductions that form the press sheet, then one or more of the separations may again need to be changed and the entire process iteratively repeated until an acceptable press sheet is produced. Frequently, this change in one or more of the separations is made along with a change in screen angle to eliminate any unsightly Moire. With experience gained over several years, a skilled color technician can reduce the number of times that this entire process needs to be repeated in order to produce a set of color halftone separations that yields an acceptable press sheet.

As one can now readily appreciate, the iterative manual process of producing an acceptable set of halftone separations, due to the inherent variability of the process, can be very tedious and inordinately time consuming. Unfortunately, in the graphic arts industry, publication deadlines are often extremely tight and afford very little, if any, leeway. Consequently, the available time in a graphic arts production environment allotted to a color technician to generate a set of halftone separations to meet a particular publication deadline, for example, is often insufficient to allow the technician adequate time, due to the trial and error nature of iterative process, to generate that set of separations which produces a very high quality halftoned color image. As such, the technician is often constrained by time pressures to produce a set of separations that produces a visually acceptable, though not necessarily a very high quality, image.

In addition, the manual process can be disadvantageously quite expensive. Inasmuch as the manual process, even for a skilled color technician, involves a certain amount of trial and error experimentation, a number of separate proofs is often made with changed or new separations being generated as a result. Each new separation requires another piece of lith film. Film and associated developing chemicals are expensive. In addition, if an unacceptable press sheet is produced, then additional separations may need to be made along with new printing plates, which further increases the expense of the process.

In an effort to reduce the time required and expense associated with manual photographic based color reproduction processes, the art has turned away from use of these manual processes in high volume graphic art applications to the use of electronic image processing systems. These systems convert contone images or separations into electronic (often digital) form, electronically change screen angles and compensate for expected dot gain, electronically produce appropriate halftone separations and in some instances halftoned color images directly onto a sheet of paper thereby eliminating the need to photographically generate both separation transparencies and a proof. Through use of electronic image processing, these systems aim to produce high quality halftoned color images at a substantially increased throughput than that possible with traditional manual processes. However, for various reasons as discussed below, these electronic systems when used in graphic arts production environments often fall short of this goal.

An essential component of an electronic image processing system is an electronic screener that converts contone images or separations into corresponding halftone separations for subsequent use in directly driving an electronic dot printer. Specifically, these systems frequently utilize a high resolution marking engine, such as a laser printer, which prints writing spots of a single color at a resolution of illustratively at least 3000 spots/inch. Through such a marking engine, each halftone dot is formed as a group of writing spots. Inasmuch as the color of a toner used in the laser printer specifies the color of each spot, a separate toning pass is made through the printer for each of the colors cyan, yellow, magenta and black using a correspondingly colored toner to generate each separate halftoned image that is used in collectively forming a full color image.

Various techniques for electronic screeners exist in the art but each of these techniques suffers from one or more drawbacks. In particular, U.S. Pat. No. 4,727,430 (issued to M. Miwa on February 23, 1988) discloses one such technique for generating halftone images from an original image. Here, the screen that is used for any area of the original image is selected based upon both the image content, specifically density and hue information, occurring at that area and the coordinate location of that area in the original image. Unfortunately, by first establishing separate comparison ranges of density and hue and coordinate location information for the entire scanned image and then comparing each area in the image to the values for each of these ranges in order to select the proper screen for that area, this technique is likely to be very slow which, in turn, will disadvantageously limit the throughput of an electronic image processing system that uses this technique.

Another electronic screening technique is disclosed in U.S. Pat. No. 4,447,831 (issued to D. E. Adsett et al on May 8, 1984 and hereinafter referred to as the '831 Adsett et al patent). This technique, executed in software, relies on first dividing an image into pre-defined areas of 128 adjacent pixels, then generating a weighting function for each 32 pixel sub-area in every area in the image, algebraically combining the weighting functions for each sub-area of each corresponding area to determine the angular modulation present in that area, encoding each area with a value indicative of angular modulation associated therewith, and finally, in response to the encoded value, selecting an appropriate halftone dot pattern to be printed for that area. First, this technique appears to be limited to printing relatively large halftone dots rather than relatively small dots as required in graphic arts applications. Second, the relatively large number of steps that must be performed to select a halftone dot pattern for every area in an image will likely cause this technique to disadvantageously require an excessively large amount of time to process an entire image. In particular, a screened halftone bit-mapped image destined for reproduction by a high resolution marking engine, such as a laser printer, may easily contain in excess of 100 Mbytes of data/separation with a resulting color image containing upwards of 16 Mbits of color information per square inch (or approximately 2.5 Mbits/square centimeter) of image area. Consequently, any software based screening technique, such as that disclosed in the '831 Adsett et al patent, will likely require an inordinately large and hence unacceptable amount of processing time to manipulate the sheer volume of data needed to generate a high resolution screened image. Thus, use of any software based screening technique will disadvantageously highly limit the throughput of an electronic image processing system that uses such a technique and possibly severely degrade its utility for an intended use in a graphic arts production environment.

A different screening technique is disclosed in U.S. Pat. No. 4,419,690 (issued to P. Hammes on December 6, 1983). Here, a halftone separation is generated by helically scanning a color original using an opto-electronic multi-beam scanning head and helically moving a laser completely throughout an output surface, e.g. a separation film, in synchronism with the movement of the scanner. Digital position values are generated to define the current location of the scanning head as it moves along each scanning line in the color original. These values, having X and Y components, are incremented by appropriate horizontal ($\Delta X$) and vertical ($\Delta Y$) increments as defined by the screen angle, output dot pitch and output line spacing. The X and Y components for each successively occurring position are computed by repeated addition of the $\Delta X$ and $\Delta Y$ increments to the previous positions. Once computed, the position values are used as an address to a memory that stores a pattern of a corresponding overlaid halftone dot situated within an "imaginary" screen and inclined at a given screen angle, $\beta$, to the horizontal axis of the separation. If the output of the memory reveals that the current position of the scanning head, as it moves along a scanning line, lies within the overlaid halftone dot area, then the position signal is compared against the tonal value of the original image at the current location of the scanning head to determine whether the laser will be pulsed on at that location. If, alternately, the current position of the scanning head lies outside of an overlaid dot area, then the laser remains off at this position. The increments are less than the size of an overlaid halftone dot such that the laser can produce several dots within the area of an overlaid halftone dot. This patent teaches that to reduce visible Moire in the reproduced image: (a) the values of the $\Delta X$ and $\Delta Y$ increments should be periodically varied as dot borders are crossed, i.e. presumably as the scanning head traverses areas on the original that are associated with adjacent overlaid dots, in order to generate an intermediate screening angle, and (b) the width of the memory that stores an overlaid dot pattern should be chosen such that the width of the overlaid dot is a multiple of the number of scanning beams. Unfortunately, artifacts may be disadvantageously introduced into the separations by the screening process if the $\Delta X$ and $\Delta Y$ increments are periodically varied during a screening operation. In addition, this technique is disadvantageously somewhat inflexible due to the need to size the memory (overlaid dot shape) appropriately to eliminate Moire in different screening applications.

An additional technique, which relies on representing each repeating halftone cell within a screen by a rectangular matrix and then appropriately combining each pixel within the matrix with pictorial information for spatially corresponding pixels located within an image, is described in U.S. Pat. No. 4,185,304 (issued on January 22, 1980 to T. M. Holladay). Unfortunately, this technique can only be used with certain screen angles thereby failing to suppress certain Moire patterns caused by the mere superposition of all the halftone separations.

Hence, electronic screeners known in the art are often disadvantageously characterized by one or more deficiencies: rather slow operation—particularly those that rely on use of a software based screening technique, operation over limited screen angles, introduction of unwanted artifacts or inflexible operation. Unfortunately, any of these deficiencies tends to limit the throughput of an electronic image processing system that might utilize such a screener.

Moreover, an inherent problem with electronic image processing systems known in the art and specifically those that employ digital screeners is their potential to generate undesirable Moire, hereinafter referred to as screener induced Moire, in addition to that caused by superposition of all the halftone separations to form the reproduced color image. The goal of an electronic image processing system, particularly the screener, is to generate a reproduced color image that appears as faithful to an original color artwork as possible, i.e. a reproduction that replicates all the flaws such as Moire and artifacts that appear in the artwork but without adding any additional flaws. This goal is not met where the screener introduces flaws into the reproduced image. Specifically, those skilled in the art have recognized that visually objectionable low frequency Moire patterns can result from the interaction of several separate spatially sampled entities that occur in the image processing system, e.g. Moire occurring in the sampled image itself (image Moires), Moire introduced by the interaction of the sampled image produced by the scanner with a sampled screen, and Moire introduced by the interaction of the sampled screened image with the individual grid like configuration of writing spots produced by the marking engine.

In an attempt to suppress such non-image Moire patterns and provide faithful color image reproduction, the art teaches that either of two basic approaches can be used. Unfortunately, neither of these approaches is fully satisfactory. First, rational screens can be used. Here, pre-defined pixel (writing spot) patterns for a fundamental portion of halftone image that are actually to be written by a marking engine are stored in a memory and repeatedly accessed and replicated on a two dimensional basis across the written image. Unfortunately, with such a screen, the spacing between the center of individual halftone dots in both of two orthogonal directions is constrained to be an integer number of pixels thereby limiting the screen angle accordingly. Since each of the pixel patterns themselves is chosen not to have any resident Moire, screener induced Moire does not exist. However, objectionable Moire patterns with relatively large rosettes (that produces a "puckery" appearance) frequently appear in certain colored areas of a color halftoned image whenever the individual halftoned separations generated through rational screens are superposed to yield the reproduced color image. These rosettes can often be eliminated if one of the constituent halftone color separations could be rotated to a slightly different, e.g. irrational, screen angle. Unfortunately, the fixed nature of the stored pixel patterns prevents any such rotation and hence elimination of these rosettes. Therefore, a user of this approach is constrained to accept this objectionable Moire. Hence, the inflexibility of a rational screen based electronic image processing system to provide any arbitrary screen angle often causes such a system to fail to meet the goal of faithful image reproduction. For that reason such systems are not favored for use in graphic arts applications.

Second, the art recognizes that noise can be added to an irrational screening process in order to break up the periodicity of and hence suppress screener induced Moire patterns. Generally, due to the inability to exactly pinpoint each cause and its contributing amount of Moire to a reproduced color halftoned image, electronic image processing systems that utilizes noise rely on adding noise to the image on an ad hoc basis, i.e. at the point in the screener that is the most accessible and/or conducive to adding a noise signal to the screening process. For example, one noise based technique relies on adding noise to the contone value for each halftone dot in order to dither its value somewhat. Adding noise in this fashion has proven to be inadequate to substantially eliminate screener induced Moire. Another noise technique involves adding noise to randomly and slightly change the center position of each halftone dot. This technique unfortunately produces a halftone dot that frequently has two separate portions, such as a crescent shaped portion at the bottom of a cell (macro pixel) and a truncated remainder situated at the top of the cell or vice versa. Unfortunately, if too much noise is added, then image Moires, which must be exactly duplicated if the goal of faithful image reproduction is to be met, will be suppressed thereby disadvantageously degrading the quality of the reproduced image.

For example, U.S. Pat. Nos. 4,456,924 and 4,350,996 (respectively issued on September 21, 1982 and June 26, 1984 to G. Rosenfeld) describe electronic screeners that utilize added noise to eliminate Moire. Specifically, these patents describe electronic screeners, generally similar to those discussed above, that use a screen pattern having a rectangular matrix of microcells which have been electronically rotated to a desired screen angle and are successively superimposed over corresponding groups of adjacent pixels of a color separation to generate a corresponding halftone separation. These two patents recognize that rounding error occurring in the calculation of the address of each microcell in the screen pattern, particularly at certain screen angles, will produce Moire. To break the Moire, these patents teach that a relatively small amount of noise in the form of a small random number should be added to either the address applied to a screen memory or to the output provided by the screen memory. Unfortunately, merely adding a small amount of noise in this fashion does not necessarily ensure that substantially all the screener induced Moire will be suppressed.

My co-pending United States patent application, entitled "APPARATUS FOR ADDRESSING A FONT TO SUPPRESS MOIRE PATTERNS OCCURRING THEREBY AND A METHOD FOR USE THEREIN" that has been filed simultaneously herewith and assigned Ser. No. 07/272,591, discloses both a digital screener that can operate at any screen angle and an accompanying font addressing method for use therein which suppresses a substantial amount of screener induced Moire but does not visibly affect image Moires. This method relies on generating a coordinate position of a desired bit to be written from a stored font pattern for a given contone value, generating a specific amount of substantially random noise, and adding that noise to the coordinate position of that bit to be written from the stored font pattern. The noise value is contained within a noise function that has a substantially uniform probability distribution occurring throughout a region having a width equivalent to the spacing between successive micro-pixels that are to be written by a marking engine. The resulting screener advantageously possesses a relatively high throughput, operates in a flexible manner and substantially prevents unwanted artifacts from being injected into the halftoned separations or reproduced image. Since this digital screener substantially suppresses screener induced Moire, the separations and resulting halftoned images generated through the use of this screener and seen at normal viewing distances faithfully replicate the artwork to a much greater degree than that heretofore possible with electronic screeners known in the art. As such, use of this screener advantageously reduces the amount of trial and error experimentation required by a color technician to generate a set of color separations that yields a very high quality reproduction of the artwork. Unfortunately, the individual halftone dots produced by this screener, when clearly seen through a suitable optical magnifier, appear excessively jagged rather than relatively smooth apart from jaggedness resulting from normal quantization. The boundary of an individual halftone dot may contain an extra darkened micro pixel(s) that juts out from the dot or a gap into the halftone dot where a micro pixel should be darkened but it is not. Individual dots in a halftone image, due to their relatively small size, are not perceived by and in fact are spatially integrated with adjacent dots by a viewer's eyesight in order to yield a portion of a contone image. Consequently, this excessive jaggedness will simply not be seen by a viewer. Nonetheless, by virtue of the requirements of the graphic arts industry, the excessively jagged nature of these dots causes them to be unsuitable for use in graphic arts applications, even though, at normal viewing distances, this screener provides more faithful halftone reproductions of a contone artwork than that previously possible in the art.

Hence, at this point, a need exists for such a digital screener which not only operates at any screen angle and suppresses a substantial amount of screener induced Moire without visibly affecting image Moires but also produces relatively smooth halftone dots. Advantageously, an electronic image processing system that employs this screener will be capable of providing a substantially increased throughput of high quality faithfully reproduced halftoned color images of an artwork than that heretofore possible in the art for use in graphic arts applications and specifically for use in a graphics arts production environment.

SUMMARY OF THE INVENTION

I have recognized that a digital screener that relies on adding random noise to the coordinate position of a desired bit, that is to be written from a stored bit-mapped halftone dot pattern, will produce halftone dots having excessively jagged edges due to the added random variations occurring at the halftone dot boundaries. The excessive jaggedness typically includes an extra darkened pixel jutting out from or a lightened gap appearing at the edge of a dot. Where this excess jaggedness occurs in any dot, this jaggedness exists in addition to the jaggedness that is inherent at a halftone dot boundary and which results from normal quantization of the bit-mapped halftone dot pattern for this dot.

With this recognition and in accordance with further teachings of my invention, the excessively jagged halftone dot edges can be avoided by randomly varying the dot fonts that are used to write successive halftone dots. A pseudo-random value is used to select one of a number of, illustratively sixteen, available fonts. Each dot font can take on nearly any shape as long as it is somewhat different from that of the other fonts, provided the shapes of all the font patterns are relatively smooth, apart from normal edge variations due to quantization. Once a particular font is chosen for any halftone dot in the screened image, no random variations are added to the font pattern. The random variation inherent in the selection of any particular dot font coupled with the dissimilarity among the individual dot fonts, for any given contone value, substantially suppresses screener induced Moire patterns that might otherwise appear in the screened image. Moreover, writing a selected font without imparting any random variations to the shape of the font itself advantageously avoids any jagged halftone dot edges other than those which normally occur from quantization.

In accordance with the teachings of a preferred embodiment of my invention, to reduce the memory requirements for a font memory, each font pattern is stored as a single 32-by-32 array of eight bit threshold values. Each array resides within a separate memory plane in the font memory. The font memory contains illustratively 16 different memory planes to collectively store 16 different corresponding font patterns. Within any of these memory planes, the threshold values collectively define upwards of 256 separate isometric halftone dot contours with each contour being associated with a given contone value. In particular, the threshold values that are stored within the memory plane and which form a contour are set to an identical corresponding contone value at all the addressable locations that define the periphery of the contour. The defined contours are all concentrically aligned and centered about a set of axes that define the center of the memory plane. The origin is associated with that halftone dot contour having a contone value of zero, i.e. a zero percent dot. Within each font, the halftone dot contours monotonically increase in size, for increasing contone values, in a direction outward from the origin.

The 16 different dot patterns are preferably chosen to be dot patterns with 16 sets of axes located at different corresponding orientations. Each dot pattern is produced by conformally mapping an undistorted center weighted halftone dot defined by two orthogonal axes mutually centered about their zero points into a correspondingly different two dimensional space where the axes therein are not orthogonal and/or not centered, i.e. they are distorted. Any set of 16 different randomly oriented axes can be used.

In operation, the memory plane for a selected font is addressed by X and Y coordinate values that define a present sampling location with a halftone reference cell. An incoming contone value for a particular halftone dot, or portion thereof, to be written by the marking engine is then compared, within an eight bit comparator, to the threshold value stored within the specific memory location defined by the X and Y coordinates. If the contone value exceeds the threshold value, then the comparator produces a "1" bit which, in turn, is applied to the marking engine to instruct the engine to produce a writing spot (darkened micro-pixel) at the present location of the writing head in the engine. Alternatively, if the current contone value is less than or equal to the threshold value, then the comparator produces a "0" bit which, in turn, instructs the marking engine not to produce a darkened micro-pixel at the present location of the writing head. As such, by comparing the incoming contone value against the stored threshold values, the marking engine will produce a halftone dot, or portion thereof, corresponding to the incoming contone value.

Selection among the distorted fonts can also occur through a process of constrained randomization in which a two-dimensional connectivity is defined between adjacent halftone dot cells occurring throughout the screened image. This connectivity is particularly advantageous for use with certain printers that require connectivity between successive halftone dots. Alternatively, distorted halftone dot patterns can be fabricated by shearing identical undistorted center-weighted halftone dots. To prevent gaps from appearing in the screened image, individual sheared halftone dot fonts would also be selected in a manner that provides two-dimensional connectivity between adjacent halftone dots in the screened image. Both of these two techniques are also effective in suppressing screener induced Moire.

This inventive technique is not confined to operate with any particular screen angle. As such, an irrational digital screener that utilizes this technique will advantageously produce a highly faithful reproduction, using relatively smooth halftone dots, of an image defined by a set of incoming color separations.

Consequently, use of the inventive technique in a high throughput flexible irrational screener that is incorporated into an electronic image processing system advantageously facilitates meeting an overall goal in the art of providing such a system which can be used in graphic arts applications, specifically in a graphic arts production environment, and which has a substantially increased throughput of high quality faithfully reproduced halftoned color images over that heretofore possible in the art.

BRIEF DESCRIPTION OF THE DRAWINGS

The teachings of the present invention may be readily understood by considering the following detailed description in conjunction with the accompanying drawings, in which:

FIG. 10A diagrammatically depicts the axes distortion method used to generate each different individual font pattern;

FIG. 11 shows the correct alignment of the drawing sheets for FIGS. 11A–11G;

FIGS. 11A–11G collectively depict a detailed block diagram of the circuitry used in screener 30 shown in FIG. 1;

FIGS. 12A and 12B depict simplified state diagrams that are implemented by DMA Controller PAL 914 shown in FIGS. 11A–11G;

FIG. 13 shows the correct alignment of the drawing sheets for FIGS. 13A and 13B;

FIGS. 13A and 13B collectively depict a simplified state diagram implemented by Control Sequencer PAL 940 shown in FIGS. 11A–11G;

FIG. 17A shows the degrees of freedom associated with each halftone dot cell that are used in generating a sheared halftone dot font;

FIG. 17B shows randomly selected horizontal and vertical shearing directions for each boundary of a halftone cell in array 1730 of such cells; and FIG. 17C shows an array 1750 of sheared halftone dots that results from shearing array 1730 shown in FIG. 17B in the directions depicted therein.

To facilitate understanding, identical reference numerals have been used to denote identical elements that are common to various figures.

MODES OF CARRYING OUT THE INVENTION

After reading the following description, those skilled in the art will readily appreciate that an electronic screener that incorporates the teachings of the present invention can be used in a wide variety of applications for color image reproduction. Such applications migh include use within a raster image processor to generate bit-mapped halftone color separations from incoming contone separations from which a halftoned color image will be subsequently made or to directly generate a halftoned color image itself. Now, inasmuch as such a screener is particularly suited for use in an electronic image processing system for generating bit-mapped halftone color images from color contone separations for use as color proofs and more specifically, in the KODAK Direct Digital Color Proofer (DDCP) system, the invention will be discussed in that context and specifically for use within a screener that forms part of this system.

A. Overall System Description

Figure 1:
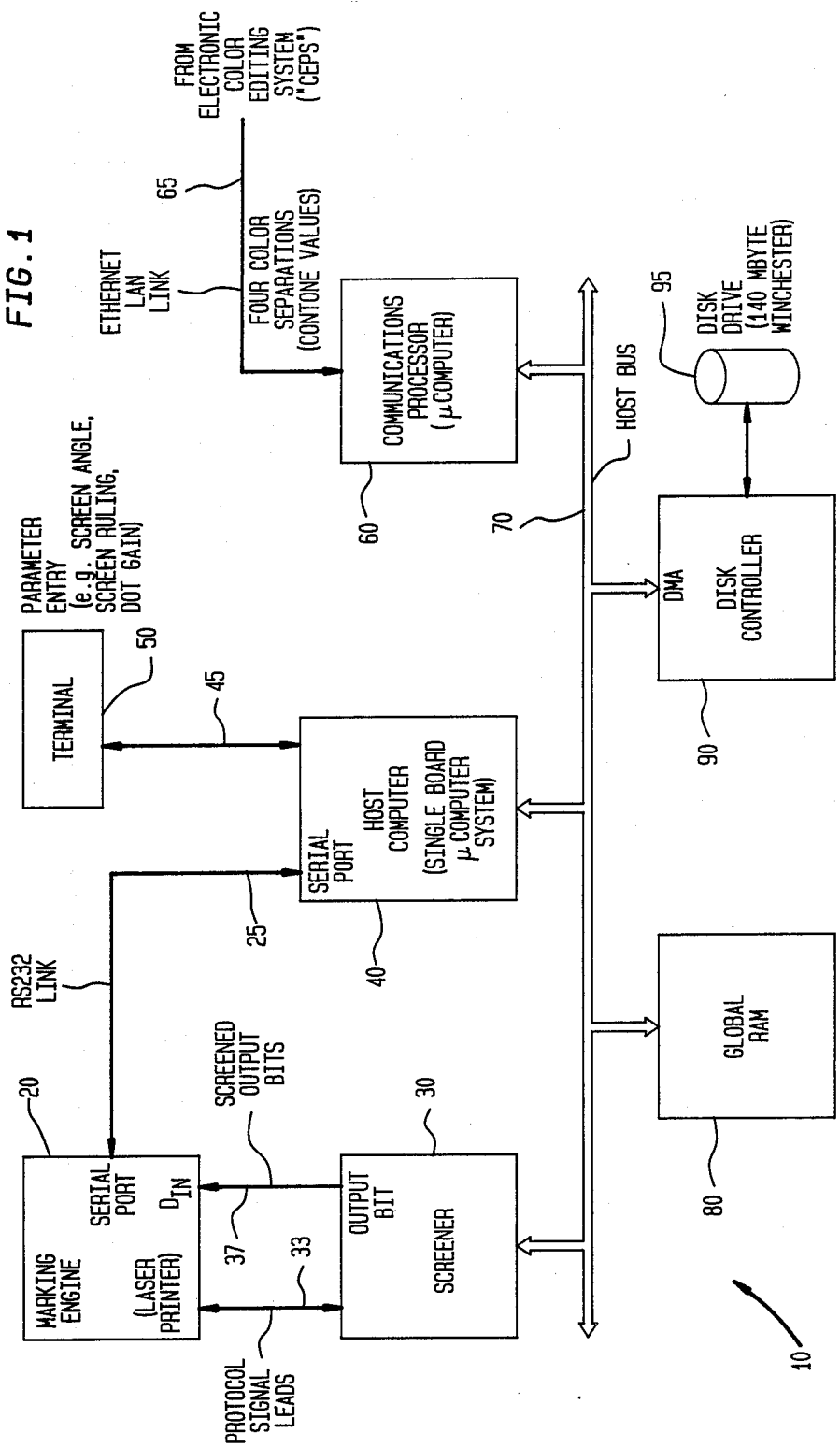
FIG. 1 shows an overall block diagram of an embodiment of electronic image processing system 10 which utilizes screener 30 that incorporates the teachings of the present invention.

FIG. 1 depicts a block diagram of an embodiment of electronic image processing system 10, specifically a typical raster image processor, which utilizes the a screener that incorporates the teachings of the present invention and which would find use in the direct digital color proofing system for producing a high quality color halftoned image (a "proof") that would be intended to accurately represent a subsequently printed full color reproduction of a full color artwork (original).

In overall function, system 10 prints a full color halftoned proof image from four continuous tone ("contone") color separations, i.e. for the four subtractive primary colors cyan, magenta, yellow and black. The need for such a system arises from the fact that currently available color reproducing equipment, such as a printing press, can not apply a differential amount of ink to any location on a printed page in order to achieve a particular tonal rendition of a color thereat. Instead, such equipment can only apply or not apply a single amount of ink to any given location. As such, to print a color image, the color information inherent in the image must first be separated into its constituent primary colors in order to generate appropriate contone separations. Each separation is then converted from contone form, where the color density information is encoded in eight bit amplitude modulated form, into halftone form in which the density information is encoded in spatial (area) modulated form in terms of the size (diameter) of relatively small halftone dots of a single color appropriately positioned against a white or transparent background. This conversion process is commonly referred to as "screening". A proof image is then printed by successively printing each of four single color halftone images, in a superimposed fashion with proper registration and formed from an associated contone separation, over each other. Whenever such a proof image is seen at normal viewing distances, the viewer's eyes will spatially integrate all the localized and overlaid dot patterns for each of the four primary colors existing throughout the reproduced image into the desired image colors with appropriate density and hue.

As will become clear shortly, system 10 utilizes hardware based screener 30 that advantageously provides a substantially increased throughput of high quality bit-mapped halftoned images over that available with screeners known in the art, has the capability of operating at variable screen rulings and substantially any screen angle, is flexible (i.e. does not require hardware reconfiguration, such as changing memory width, for each different screening application), does not introduce appreciably any unwanted artifacts into the proof image and advantageously produces relatively smooth halftone dots.

Specifically, as shown in FIG. 1, system 10 is formed of screener 30, host computer 40, communications processor 60, global random access memory (RAM) 80 and disk controller 90 which are all connected via host bus 70; and marking engine 20, terminal 50, disk drive 95 and communications processor 60. Communications processor 60 accepts, over ETHERNET local area network (LAN) link 65, a file of eight bit digital values, ranging from zero to the value "255", that represents the continuous tone (contone) color density for every scanned location (pixel) in a color separation (ETHERNET is a trademark of the Xerox Corporation). This file of contone values is illustratively generated by a Color Electronic Pre-press System (CEPS) (well known and not shown) that is also connected to the LAN. In operation, a CEPS system scans an image to produce separate cyan, magenta, yellow and black contone separations. A color technician, stationed at a workstation (also not shown) connected to the CEPS system, can then suitably change the coloration of a region of one or more of the separations or of the halftone image, by one or more techniques, such as tinting, opaquing or "air brushing", to eliminate any artifacts in the separation(s). In addition, the technician can change the composition of any area within the image using scaling, rotation, cut and paste and/or other capabilities inherent in the CEPS. Once the file for each separation is generated by the CEPS, that file is transmitted over LAN link 65 to communications processor 60. This processor transfers the file through use of direct memory access (DMA), via host bus 70, to disk controller 90 for local storage within disk drive 95. This disk drive is illustratively a 140 Mbyte Winchester type hard disk drive. This DMA transfer process continues until four files collectively containing all four contone separations for an incoming color image have been stored onto disk drive 95. Communications processor 60 is typically an appropriate microcomputer based system which supervises the DMA transfer process. A mass storage device, such as a tape or disk drive, or a connection to another computer via LAN link 65 may be substituted for the CEPS in order to provide the contone data file for each separation.

Host computer 40, which is also connected to host bus 70, controls the screening process by generating appropriate control signals over the host bus and, for each separation, transferring a line of contone information from disk drive 95, via host bus 70, to screener 30. The screener, as discussed in detail below, is a dedicated hardware based screener that screens each separation using a highly efficient pipelined process. Screener 30 accepts each successive line of contone information that forms a separation and generates an appropriate bit stream that collectively forms a bit-mapped halftone separation at a desired screen angle, screen ruling and writing pitch. The resulting bit stream is applied, via lead 37, to the data input, $D_{in}$, of marking engine 20. The marking engine is typically a laser printer. The laser printer will print one separation at a time with a correspondingly colored toner, i.e. cyan, magenta, yellow or black, being used. To print a full color image, the printed image is kept in the marking engine, and the toner is changed from one color to another so that each successive halftone separation that collectively forms the image is overlaid in proper registration with the previously printed separations for that image. Well known communications protocol signals (not specifically shown), i.e. Data Request, Data Ready and Data Acknowledge, are transmitted over leads 33 between screener 30 and marking engine 20 to implement appropriate handshaking therebetween in order to control the transfer of data from the screener to the marking engine.

To increase screening throughout, global RAM 80 provides temporary storage of contone image data for use by screener 30. The separations for one image can be read from disk 95, via host processor 40 and disk controller 90, while essentially those for another image are being written, under control of communications processor 60, into global RAM 80. At the conclusion of these operations, the separations now stored in global RAM 80 will be read, under the control of host computer 40, and supplied, via host bus 70, to screener 30; while four separations for another image will essentially be successively written into disk 95, under control of communications processor 60 and disk controller 95 and so on. In this manner, system 10 can operate in a pipelined manner thereby relieving the system of the need to wait until screener 30 has screened all four separations of an image before the separations for the next image can be supplied over LAN 65.

As will become clearer below, the screener sequentially processes each successive contone value existing within every scanning line ("macro raster") in the separation. For each contone value, the screener generates bits that cause the marking engine to produce appropriate writing spots ("micro pixels") that collectively depict a proper spatially located halftone dot in the separation with a tonal value corresponding to the contone value and a desired screen angle. To produce appropriately fine halftone dots for graphic arts applications, the screen ruling is typically set to a value ranging from 85 to as much as 200 dots/inch (dpi) (approximately 33 to 79 dots/centimeter). In order to ensure that the halftone dots are properly shaped, each halftone dot is formed of micro pixels produced by the marking engine that are each at least ten times smaller than the screen ruling, i.e. for a screen ruling of 200 dpi, a writing pitch of at least 2000 micro pixels/inch (approximately 790 micro pixels/centimeter) is used. Here, for purposes of illustration, the screen ruling and writing pitch will be set to 150 dpi and 1800 micro pixels/inch, respectively.

Various parameters, such as image size, dot gain, screen ruling, screen angle and writing pitch, solid density level, and others, are established for each screening run and changed, as necessary, by a color technician from one screening run to the next. Terminal 50 is connected through leads 45 to host computer 40. Prior to the initiation of a screening run, a color technician will enter the value of each of these parameters, as requested by host computer 40, through this terminal into system 10. Using the values of image size, screen ruling, screen angle and writing pitch, the host computer, as discussed below, will determine, through appropriate table look up operations, twelve initial offset values and then successively load these offset values, via host bus 70, into corresponding parameter registers (see FIGS. 11A-11G) located within screener 30. In addition, as shown in FIG. 1, host computer 40 will also supply the value of image size (width and length), dot gain and solid density level as well other required parameters, e.g. toner color, to marking engine 20, via serial RS-232 link 25. Once these operations have occurred, the host computer will supply an initial line of contone data, via a DMA transfer from disk drive 95, to screener 30, via host bus 70, and thereafter, if the marking engine specifies that it is ready to print, i.e. accept data (by asserting a DATA REQUEST line, not specifically shown, located within leads 33 high), will command the screener to commence screening. Serial link 25 also carries status information provided by the marking engine to host computer in addition to various commands and parameter values from the host computer to the marking engine, e.g. start printing. During a screening operation, the host processor merely monitors the serial link for any changes in status information provided by marking engine 20.

B. Screening Fundamentals

To facilitate understanding of the subsequent discussion of both the circuitry and detailed operation of screener 30, the discussion will now digress to address various fundamental considerations of screening as they pertain to the screener.

As noted above, screening is the process of converting contone values for a color separation into appropriate halftone dots and, specifically, here into appropriate patterns of micro-pixels, at a desired screen ruling, screen angle and writing pitch, that collectively form each halftone dot. This result of this process for a zero screen angle is shown in FIGS. 2 and 3A-3C, all of which should be viewed simultaneously throughout the following discussion.

Figure 2:
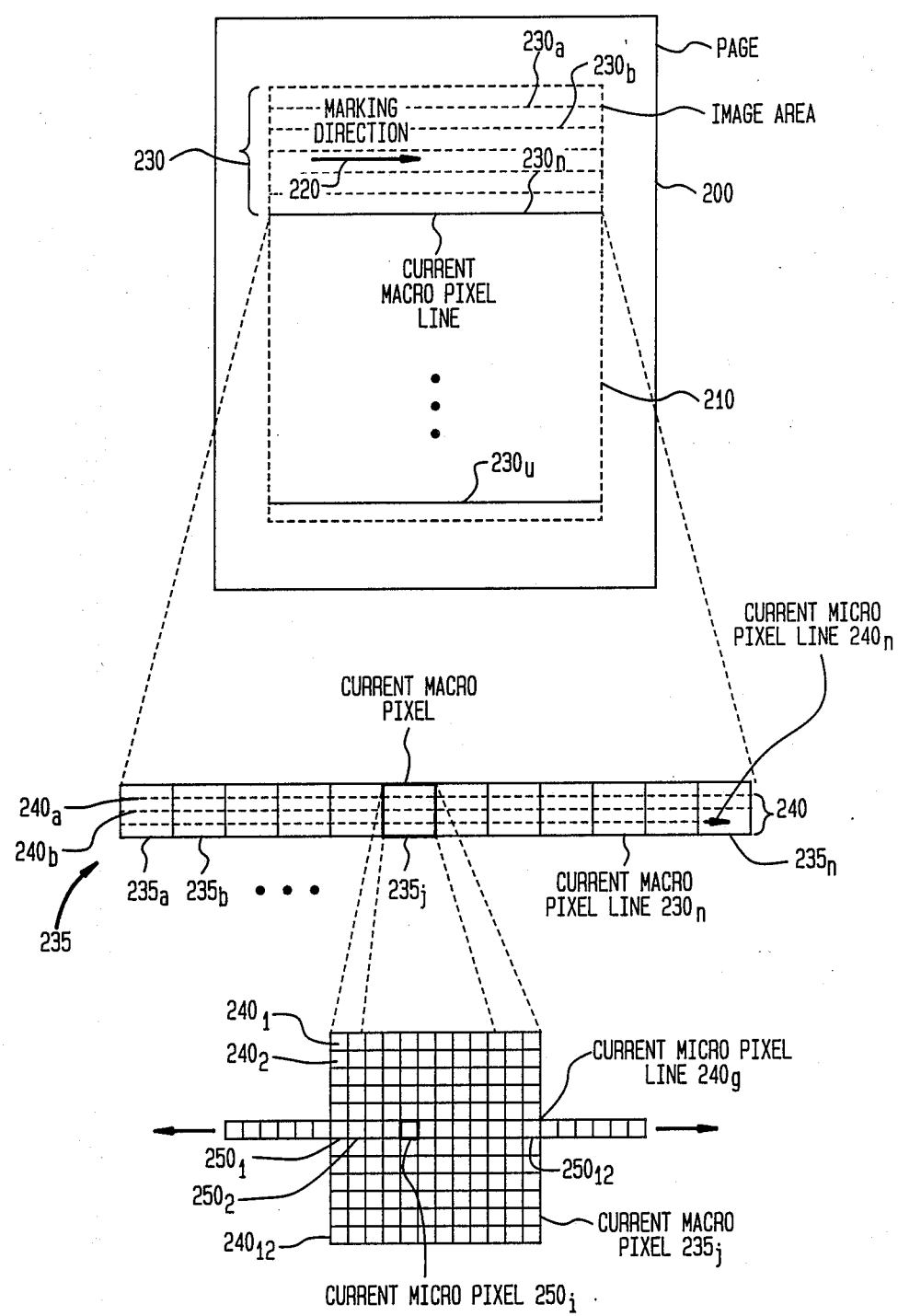
FIG. 2 diagrammatically shows the relationship existing among a image printed by marking engine 20 shown in FIG. 1, a macro pixel line (macro raster) and a micro pixel line (micro raster) occurring within the image.

As depicted in FIG. 2, a printed image produced by the marking engine is composed of horizontal macro pixel lines (macro rasters) 230 which are formed of individual macro pixel lines $230_a$, $230_b$, ..., $230_u$ that completely fill image area 210 on page 200. The image line currently being printed by the marking engine is shown as line $230_n$. Each macro pixel line is formed of individual macro pixels $235_a$, $235_b$, ..., $235_n$ that collectively form macro pixels 235. The current macro pixel being generated by the marking engine is shown as macro pixel $235_j$. As noted, each macro pixel is formed of a halftone dot or portions thereof that have a size corresponding to the tonal value of the spatially corresponding contone value in the separation. A marking engine, such as a laser printer, produces writing spots, i.e. micro-pixels, which are much smaller than a halftone dot and that have a uniform size and are situated across each horizontal micro pixel line. With a screen ruling of 150 dots/inch and a writing pitch of 1800 spots/inch, 12 micro rasters, specifically micro pixel lines (micro rasters) $240_1$, $240_2$, ..., $240_{12}$ that collectively form micro pixel line 240, fill each macro raster in the printed image. The current micro raster being generated by the marking engine is shown as micro raster $240_g$. For ease of illustration, each micro pixel in FIGS. 2 and 3 is shown as being square instead of circular, even though the latter is typically produced by the marking engine. Thus, each macro pixel, such as current macro pixel $235_j$, contains a square matrix of micro pixels each of which, when printed, is either dark or light based upon the value of the bit corresponding to that micro pixel and supplied by screener 30 (see FIG. 1). Micro pixel line $240_g$ situated within macro pixel $235_j$ contains micro pixels 250 which are formed by individual micro pixels $250_1$, $250_2$, ..., $250_{12}$ with the micro pixel currently being written on this raster represented by micro pixel $250_i$. The micro pixels situated on micro pixel line $250_i$ and located to either side of current macro pixel $235_j$ form corresponding parts of a micro pixel line that extends through macro pixels situated on either side of the current macro pixel.

Figure 3C:
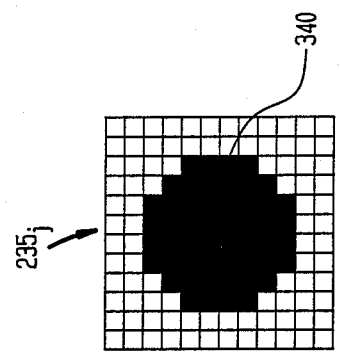
FIGS. 3A–3C collectively depict the formation of an illustrative bit-mapped halftone dot pattern from a circular contone halftone dot pattern.
Figure 3B:
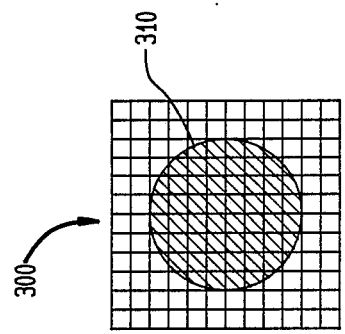
Figure 3A:
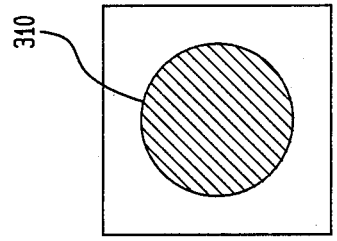

Now, to generate an appropriately sized halftone dot for any macro pixel, the screener provides an appropriate pattern of darkened micro pixels within that macro pixel that collectively forms the halftone dot. This is evident in FIG. 3A-3C which collectively show the formation of an illustrative bit-mapped halftone dot pattern from a circular contone halftone dot pattern. In particular, assume for the moment that circular halftone dot 310, which corresponds to a particular contone value shown in FIG. 3A, is to be generated within current macro pixel $235_j$. To provide an appropriate bit-mapped pattern, 12 by 12 grid 300 or micro pixels, as shown in FIG. 3B, is superimposed over dot 310. By darkening the appropriate micro pixels that are completely situated within circular halftone dot 310, bit-mapped halftone dot (micro pixel pattern) 340, appearing in FIG. 3C, results. As discussed in detail below, a separate corresponding micro pixel pattern (hereinafter referred to as a "reference cell") is stored within the screener for each different contone value, i.e. from binary value "0" for a 0% dot to binary value "255" for a 100% dot.

Figure 4A:
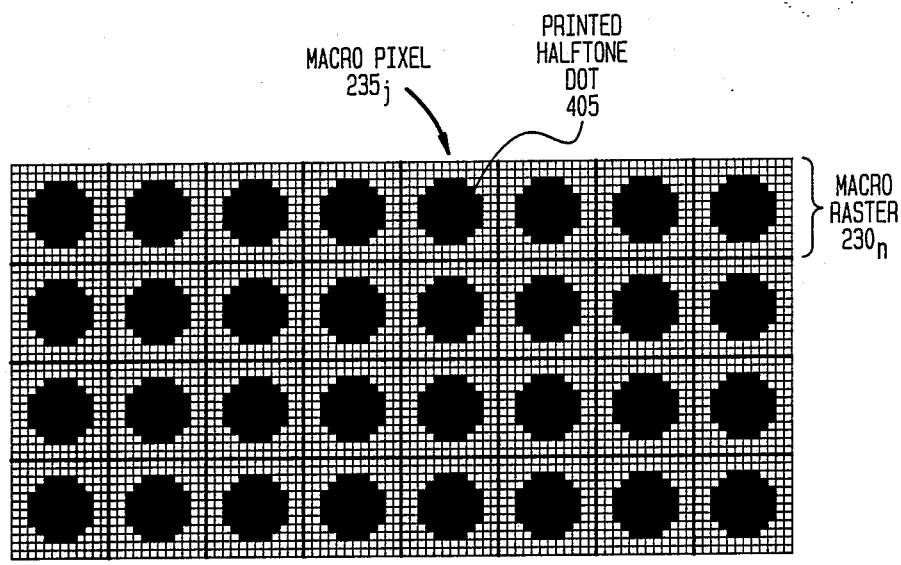
FIGS. 4A–4E show various halftone dot patterns produced by marking engine 20 on a printed image for a constant tint area in a color separation using either a circular halftone dot reference pattern oriented at a screen angle ($\beta$) of zero or 15 degrees, or an elliptical halftone dot reference pattern oriented at a screen angle ($\beta$) of zero, 15 or 45 degrees.
Figure 4B:
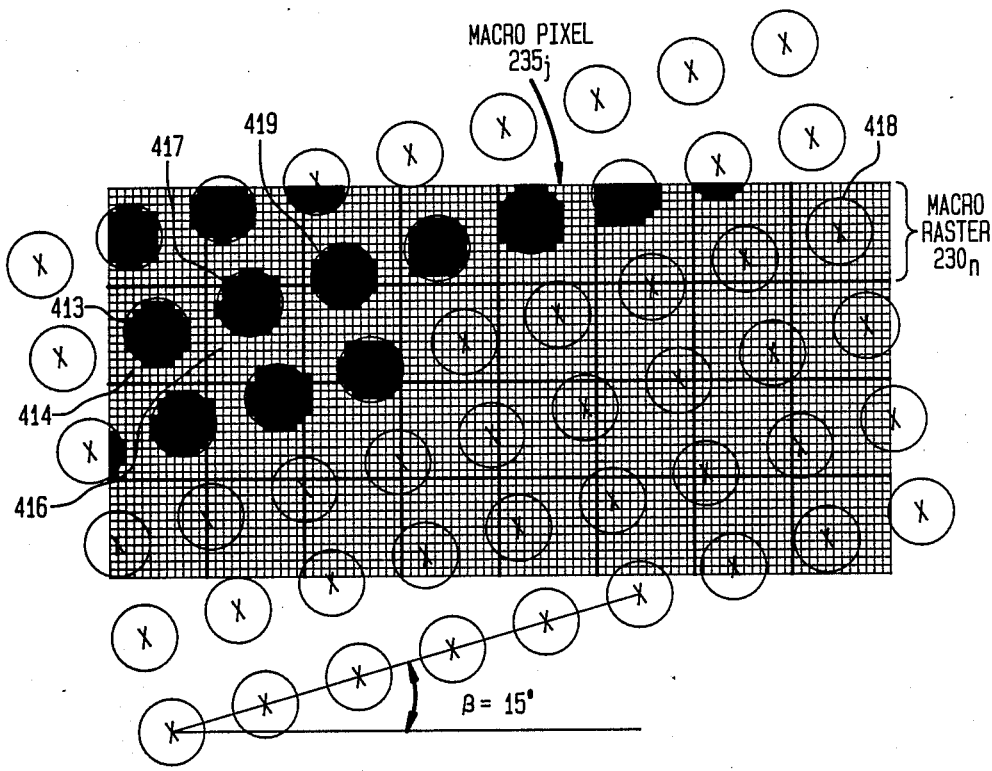

As the screen angle changes for an image area having a uniform tonal value, the screened halftone dots appearing in this area that are produced by the marking engine are not only rotated through the screen angle but also, the position of the center of a dot within any macro pixel changes between adjacent macro pixels. This is clearly shown in FIGS. 4A and 4B which show circular halftone dot patterns for a constant tonal area and the underlying micro pixel patterns that form these dots and are written by the marking engine for a screen angle of zero and 15 degrees. Specifically, for a zero screen angle as shown in FIG. 4A, all the halftone dots produced by the marking engine are substantially identical to printed halftone dot 405 and are each centered at the same location within its corresponding macro pixel, e.g. macro pixel $235_j$ for halftone dot 405. For a 15 degree screen angle with respect to the horizontal axis, as shown in FIG. 4B, each reference halftone dot is shown as a circle with an "X" marking its center location and the actual printed micro pixel patterns for several of these dots being shown as blackened. The remaining reference halftone dots, such as dot 418, and portions thereof that overlay the macro pixels would also be printed; however, their corresponding micro pixel patterns have not been darkened to clearly show the individual micro pixels that would be used to form these dots and dot portions. As is clearly evident from the figure, the center location of each printed angled halftone dot within its corresponding macro pixel varies between adjacent macro pixels. Specifically, the micro pixel location of the center of printed halftone dot 143 within macro pixel 414 is not the same as the micro pixel location of the center of printed halftone dot 417 within macro pixel 416. This variation results from the angled orientation of the reference halftone dots that form any angled screen line with respect to the horizontal micro rasters porduced by the marking engine. In addition, since the center of each angled reference halftone dot is not always centered over the center location of a corresponding micro pixel, a slightly different configuration of micro pixels will be circumscribed by a reference halftone dot from one halftone dot to the next. Consequently, the shape of each printed halftone dot changes slightly from dot to dot, e.g., such as between printed halftone dots 413 and 417, and 417 and 419.

Figure 4C:
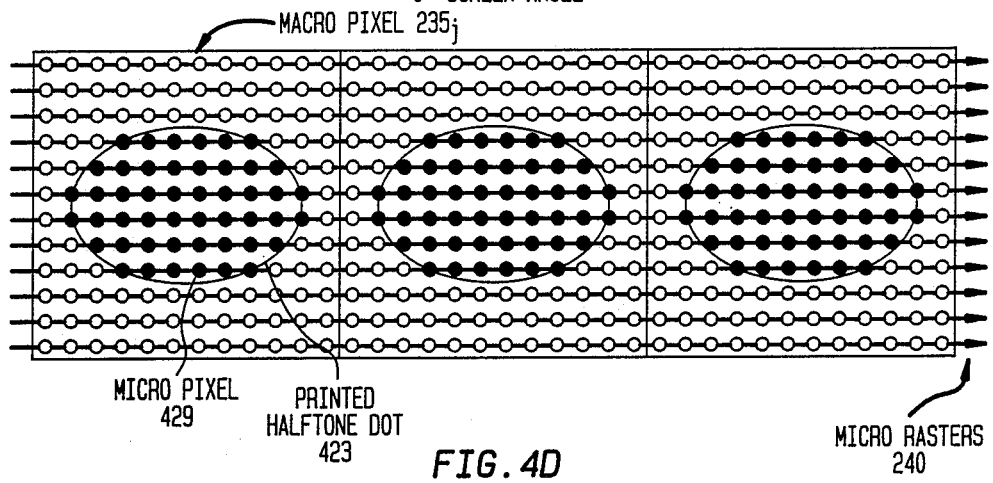
Figure 4D:
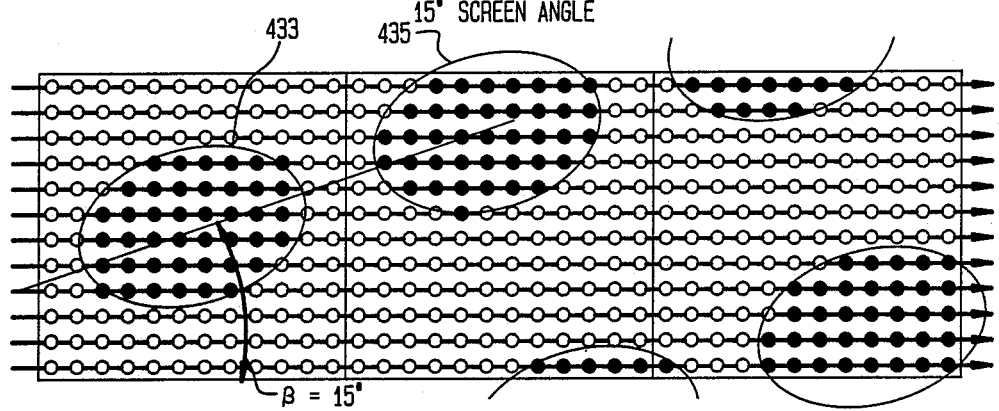
Figure 4E:
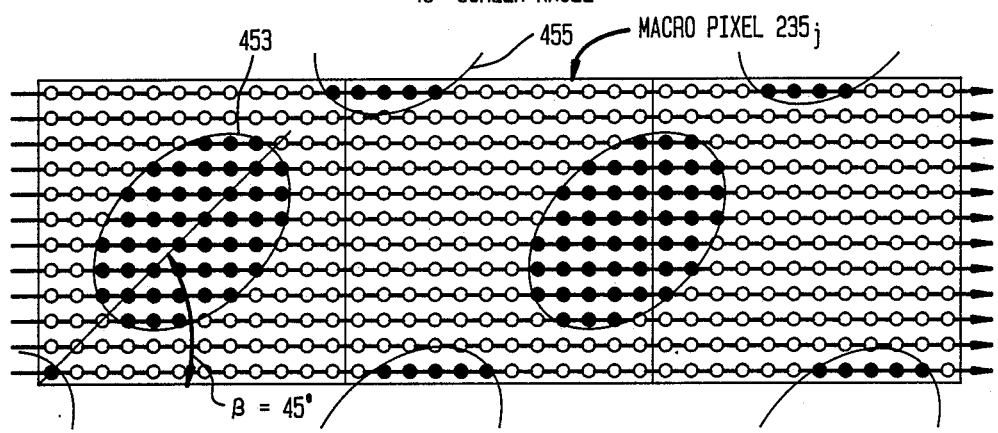

The movement of the center of each printed angled halftone dot produced by the marking engine is particularly evident when elliptical halftone dot reference patterns are used in lieu of circular halftone dot reference patterns. In that regard, FIGS. 4C-4E show various halftone dot patterns produced by marking engine 20 on a printed image for a constant tint area in a color separation using an elliptical halftone dot reference pattern oriented at a screen angle of zero, 15 or 45 degrees. Specifically, a elliptical halftone dot generated at a zero screen angle would, as shown in FIG. 4C when printed, generate dot 423, with its constituent micro pixels, such as micro pixel (writing spot) 429, produced by the marking engine being shown as darkened circles. This figure shows the elliptical reference and associated printed micro pixel patterns for a constant tonal area containing three such halftone dots. Due to the zero screen angle, all three halftone dot patterns would be positioned at the same location within corresponding macro pixels. For 15 and 45 degree screen angles, the screened elliptical reference halftone dots would respectively resemble dots 433 and 435 shown in FIG. 4D for a 15 degree screen angle and dots 453 and 455 shown in FIG. 4E for a 45 degree screen angle with the associated micro pixel patterns produced by the marking engine in both instances shown as darkened circles.

Figure 5:
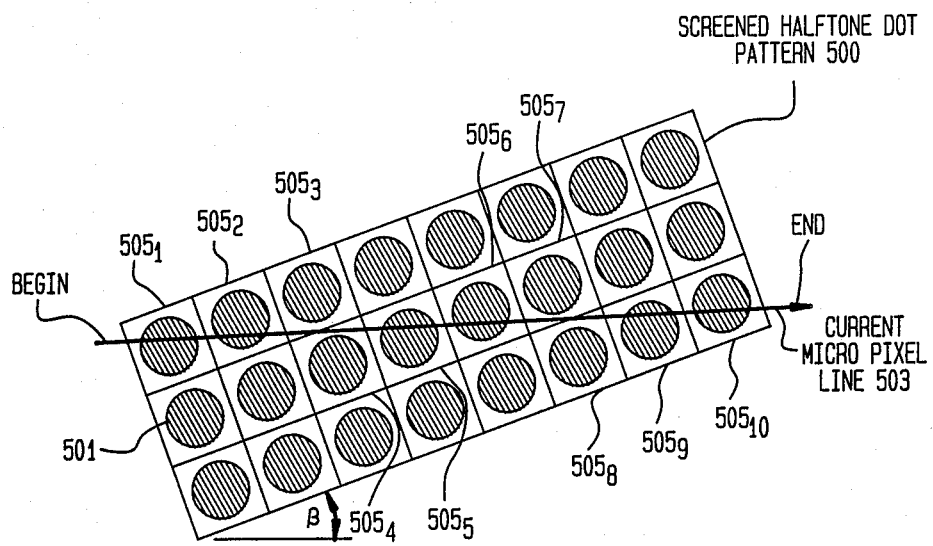
FIG. 5 shows the portions of individual circular halftone dots written by marking engine 20 for a segment of a single micro raster with a 15 degree screen angle for a constant tint area in a color separation.

At this point, the discussion will now describe the manner through which the bit-mapped micro pixel patterns are generated by screener 30 for each halftone dot. As noted, the marking engine only produces horizontal micro rasters of darkened micro pixels. FIG. 5 essentially shows which portions of individual halftone dots, appearing in a constant tint area of a color separation and produced at a set screen angle, would be written by the marking engine on a segment of a single micro raster. To simplify this figure, the printed dots are shown as being smoothly circular rather than quantized. As shown, written screened halftone dot pattern 500, only a small portion of which is depicted, is inclined at approximately a 15 degree screen angle to micro raster line segment 503. All of the halftone dots shown in screen, such as dot 501, are identical and hence possess the same contone value. For a 15 degree screen to be written, micro raster segment 503 would traverse through ten halftone dot cells located on screened halftone dot pattern 500, namely: halftone cells $505_1$, $505_2$, $505_3$, $505_4$, $505_5$, $505_6$, $505_7$, $505_8$, $505_9$ and $505_{10}$. Micro pixels situated on this micro raster segment would be darkened whenever this micro raster, beginning with halftone dot cell $505_1$ and ending with halftone dot cell $505_{10}$, intersects with each corresponding halftone dot itself that lies within that cell. As a result, micro pixel segment 503 would contain alternating dark and light groups of micro pixels with the length of each dark group being governed by the corresponding distance that the segment traverses through a corresponding screened halftone dot.

Rather than traverse through separate stored halftone dot patterns for ten separate halftone dot cells to determine the constituent micro pixels in each cell, a single halftone dot cell possessing a bit-mapped halftone dot pattern of a specific size, i.e. a reference cell, can be repeatedly traversed by an angled micro raster to yield the desired number of printed halftone dots across a printed image. With such arrangement, a sampling line, i.e. a single angled micro raster segment (a "vector"), intersects a cell wall at a starting point, traverses the cell at the screen angle and finally intersects the cell boundary at an exit point. The point situated on the wall of the reference cell directly opposite to the exit point becomes the entry point for the continuation of this sampling line (vector), and so on. An output bit is generated by the screener, particularly screener 30 in FIG. 1, for marking engine 20 whenever the current sampling line that traverses through the reference cell encounters, at its current sampling point, a micro pixel that lays within the reference halftone dot pattern. Once the last sampling point on the sampling line has been reached, sampling begins along a new sampling line for micro pixels situated along the next micro raster. As discussed below, a new sampling point is generated along the current sampling line for every successive micro pixel that is situated along a corresponding micro raster. As explained in detail below, the screen ruling, writing pitch and screen angle collectively determine the lineal distances that exist between successive sampling positions located along each sampling line and between adjacent sampling lines.

Figure 6:
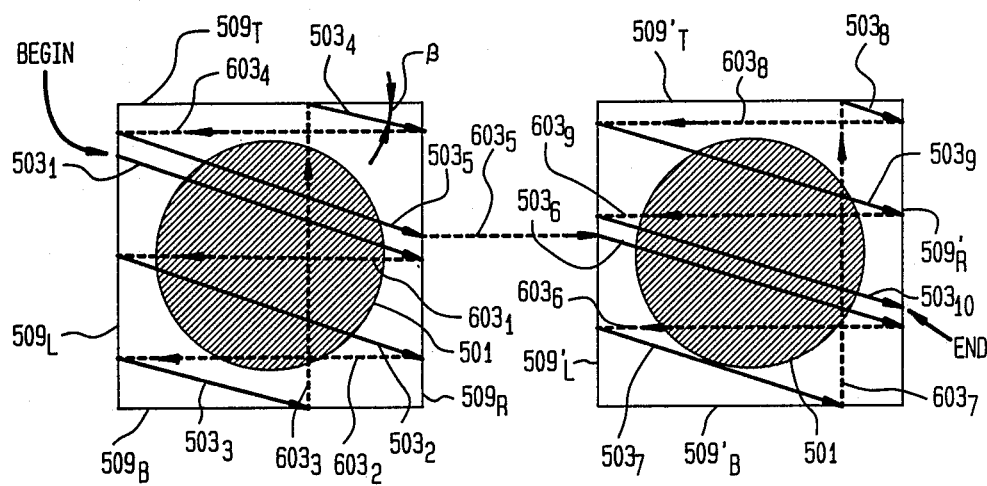
FIG. 6 shows the manner in which a halftone reference cell is sampled to generate the individual halftone dot portions for the micro raster segment shown in FIG. 5.

FIG. 6 shows a global view of this vector based sampling process and illustratively for micro raster segment 503 shown in FIG. 5. For purposes of clarity, the left side of FIG. 6 shows the resultant cell produced by successively superposing the first five halftone dot cells, i.e. cells $505_1$, $505_2$, $505_3$, $505_4$ and $505_5$ shown in FIG. 5, onto reference cell 509; while the right side of FIG. 6 shows the resultant cell produced by successively superposing the last five halftone dot cells, i.e. cells $505_6$, $505_7$, $505_8$, $505_9$ and $505_{10}$ shown in FIG. 5, onto reference cell 509'. Both cells 509 and 509' represent the same cell but with different superposed sampling line segments. These cells have top, bottom, right and left walls respectively designated $509_T$, $509_B$, $509_R$ and $509_L$ for cell 509; and $509'_T$, $509'_B$, $509'_R$ and $509'_L$ for cell 509'. Now, as shown in the left side of FIG. 6, sampling line segment $503_1$ enters the reference cell at a point labelled "BEGIN" on left cell wall $509_L$ and traverses downward across the reference cell at the screen angle $\beta$ to opposite right cell wall $509_R$. The shaded area collectively represents those micro pixels that form reference halftone dot pattern 501. Once sampling line segment $503_1$ reaches right cell wall $509_R$, the starting position for the next sampling line segment, i.e. for halftone dot cell $505_2$ (see FIG. 5), is, as shown in FIG. 6, the point situated directly opposite on left cell wall $509_L$, as indicated by dashed line $603_1$. Once this starting point has been determined, sampling line segment $503_2$ traverses through the cell. In a similar fashion for cell 509, sampling line segments $503_3$, $503_4$ and $503_5$ are successively generated and traverse through the reference cell with their starting points determined by dashed lines $603_2$, $603_3$ and $603_4$. Once sampling line segment $503_5$ reaches right cell wall $509_R$, sampling begins again, as indicated by dashed line $603_5$, at an appropriate location on left wall $509'_L$ of cell 509' and continues along sampling line segment $503_6$. Thereafter, sampling occurs along sampling lines $503_7$, $503_8$, $503_9$ and $503_{10}$ with the location of the starting points for these sampling line segments given by the intersection of dashed lines $603_6$, $603_7$, $603_8$ and $603_9$ with corresponding cell walls. Once sampling line segment $503_{10}$ reaches right cell wall $509'_R$ at a point thereon labelled "END", sampling ceases at which time all the darkened micro pixels that lay on micro raster segment 503 (see FIG. 5) will have been provided to the marking engine.

Figure 7A:
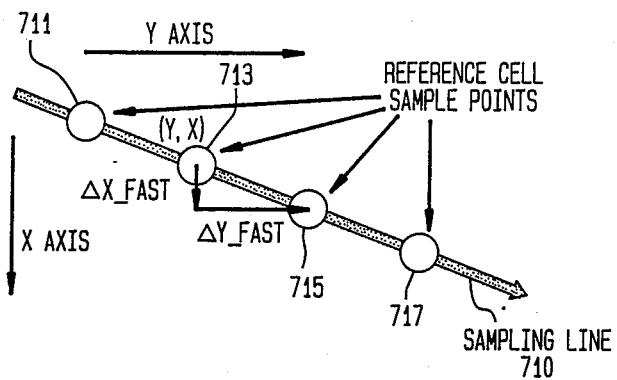
FIGS. 7A and 7B graphically show the manner in which sampling positions located within a reference cell are incremented between adjacent sampling points and between adjacent sampling lines, respectively, to yield an angled grid of sampling points.
Figure 7B:
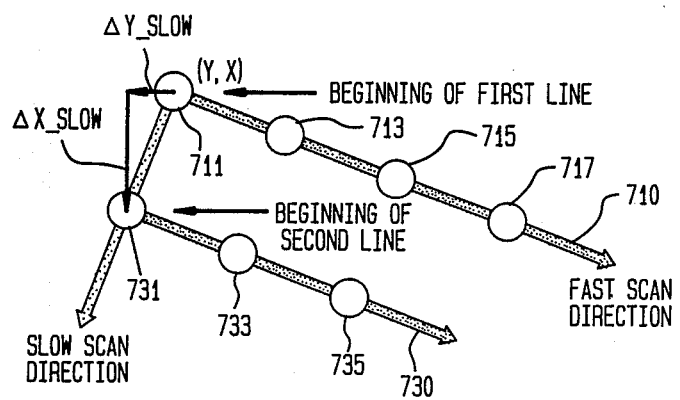

In contrast to many digital screeners known in the art, screener 30 does not rely on the use of a stored screen pattern. Instead, the screener implements a desired screen pattern as a result of the particular manner in which each sampling point located in a grid, oriented at a desired screen angle, is selected from a reference cell. In this regard, FIGS. 7A an 7B graphically show the manner in which sampling positions located within a reference cell are incremented along a sampling line and from one sampling line to the next, respectively, to yield an angled grid of sampling points. As shown in FIG. 7A, current sampling line 710 (shown as a vector) traverses through a referece cell in the direction indicated and samples the contents of that celll at sampling poins 711, 713, 715 and 717. Given the coordinate values (Y,X) at point 713, the location of the next point to be sampled, i.e. sampling point 715, is given by: $(Y+\Delta Y_{FAST}, X+\Delta X_{FAST})$ where $\Delta Y_{FAST}$ and $\Delta X_{FAST}$ (the fast scan increments) are incremental orthogonal components of the inter-sample distance occurring along the sampling line, i.e. the fast scan direction. The ration of $\Delta X_{FAST}$ to $\Delta Y_{FAST}$ is the tangent of the screen angle ($\beta$) with their relative size determining the screen ruling. The locations of sampling points 715 and 717 are determined by similarly incrementing the coordinate values of sampling points 713 and 715, respectively, by the fast scan increments. Whenever a micro raster, i.e. a sampling line, hits or runs past a reference cell wall, then the digital values for the current position along the sampling line are merely allowed to rollover in order to generate the proper starting position on the opposite cell wall. Now, whenever a micro raster has completely traversed from one side of the image to the other, the location of the starting point for the next sampling line must be determined. This is shown in FIG. 7B. Once the current sampling position has reached the end of sampling line 710, the starting position for the next sampling line, i.e. sampling line 730 (also shown as a vector), is determined, as shown in FIG. 7B, by adding appropriate slow scan increments to the coordinate values (Y,X) of starting point 711 on line 710. Specifically, inasmuch as movement from one sampling line to the next occurs much slower than movement between adjacent sampling points along any sampling line, inter-sampling line movement is referred to as the slow scan direction. Hence, the starting position for sampling line 730, i.e. the coordinates of sampling point 731, is given by: $(Y+\Delta Y_{SLOW}, X+\Delta X_{SLOW})$ where $\Delta Y_{SLOW}$ and $\Delta X_{SLOW}$ (the slow scan increments) are incremental orthogonal components of the distance taken along the slow scan direction between corresponding starting points of adjacent sampling lines. Once the coordinates of point 731 are determined and the reference cell has been sampled thereat, the coordinates of subsequent sampling points 733 and 735 are determined by successively incrementing the coordinates of sampling point 731 by the fast scan increments. Sampling proceeds in this manner throughout the entire image being screened so as to yield a grid of sampling points oriented at the desired screen angle to the horizontal axis of the reference cell.

The values of the fast and slow scan increments $\Delta Y_{FAST}$, $\Delta X_{FAST}$, $\Delta Y_{SLOW}$ and $\Delta X_{SLOW}$ are determined through the following equations:

$$\Delta Y_{FAST} = 2^N \frac{S}{r} \sin(\beta) \qquad (1)$$

$$\Delta X_{FAST} = 2^N \frac{S}{r} \cos(\beta) \qquad (2)$$

$$\Delta Y_{SLOW} = 2^N \frac{S}{r} \sin(-\beta) \qquad (3)$$

$$\Delta X_{SLOW} = 2^N \frac{S}{r} \cos(-\beta) \qquad (4)$$

where:

N equals the resolution in bits, here 16, of an integer word;

S is the value of the screen ruling in lines/inch, here illustratively 150;

r is the number of micro rasters/inch in the printed image, here illustratively 1800; and $\beta$ is the screen angle in degrees.

The following table lists typical values of fast and slow scan increments $\Delta Y_{FAST}$, $\Delta X_{FAST}$, $\Delta Y_{SLOW}$ and $\Delta X_{SLOW}$ for screen rulings of 65, 85, 100, 120, 133 and 150 and for screen angles of $-15$, 0, 15 and 45 degrees using the illustrative values given above for the coefficients N, S and r.

TABLE 1

| Screen Angle | Increment | Fast and slow scan increment values Screen Ruling | | | | | |
| --- | --- | --- | --- | --- | --- | --- | --- |
| | | 150 | 133 | 120 | 100 | 85 | 65 |
| $-15°$ | $\Delta Y_{FAST}$ | 5275 | 4677 | 4220 | 3517 | 2989 | 2286 |
| | $\Delta X_{FAST}$ | 64123 | 64283 | 64405 | 64594 | 64735 | 64923 |
| | $\Delta Y_{SLOW}$ | 1413 | 1253 | 1131 | 942 | 801 | 613 |
| | $\Delta X_{SLOW}$ | 5275 | 4677 | 4220 | 3517 | 2989 | 2286 |
| $0°$ | $\Delta Y_{FAST}$ | 5461 | 4842 | 4369 | 3641 | 3095 | 2367 |
| | $\Delta X_{FAST}$ | 0 | 0 | 0 | 0 | 0 | 0 |
| | $\Delta Y_{SLOW}$ | 0 | 0 | 0 | 0 | 0 | 0 |
| | $\Delta X_{SLOW}$ | 5461 | 4842 | 4369 | 3641 | 3095 | 2367 |
| $15°$ | $\Delta Y_{FAST}$ | 5275 | 4677 | 4220 | 3517 | 2989 | 2286 |
| | $\Delta X_{FAST}$ | 1413 | 1253 | 1131 | 942 | 801 | 613 |
| | $\Delta Y_{SLOW}$ | 64123 | 64283 | 64405 | 64594 | 64735 | 64923 |
| | $\Delta X_{SLOW}$ | 5275 | 4677 | 4220 | 3517 | 2989 | 2286 |
| $45°$ | $\Delta Y_{FAST}$ | 3862 | 3424 | 3089 | 2574 | 2188 | 1673 |
| | $\Delta X_{FAST}$ | 3862 | 3424 | 3089 | 2574 | 2188 | 1673 |
| | $\Delta Y_{SLOW}$ | 3862 | 3424 | 3089 | 2574 | 2188 | 1673 |
| | $\Delta X_{SLOW}$ | 61674 | 62112 | 62447 | 62962 | 63348 | 63863 |

For a given screen ruling and number of micro rasters/inch, a table similar to Table 1 but with entries for all permissible screen angles is stored within host computer 40 (see FIG. 1). Prior to the initiation of a screening run, a table look up operation is performed to access the entries which are, in turn, loaded into screener 30, as described below. In the event the screen ruling or the number of micro rasters/inch change, then a new table will be calculated by and stored within the host computer for subsequent access.

Because of the above-described movement of the center locations of the printed halftone dots, with a variation in the screen angle, relative to the micro rasters, the vector based method shown in FIG. 7 of locating each successive sampling point within a reference cell is used in lieu of just rotating a halftone dot pattern stored within a reference cell and printing the rotated pattern centered within a corresponding macro pixel.

I have observed that screener induced Moire patterns occur due to the superposition of two or more spatially sampled matrices. Upon further investigation, I have discovered that in digital screeners in which a font is represented through a stored matrix, such as illustratively a 32-by-32 or a 64-by-64 matrix, of multi-bit threshold values or through multiple matrices each having a bit map of single bit values, the description of the font pattern itself, when stored in this fashion, contains periodicities. These periodicities interacting with other periodicities inherent in the digital screening process, such as in marking engine and in the screened halftone dot pattern itself also lead to screener induced Moire. In particular, periodic sampling occurs within the marking engine in that the individual writing spots (micro pixels) are written on a uniform two-dimensional (vertical and horizontal) basis throughout a printed image. In addition, the pattern of screened halftone dots that are being written by the marking engine to form the printed image is itself periodic. If, for example, a 150 line screen is being written, then centers of individual adjacent halftone dots will regularly occur with a 1/150 inch (0.0169 centimeter) spacing therebetween. Other sources of periodicity in the digital screening process also occur.

In my co-pending patent applications entitled "ELECTRONIC GRAPHIC ARTS SCREENER" that has been filed simultaneously herewith and assigned Ser. No. 07/272,568 and "APPARATUS FOR ADDRESSING A FONT TO SUPPRESS MOIRE PATTERNS OCCURRING THEREBY AND A METHOD FOR USE THEREIN" that has also been filed simultaneously herewith and assigned Ser. No. 07/272,591, I recognized that sampling of a pixel placement error function appeared to be a predominant cause of Moire. This error function is caused by periodic spatial mis-alignment that occurs between the center of each micro pixel within a reference cell, as would be printed by the marking engine, and the address boundaries of each sampling point used to sample the reference cell. To substantially supress this cause of screener induced Moire while advantageously preserving image Moire, I teach in both these patent applications that an amount of random noise having a properly scaled uniform probability distribution should be added to each of the X and Y sampling addresses to a halftone reference cell and using the resultant values as the X and Y addresses to a bit-mapped font pattern stored in that cell. I have found that adding such an amount of noise is sufficient to break the symmetry of the sampling grid so as to substantially suppress the amplitude of any screener induced Moire patterns that would otherwise be generated but is not enough to inject any distinct artifacts into the screened image. Unfortunately, I have also found that adding noise in this fashion causes the halftone dots, when clearly seen through a suitable optical magnifier, to appear excessively jagged rather than relatively smooth, apart from dot boundary irregularities caused by normal quantization. In particular, I have noticed that the boundary of an individual halftone dot may contain an extra darkened micro pixel(s) that juts out from the dot or a gap into the halftone dot where a micro pixel should be darkened but it is not. Individual dots in a halftone image, due to their relatively small size, are not perceived by and in fact are spatially intergrated with adjacent dots by a viewer's eyesight in order to yield a portion of a contone image. Consequently, this excessive jaggedness will simply not be seen by a viewer. Nonetheless, by virtue of the requirements of the graphic arts industry, the excessively jagged nature of these dots causes them to be unsuitable for use in graphic arts applications, even though, at normal viewing distances, this screener provides more faithful halftone reproductions of a contone artwork than that previously possible in the art.

Therefore, in accordance with the teachings of my present invention, I have discovered that excessively jagged halftone dot edges can be avoided by randomly varying the dot fonts that are used to write successive halftone dots. A pseudo-random value is used to select one of a number of, illustratively sixteen, available fonts. Each dot font can take on nearly any shape as long as it is somewhat different from that of the other fonts, provided the shapes of all the font patterns are relatively smooth, apart from normal edge variations due to quantization. The random variation inherent in the selection of any particular dot font coupled with the dissimilarity amont the individual dot fonts, for any given contone value, also substantially suppresses screener induced Moire patterns that might otherwise appear in the screened image. Moreover, once a particular font is selected for use in writing a halftone dot, no random variations are imparted to this font while writing this dot. As such, this advantageously avoids any jagged edges that would otherwise appear in the halftone dots apart from normal dot boundary irregularities arising from quantization. Through the use of my inventive technique of selecting, such as randomly, a different dot font for each successive halftone dot, a better degree of error diffusion occurs, with an concomitant increase in the number of apparent resolving elements that form each dot, than that associated with digital screeners known in the art. As such, very acceptable halftone dots can be advantageously written using my inventive technique with relatively few micro rasters.

As will readily become apparent below, a single halftone dot font is formed of upwards of 256 different dot contours of monotonically increasing size that are stored in terms of corresponding eight-bit threshold values in a common memory plane. The particular contour, i.e. dot size, that is to be produced is governed by the particular contone value that is associated with the current macro pixel that is to be printed by the marking engine. As such, throughout the screening process, the sampling positions are calculated essentially totally independently of the selection of the appropriate dot contour. This, in turn, permits highly efficient pipelined processing to occur which substantially increases the speed at which the screener can operate.

C. Screener 30

Now, having completed the discussion of the fundamentals of screening as they pertain to screener 30, the discussion will turn to specific aspects of this inventive screener.

1. Overview of Processing Undertaken Within Screener 30

As discussed, the essentially total separation within screener 30 of the process of selecting an appropriate dot contour from the process of determining the current sampling positions within that cell advantageously permits parallel pipelined operation. This operation is evident in FIG. 8 which shows the basic steps performed by the screener. Specifically, as shown by block 810, a Bus Interface and Contone Line Buffer circuit (circuit 910 in FIG. 9) buffers a line of incoming contone values and thereafter provides each value in that line as an output value to a threshold comparator in order to print a corresponding screened halftoned dot. Coincident with the provision of each of these contone values, an Image Handeler circuit (circuit 930 in FIG. 9) generates, as shown by block 820 in FIG. 8, the macro pixel address associated with that contone value and also tracks the address of the current micro pixel being generated within the printed image. The Image Handler provides appropriate status signals, shown by dashed lines 825, that signify that the last contone value in a macro raster and/or in the entire printed image has been generated and hence screening for the next macro raster should commence or, if the entire image has been screened, screening should halt. Simultaneously with the operations indicated by block 820, a screen handler circuit (circuit 950 in FIG. 9) provides two operations. First, the screen handler generates, as shown by block 836, a succession of sampling positions (addresses), with one address for each micro pixel, at which a reference cell is to be sampled for each micro raster appearing in the printed image. In addition, a font select circuit (pseudo-random number generator 956 shown in FIG. 9), which forms part of the screen handler, generates, as shown by block 833 in FIG. 8, coincident with the operations performed by block 836, a fourt bit pseudo-random number as FONT SELECT bits.

Figure 8:
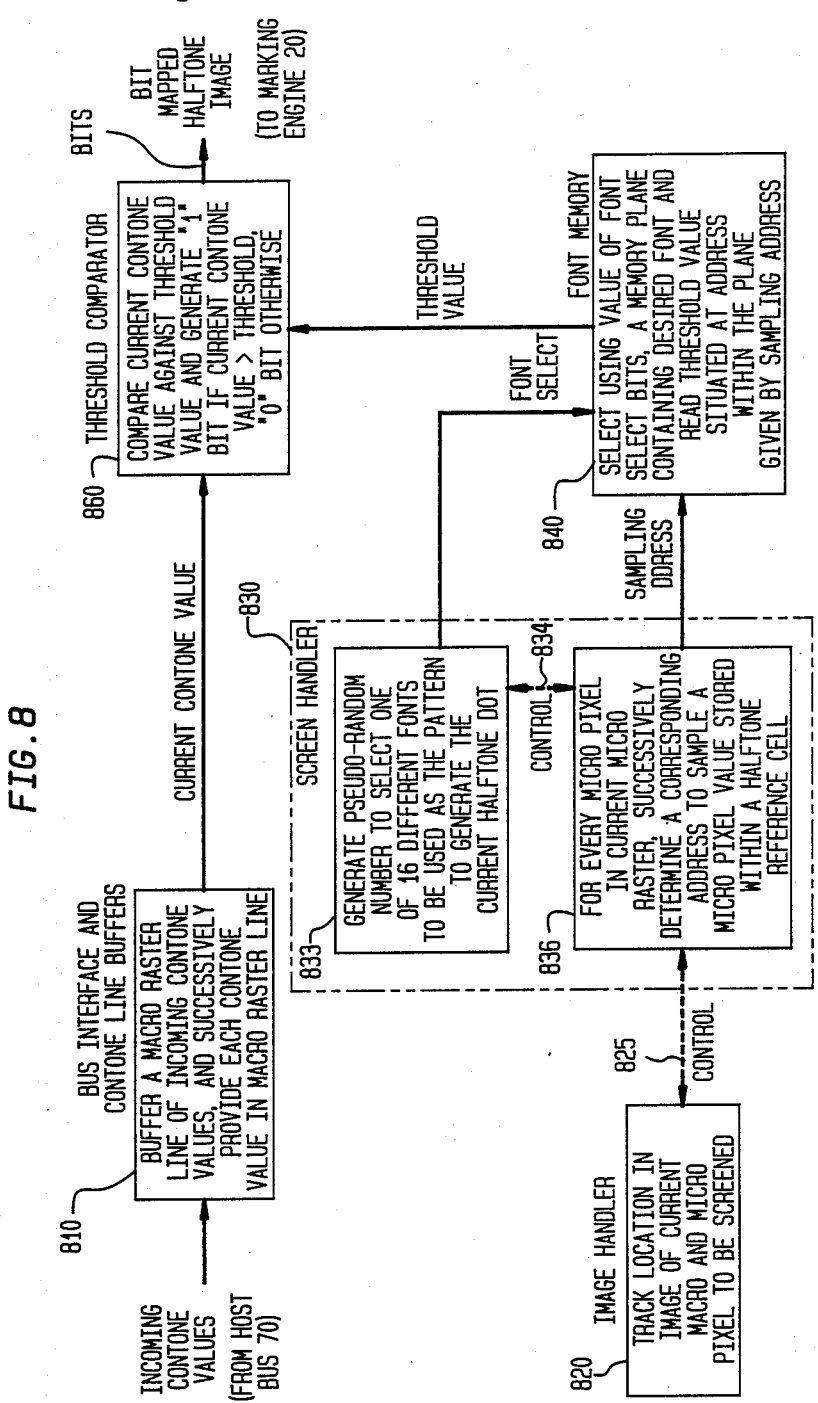
FIG. 8 shows a block diagram of the basic steps performed by screener 30 shown in FIG. 1.

Appropriate status signals, shown by dashed lines 834, are applied to the font select circuit to control its operation. A font memory (circuit 970 in FIG. 9) stores 16 different halftone dot fonts. Each dot font contains a common halftone dot pattern that is stored in a single memory plane in terms of eight bit threshold values. These thresholds define upwards of 256 separate halftone dot contours of monotonically increasing size. As such, the font memory contains 16 such planes. As discussed below, the pattern of each font is smooth, apart from normal quantization errors, but varies from that of each of the other fonts. Now, to avoid excessively jagged edges, apart from normal dot boundary irregularities due to quantization, that might otherwise appear on the screened halftone dots and consequently produce relatively smooth halftone dots, such as illustratively that shown in FIGS. 4A-4B, the four bit FONT SELECT bits, as shown in FIG. 8, are applied to the font memory, as a partial address, to randomly select one of the 16 different dot fonts that is to be used by the marking engine in writing a current halftone dot. The sampling address generated by the Screen Handler circuit is applied to the font memory as the remainder of the address. The operations performed in blocks 820 and 830 continue independently of each other until the entire image has been screened.

Now, as shown by block 840, once the complete memory address is presented to the font memory, this memory selects the desired font and accesses a particular eight bit threshold value stored within the memory plane for that font at a desired memory location defined by the sampling address. The threshold value is applied to one input of a threshold comparator. Essentially simultaneously with this operation, the current contone value resulting from the Bus Interface and Contone Line Buffer circuit is applied to the other input of this comparator. As indicated by block 860, the threshold comparator compares the accessed threshold value against the current contone value. In the event the current contone value exceeds the accessed threshold value, then the threshold comparator produces a high level, i.e. "1", bit at its output. Alternatively, if the current contone value is less than or equal to the value of the accessed threshold value, then the comparator produces a low level, i.e. a "0", bit at its output. Inasmuch as the thresholded bit produced by block 860 forms part of the specific bit-mapped halftone dot that is to be printed by the marking engine, this bit is provided as an output bit to marking engine 30. Inasmuch as the steps performed by blocks 820 and 830 occur in parallel, screener 30 operates in a highly efficient pipelined manner with the capability of processing substantial amounts of image data at a very high speed. Consequently, screener 30 provides a significantly increased throughput of screened images over the use of screening techniques known in the art.

Figure 9:
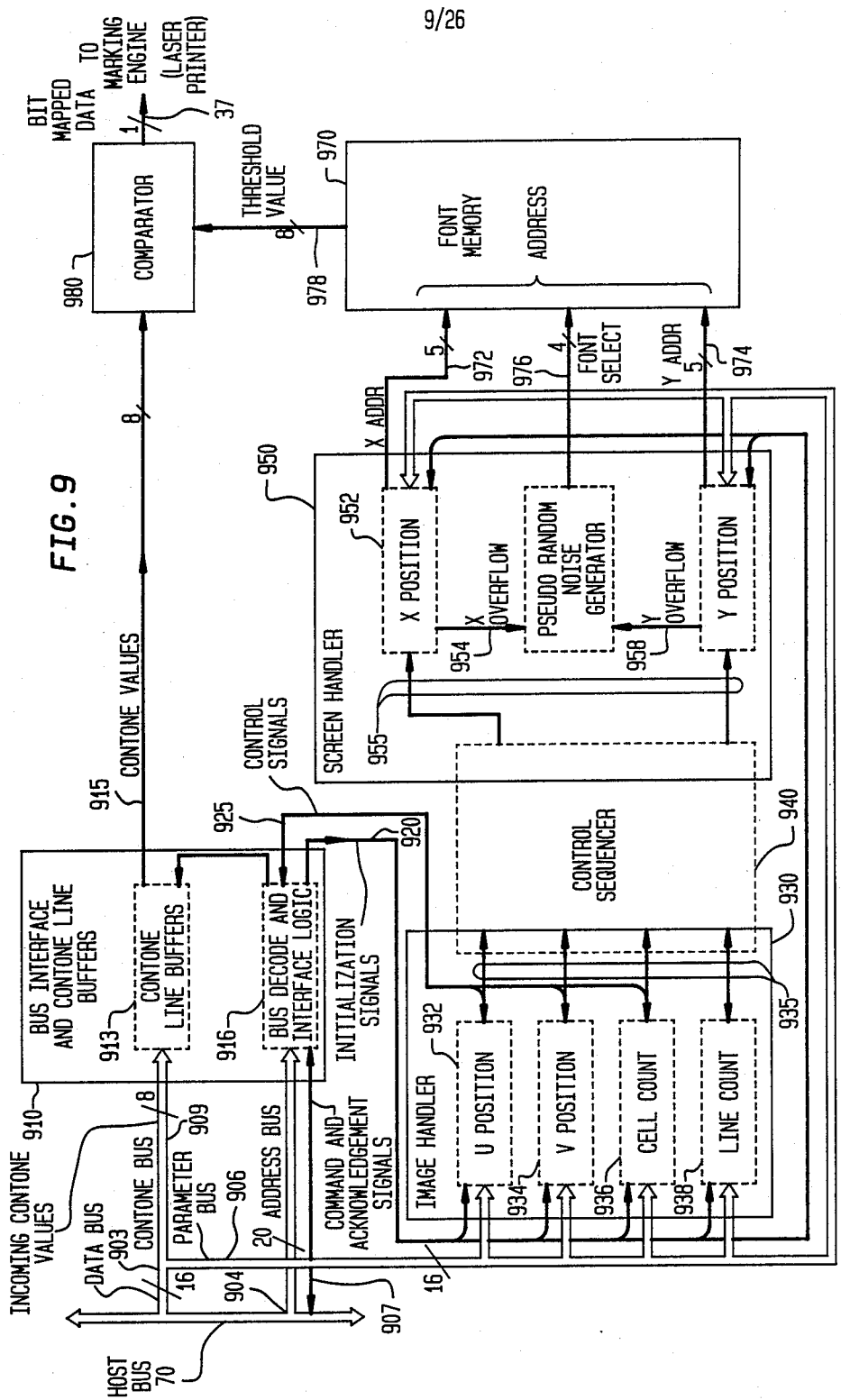
FIG. 9 depicts a basic block diagram of the circuitry used in screener 30 shown in FIG. 1.

FIG. 9 depicts a basic block diagram of the circuitry used in screener 30 shown in FIG. 1. Screener 30 is formed of Bus Interface and Contone Line Buffers 910, Image Handler 930, Screen Handler 950, Font Memory 970 and Threshold Comparator 980. The screener is interfaced to host bus 70 through data bus 903, address bus 904 and leads 907 which carry various command and acknowledgement signals. Bus Interface 910 contains contone line buffers 913 and bus decode and interface logic 916. As noted above, these line buffers store an incoming line of eight bit contone values and successively provide each of these values over leads 915 to threshold comparator 980 for use in generating an output bit for the marking engine. To increase throughput, contone line buffers 913 contain two identical line buffers, specifically FIFO (first in first out) arrays 9131 and 9135 shown in FIGS. 11A-11G, which operate in a "ping-pong" manner. In particular, one line (macro pixel line) of eight bit contone values is applied, via a contone bus 909, into one of the buffers, via a DMA operation supervised by host computer 40 (see FIG. 1), while a line of contone values that have been previously stored in the other buffer is being applied from the latter buffer to the threshold comparator. Once these operations are concluded, the individual buffers reverse their roles for the next incoming line of contone values, and so on for each successive line. As will be discussed and as noted above, screener 30 contains various parameter registers that need to be initialized with appropriate values prior to initiating a screening run. Each of these registers appears as a separate address on address bus 904 shown in FIG. 9. Data for these registers appears on sixteen bit parameter bus 906 which is connected to data bus 903. The lower eight bits of data bus 903 form contone bus 909. Bus decode and interface logic 916 generates appropriate initialization, specifically control, signals over leads 920 to each of the registers for selectively instructing that register to load a value then appearing on the contone bus. In addition, bus decode and interface logic 916 controls, in response to control (i.e. register overflow and terminal count) signals appearing on leads 925, the operation of contone line buffers 916 and also generates appropriate command signals over leads 907 to instruct the host computer to write contone values into an appropriate FIFO within contone line buffers 913.

Image Handler 930, as discussed above, generates the macro pixel address associated with a contone value presently appearing on leads 915, also tracks the address of the current micro pixel being generated within the printed image and provides the control signals appearing on leads 925. Specifically, the image handler contains four register circuits 932, 934, 936 and 938 that respectively track current values of parameters U POSITION, V POSITION, CELL COUNT and LINE COUNT. CELL COUNT register circuit 936 maintains a count (CELL COUNT) of the current macro pixel cell within a macro raster that is presently being screened. LINE COUNT register circuit 938 maintains a count (LINE COUNT) of the current macro raster within the entire image being screened. When the values of LINE COUNT and CELL COUNT reach their respective terminal counts, as specified by appropriate values loaded into these register circuits by host computer 40 (see FIG. 1) during initialization, then the entire image has been screened.

U POSITION and V POSITION register circuits 932 and 934 respectively maintain the current slow scan coordinate (U POSITION) of the current micro pixel raster being produced by the marking engine within a current macro pixel and the fast scan coordinate (V POSITION) of the specific micro pixel being produced on that micro raster. Inasmuch as these two register circuits produce 16 bit values and macro pixels are dimensionally square, both the width and height of a macro pixel are scaled to a maximum integer value of "65,536". Whenever the value of parameter V POSITION reaches its terminal count and register circuit 934 produces an overflow signal (V OVERFLOW) on leads 925 and 935, a macro pixel cell boundary is about to be crossed by a micro raster thereby necessitating that the value of the parameter CELL COUNT must be incremented and the next successive contone value must be supplied by contone line buffers 913 onto leads 915. Whenever the value of parameter CELL COUNT reaches its terminal count, CELL COUNT register circuit 936 produces a terminal count pulse (CELL CTR TC) on leads 925 and 935 to specify that the last macro pixel in the current macro raster is being processed and screening for the current micro raster is to halt after the next overflow produced by V POSITION register circuit 934. Whenever parameter U OVERFLOW reaches its terminal count thereby indicating that the current macro raster line has been just screened, register circuit 932 produces an overflow signal (U OVERFLOW) on leads 925 and 935 to specify that the FIFOs within buffers 916 are to switch functions and generate the next line of contone values over leads 915. At this point, the value of parameter LINE COUNT would be incremented. Once the value of parameter LINE COUNT reaches its terminal value and register circuit 938 produces a terminal count pulse (LINE CTR TC) on leads 935, screening is to halt after the next overflow produced by U POSITION register circuit 932.

The incremental values added to the contents of the U POSITION and V POSITION register circuits are respectively defined as $\Delta U_{REF}$ and $\Delta V_{REF}$ which are determined in accordance with the following equation:

$$\Delta U_{REF} = \Delta V_{REF} = 2^N \frac{R}{r} \qquad (5)$$

where: R is the number of macro rasters/inch in the continuous tone image, here illustratively 300, and equal to twice the screen ruling.

Prior to the initiation of a screening run, host computer 40 (see FIG. 1) calculates the values of these increments and respectively loads these values into U POSITION and V POSITION register circuits 932 and 934. If desired, the values of these incrementes can be changed by host computer 40 during a screening run to dynamically vary the horizontal and/or vertical writing pitches and thereby produce, with properly shaped halftone dots, an anamorphic change in the screened image size. However, it will be assumed hereinafter that these increments remain fixed during a screening run in order to simplify the following discussion.

Control sequencer 940, which is illustratively a programmable logic array (PAL), is connected through leads 935 to the overflow and terminal count signals produced by register circuits 932, 934, 936 and 938. In response to these overflow signals, control sequencer 940 first determines when the end of each micro raster is reached. Once this occurs, the control sequencer will then generate appropriate control signals through leads 935 to: temporarily halt the screening process, instruct the FIFOs in contone line buffers 913 to switch functions whenever a macro raster is crossed, cause appropriate ones of register circuits 932, 934, 936 and 938 to properly increment their contents and finally restart and control the screening process to handle the next micro raster. Leads 925 are connected to corresponding leads within leads 935; as such, U OVERFLOW, V OVERFLOW and CELL COUNT signals appearing on leads 925 are those that appear on leads 935.

Screen Handler 950, as discussed above, keeps track of where to sample a reference cell, i.e. any memory plane in the font memory, by generating a succession of addresses at which a reference cell is to be sampled for each micro raster appearing in the printed image and also selects an appropriate dot font for each separate halftone dot that is to be screened. The screen handler contains X POSITION and Y POSITION register circuits 952 and 960, and pseudo-random number generater 956. X POSITION register circuit 952 and Y POSITION register circuit 960 respectively maintain the current values of parameters X POSITION and Y POSITION. These values are used, as set forth below, as the incremented orthogonal coordinates for the next sampling point in the reference cell. Control sequencer 940 generates appropriate control signals, as described below, over leads 955 to X POSITION and Y POSITION register circuits 952 and 960 to suitably cause each of these circuits to properly increment its contents at the appropriate times during the course of traversing a sampling line.

Pseudo-random number generator 956 generates a four bit pseudo-random value as the FONT SELECT bits and applies this value, via leads 976, to font memory 970. These values, as discussed above, are used, as a partial memory address, to randomly select a particular one of 16 separate different halftone dot fonts to use in producing a current screened halftone dot. The remainder of the memory address, i.e. ten bits, is provided by the five most significant bits of the current contents of X POSITION register circuit 952 and the five most significant bits of the current contents of Y POSITION register circuit 960. These ten bits collectively define a sampling address within the selected font and, as such, are applied over respective leads 972 and 974 as X and Y memory addresses, X ADDR and Y ADDR, respectively. Various bits of the contents of the X POSITION and Y POSITION registers are routed over leads 954 and 958, respectively, to the pseudo-random number generator to control its operation. The resulting stored eight bit threshold value produced by font memory 970 is applied, via leads 978, to one input of threshold comparator 980. The current eight bit contone value appearing on leads 915 is routed to the other input of this comparator. As discussed above, this comparator produces a single output bit having a value dependent upon whether the current contone value for the halftone dot that is presently being screened is greater than, or less than or equal to the accessed threshold value. Inasmuch as the value of this bit forms part of the screened bit-mapped halftone dot that is to be printed by the marking engine, this bit is provided, via lead 37, to marking engine 30.

2. Font Memory 970

As discussed above, font memory 970 contains 16 separate memory planes, one for each separate font pattern in which each plane stores illustratively a 32-by-32 array of eight bit threshold values for that pattern. These patterns, of smooth halftone dots, are all different from each other. Any one of a variety of different patterns can be used.

Figure 10B:
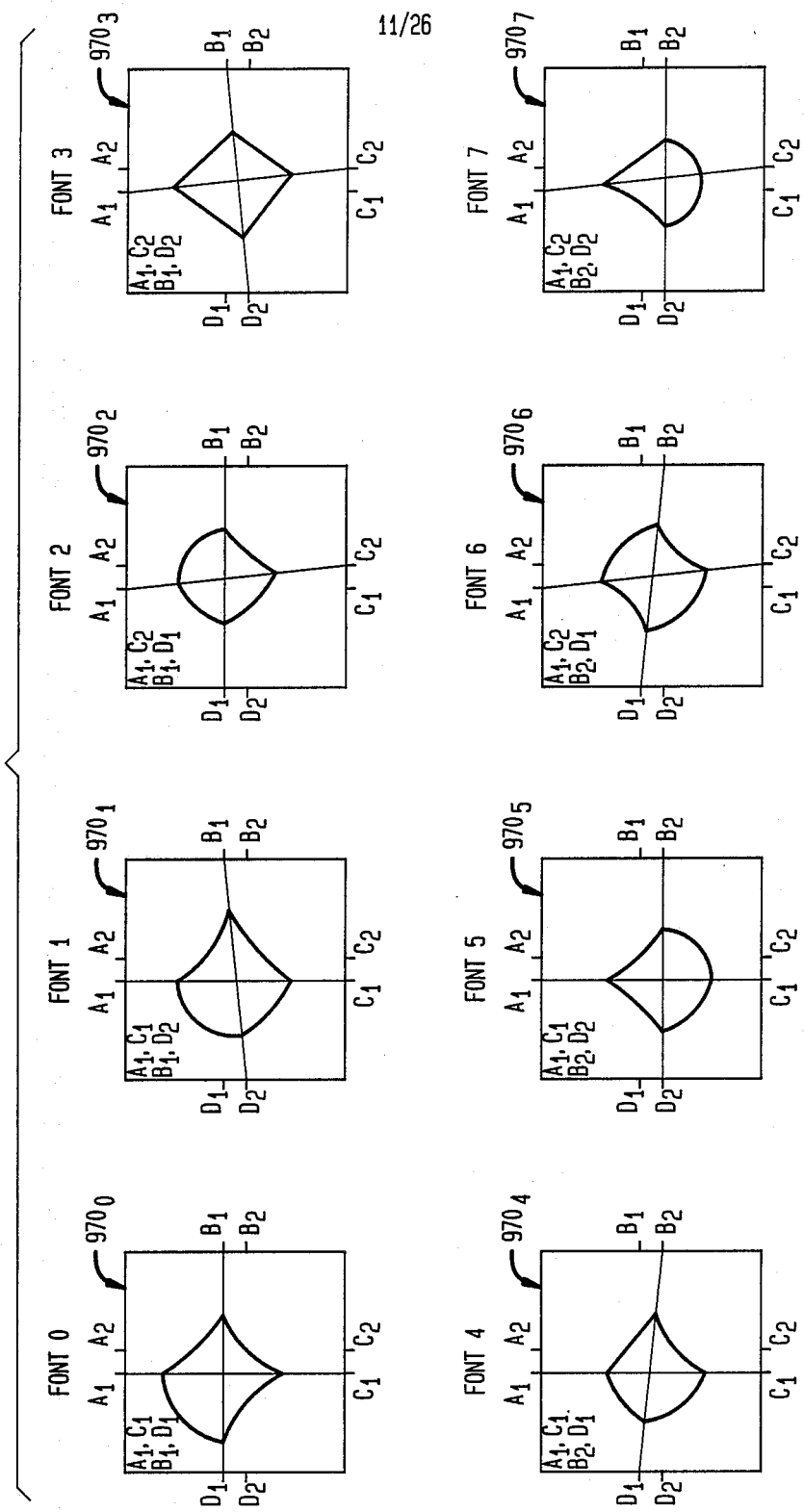
FIGS. 10B and 10C diagrammatically depict sixteen pairs of distorted axes and each corresponding font pattern for a common contone value, all of the font patterns residing, in terms of eight bit threshold values, within font memory 970.
Figure 10C:
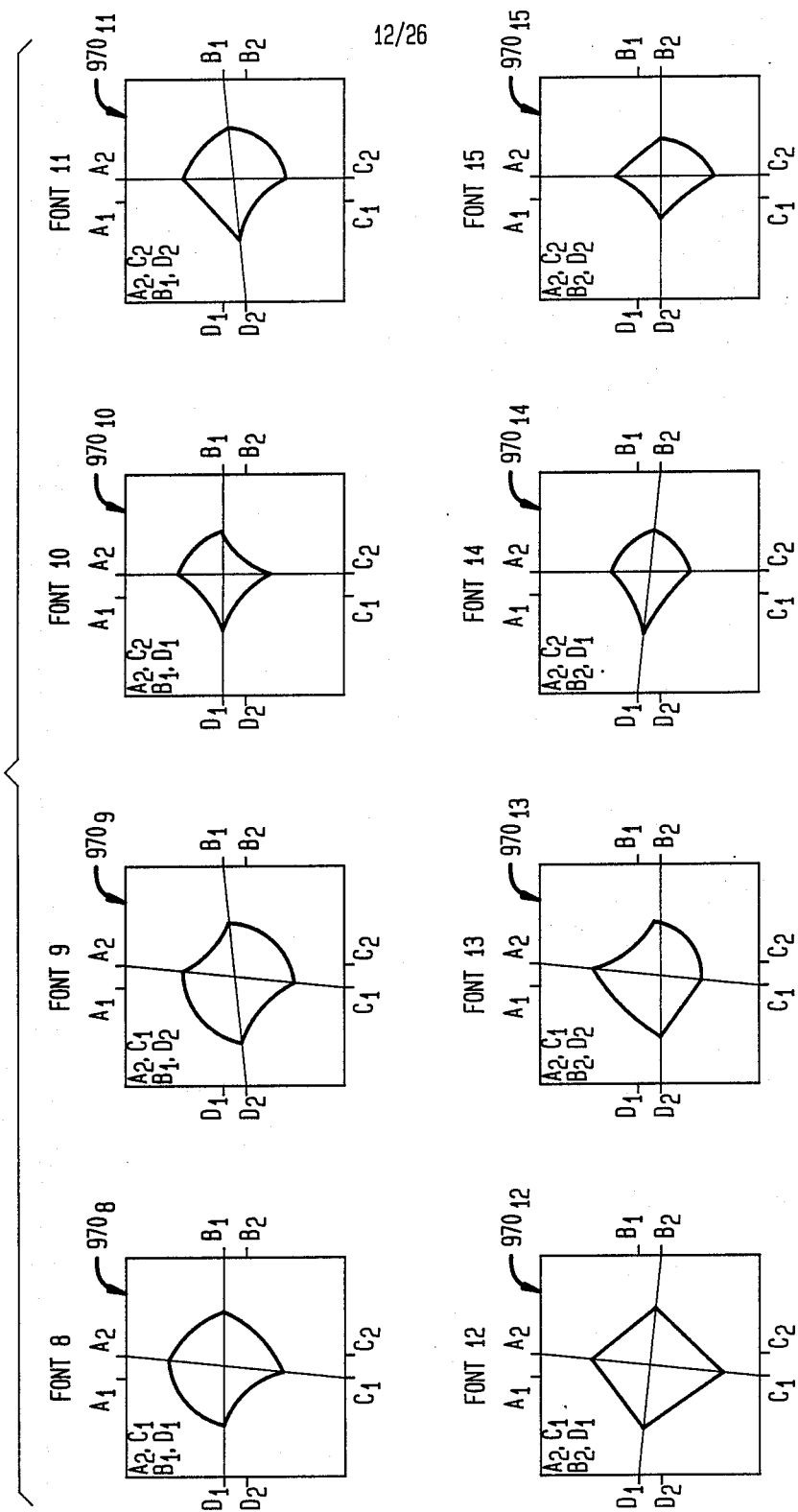
Figure 11B:
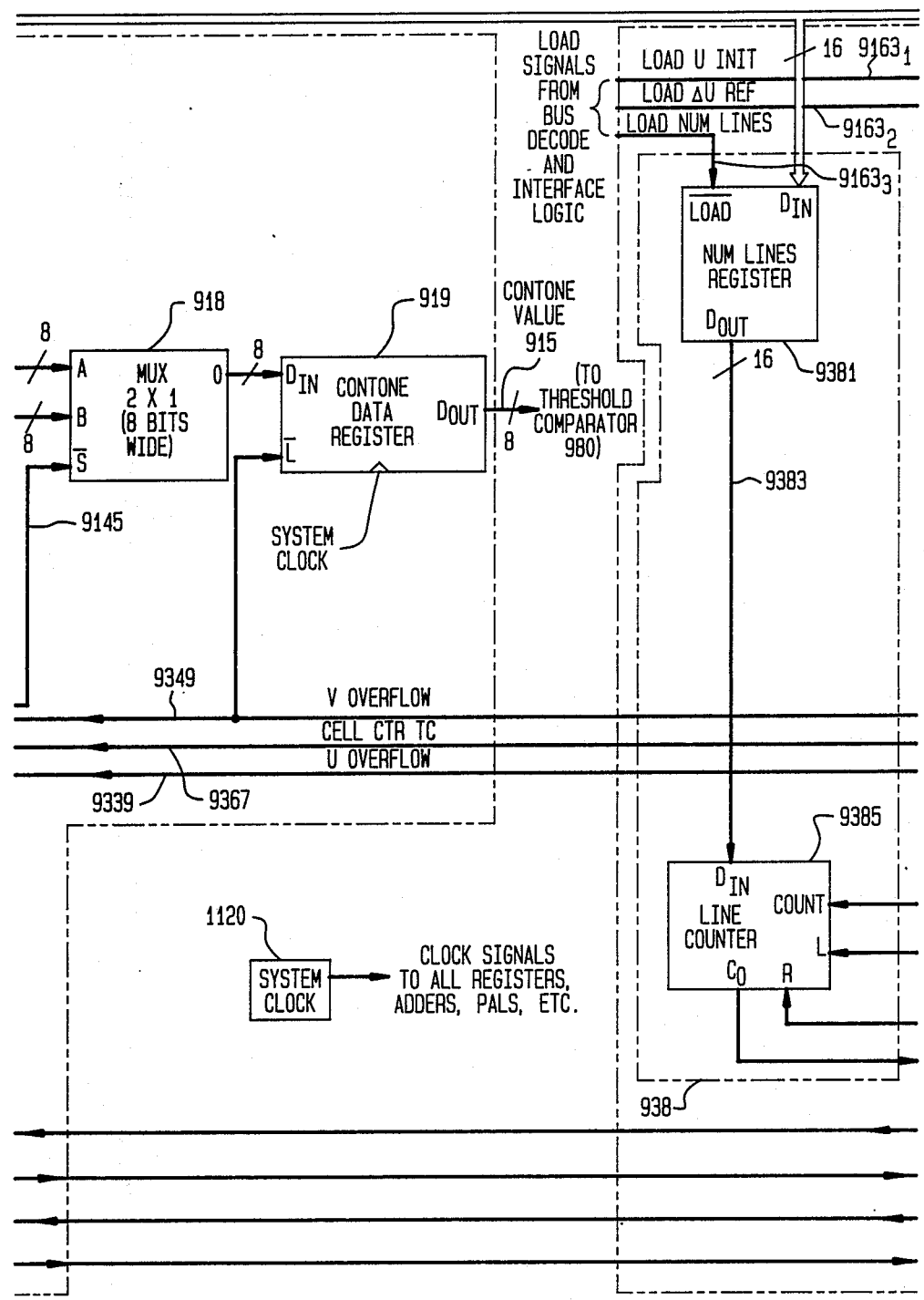
Figure 11C:
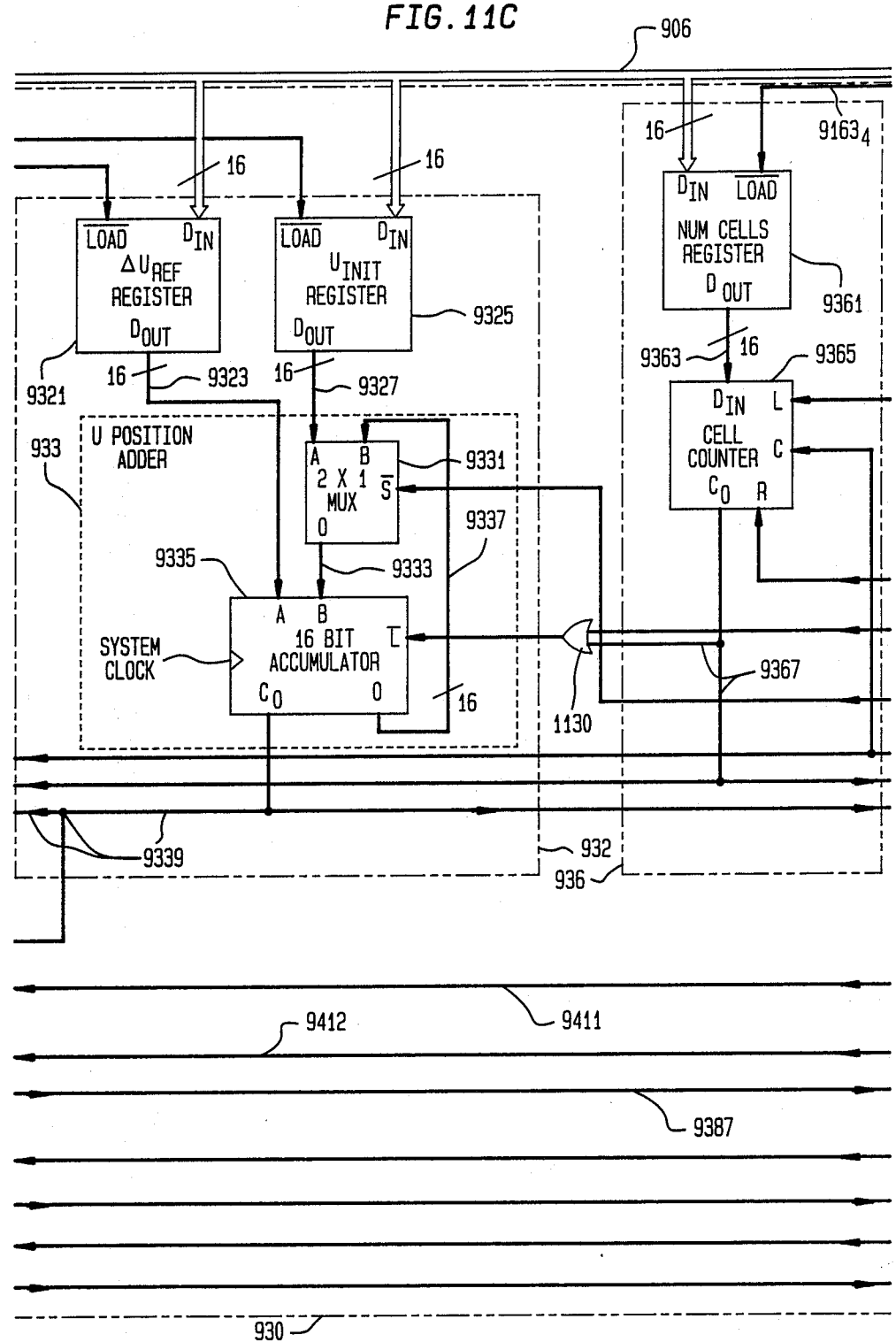
Figure 11D:
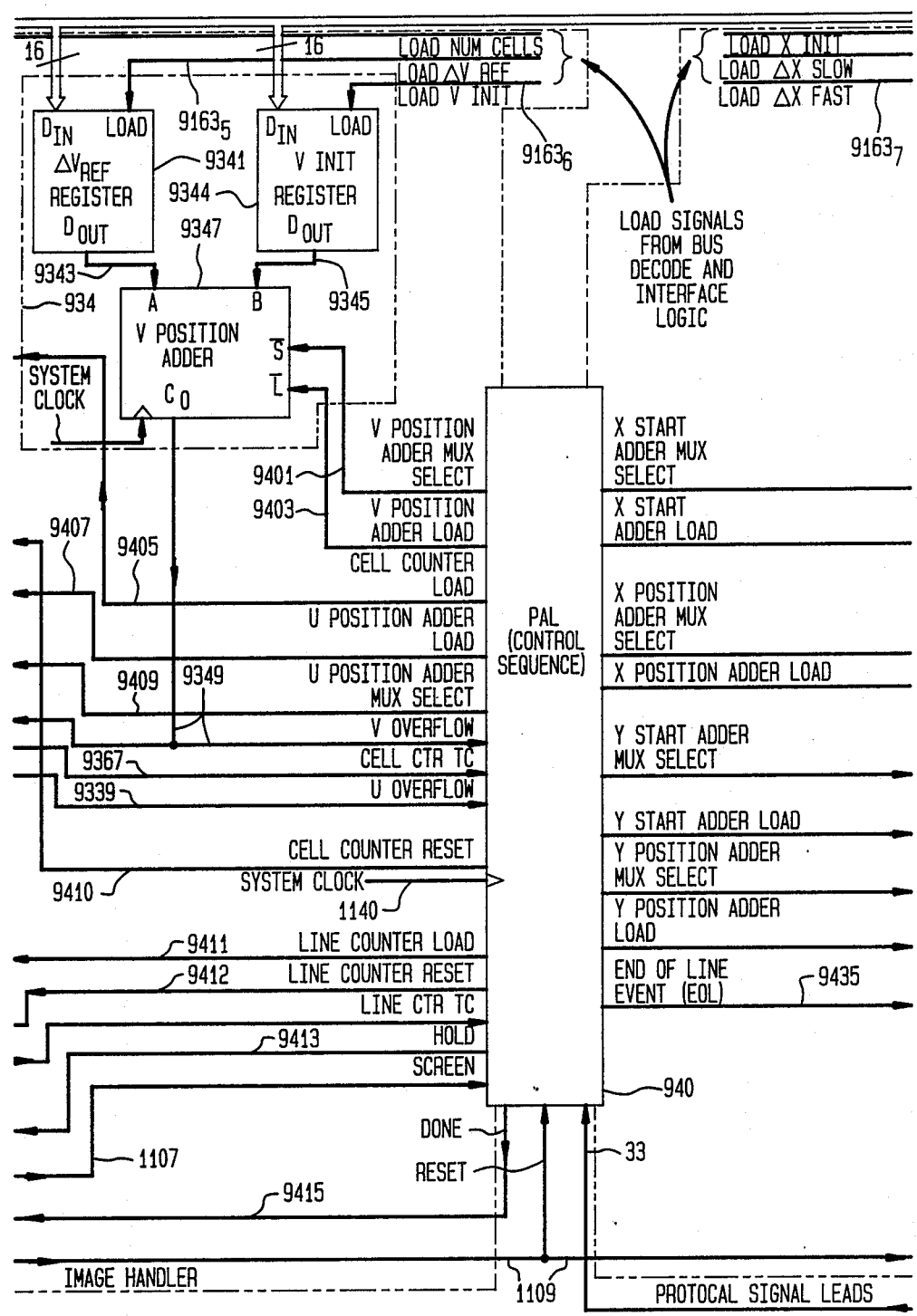
Figure 11E:
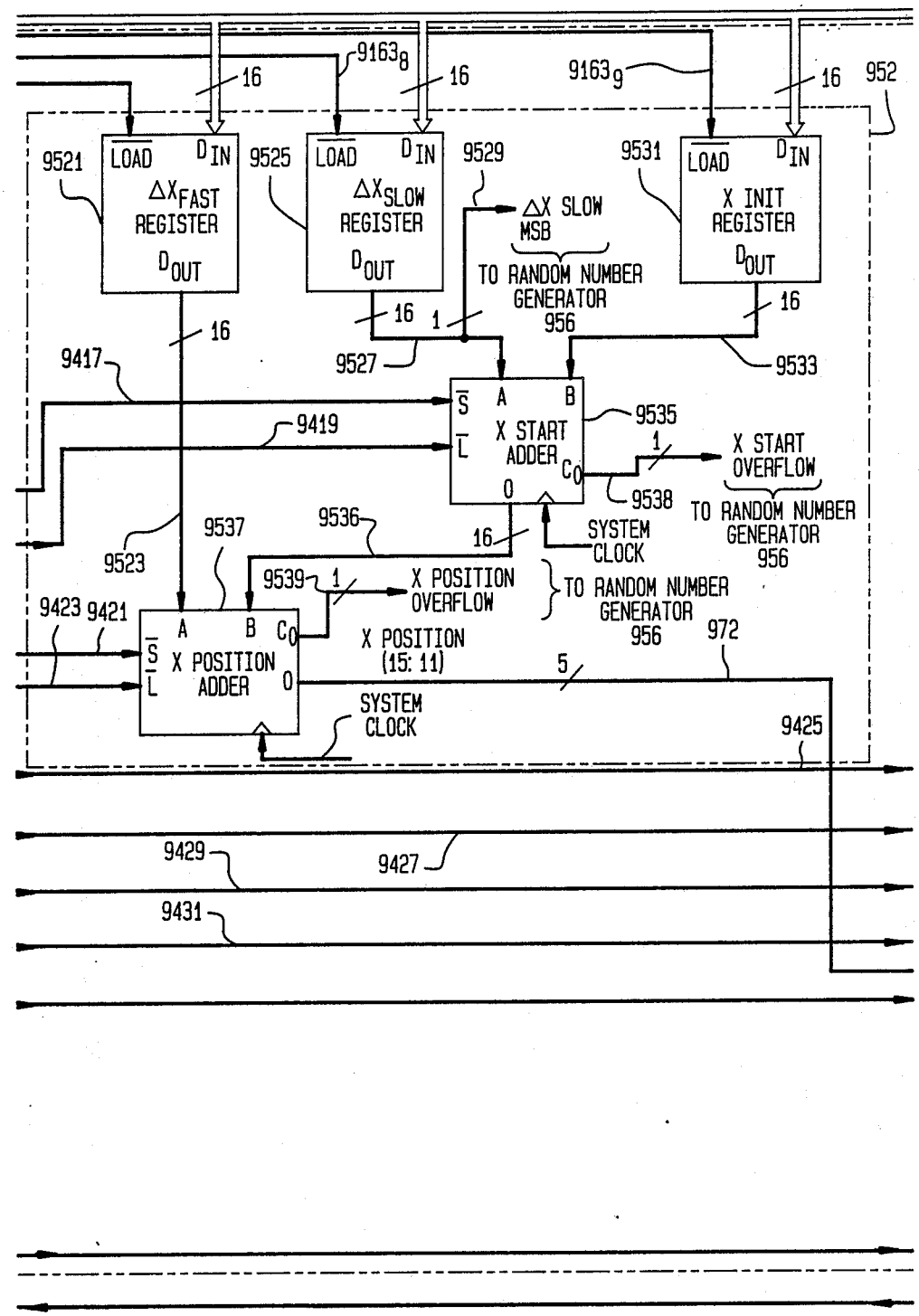
Figure 11F:
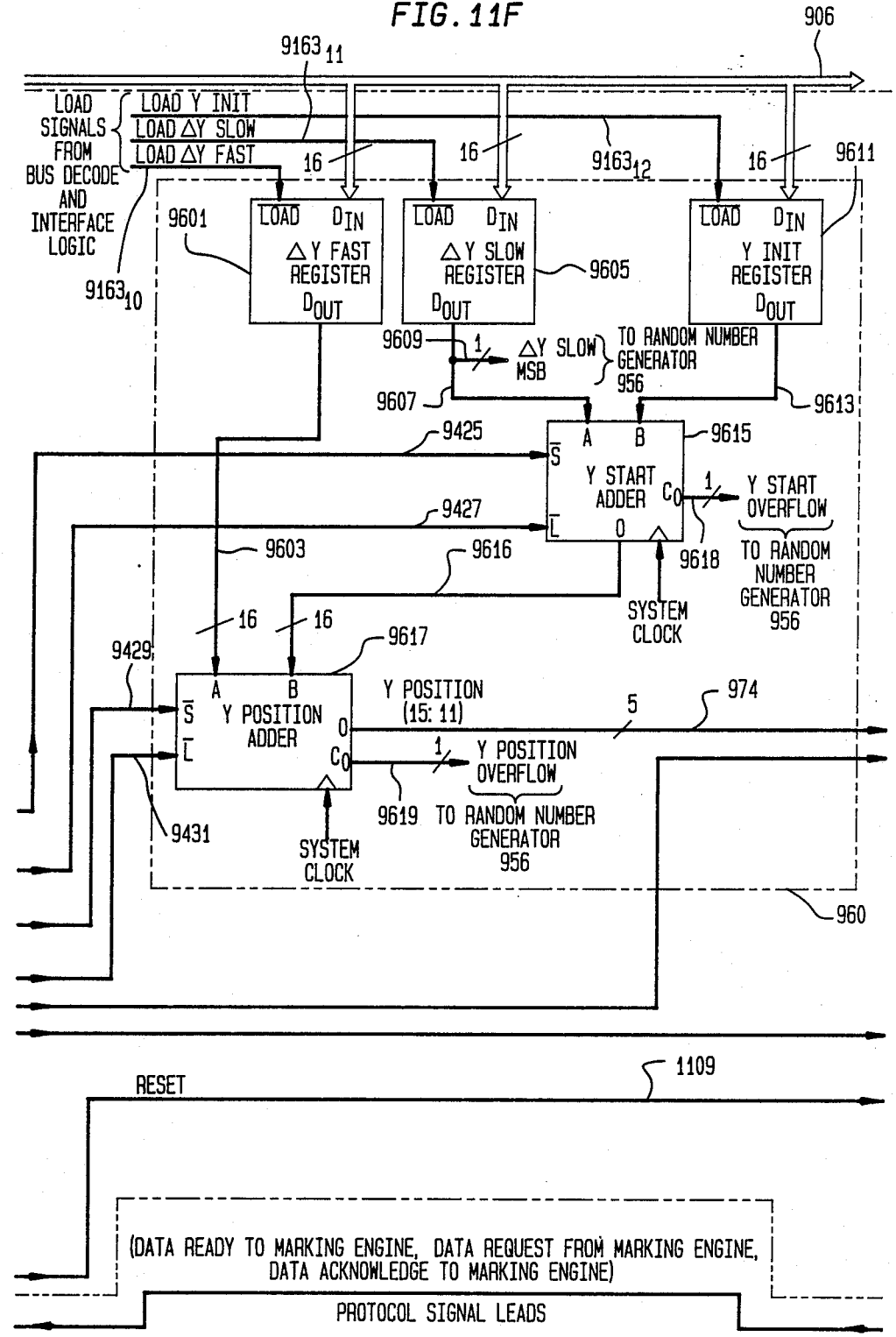
Figure 11G:
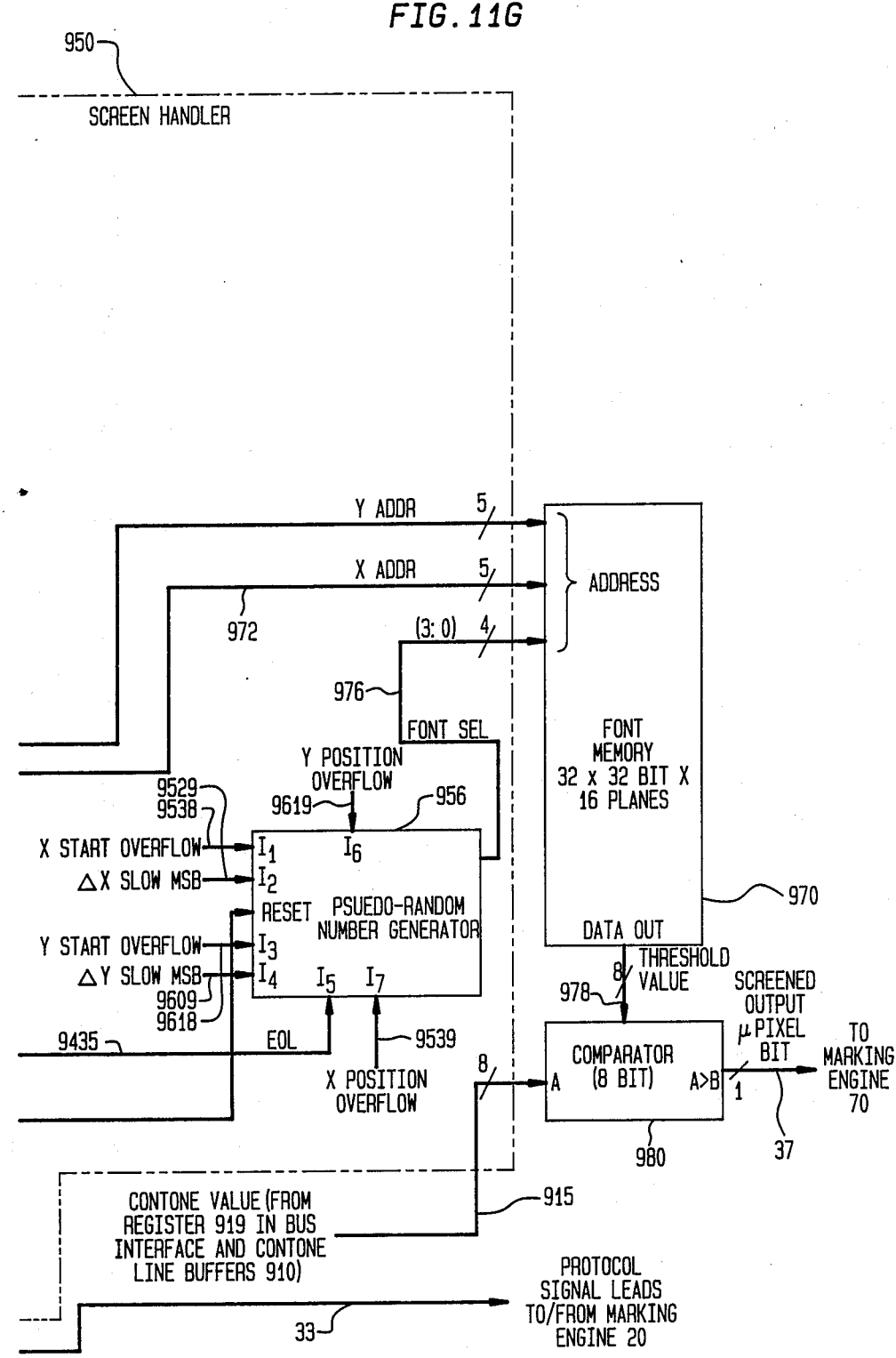

FIG. 10 diagrammatically depicts one method of generating these different font patterns, specifically the axes distortion method, with the resulting patterns for the 16 separate fonts, for a single common contone value, collectively shown in FIGS. 10B and 10C.

In particular, the axes distortiob method relies on conformally mapping an undistorted center weighted halftone dot that corresponds to each different contone value, defined in a two-dimensional space characterized by orthogonal axes mutually centered about their zero points, into a correspondingly different two dimensional space in which the axes are not orthogonal and/or not centered, i.e. they are distorted. The mapped dot is then stored within a corresponding memory plane in terms of eight bit threshold values that define the countour of the mapped dot. Inasmuch as this method is performed in an identical manner for each differently sized center weighted halftone dot, then for purposes of brevity, the following discussion will only address a center weighted halftone dot of one size.

Specifically, halftone cell 1000 contains orthogonal axes 1003 that intersect at their respective zero points to define an origin. This cell contains undistorted center weighted circular halftone dot 1005. As shown in halftone cell 1010, the X and Y axes intersect the boundaries of this cell at end points A and C, and B and D. To appropriately distort these axes in 16 different ways, four pairs of points $A_1$ and $A_2$, $B_1$ and $B_2$, $C_1$ and $C_2$, and $D_1$ and $D_2$ are located along the periphery of the cell. Points $A_1$ and $A_2$ are situated on opposite sides of point A; points $C_1$ and $C_2$ are situated on opposite sides of point C; points $B_1$ and $B_2$ are situated on opposite sides of point B, and points $D_1$ and $D_2$ are situated on opposite sides of point D. All four pairs of points form an area, bounded by the dashed lines, that extends outward from the X and Y axes for a distance illustratively equivalent to the width and height, respectively, of one micro-pixel. As such, distance "c" that occurs either between points $A_1$ and $A_2$, or between points $C_1$ and $C_2$ equals twice the width of a micro pixel. Similarly, distance "b" that occurs either between points $B_1$ and $B_2$, or between points $D_1$ and $D_2$ equals twice the height of a micro pixel.

Sixteen sets of differently distorted axes can then be fabricated by generating every combination of axes in which the X and Y axes collectively connect a different point in each opposing pair of points. For example, in lieu of connecting points A and C, the X axis can be pivoted (rotated) to the right or left, as indicated by arrow 1013, to connect points $A_2$ and $C_1$, or points $A_1$ and $C_2$. Likewise, the X axis can be offset (shifted) to the right or left, as indicated by arrow 1015, by the width of one micro pixel to connect points $A_2$ and $C_2$, or points $A_1$ and $C_1$. Similarly, the Y axis can be pivoted to up or down, as indicated by arrow 1017, to connect points $D_1$ and $B_2$, or points $D_2$ and $B_1$. Likewise, the Y axis can be offset up or down, as indicated by arrow 1019, by the height of one micro pixel to connect points $D_1$ and $B_1$, or points $D_2$ and $B_2$. One such axis distortion in which the X axis has been rotated to the right to connect points $A_2$ and $C_1$ thereby yielding distorted axis X' and the Y axis has been shifted upward to connect points $D_1$ and $B_1$ thereby yielding distorted axis Y' is shown in halftone cell 1020. Undistorted center weighted circular halftone dot 1005 is then conformally mapped into a two-dimensional space defined by distorted X' and Y' axes 1025. Because of the distortion of the axes, center weighted halftone dot 1005, when mapped, distorts into mapped halftone dot 1028a shown in halftone cell 1030. This cell also shows corresponding halftone dots 1028b and 1028c that correspond to smaller contone values than that for halftone dot 1028a. Hence, each halftone dot forms a closed contour with the size of the contour given by the corresponding contone value. One such contour would typically exist for one or more different contone values. to conserve memory requirements, the shape of contour would not be stored in a bit-mapped fashion in the memory plane. Instead, an eight bit threshold value that equals the corresponding contone value for the contour would be stored within the memory plane at each different addressable point along the contour thereby defining the shape of the contour within the halftone dot font by the corresponding memory locations of its threshold values. As such, upwards of 256 separate isometric contous of eight bit threshold values would be stored within the memory plane for any halftone dot font.

The resulting sixteen pairs of distorted axes and each corresponding distorted halftone dot font pattern for a common contone value, all of the font patterns residing, in terms of eight bit threshold values, within font memory 970, are collectively shown in FIGS. 10B and 10C. As shown, font memory 970 contains sixteen different memory planes 970 formed of individual memory planes $970_0$, $970_1$, $970_2$, ..., $970_{15}$ each of which stores threshold values for halftone dot contours for a different corresponding halftone dot font pattern. The four end points, for example $A_1$, $B_1$, $C_1$ and $D_1$ for font 0, that are connected by each pair of distorted axes are also shown for each particular font pattern. For purposes of illustration and specifically to visually accentuate the distortion (which has also been somewhat exaggerated in these figures) introduced into each different halftone dot font pattern, an undistorted center weighted square diamond shaped dot was used in generating each of the distorted dot patterns shown in FIGS. 10B and 10C in lieu of center weighted circular halftone dot 1005 shown in FIG. 10A.

Alternatively, if sufficient memory is available to fabricate the font memory, then, for eight bit contone values, each font could be formed of 256 different memory planes in which each plane stored a bit-mapped halftone distorted dot pattern for a corresponding contone value. With this alternative, the contone value would also be applied, as a partial address, to the font memory in order to select the particular one of the 256 memory planes for use in writing a particularly sized halftone dot. As such, the threshold comparator would not be used, with the font memory itself producing the needed single output bit to the marking engine. While this alternative approach consumes significantly more memory than with a thresholding approach as described above, memory resident bit-mapped fonts provide increased flexibility inasmuch as each font pattern is not limited to having halftone dots that monotonically increase in size with increasing contone values but rather can possess nearly any desired variation. For example, through use of memory resident fonts, a halftone dot profile for any given font can fold back on itself at any desired location(s). As such, a 30% contone value can produce a distorted dot that has an annulus (light central area) within the dot while an 80% value can produce a fully darkened distorted dot. Other distorted dot patterns dictated by a particular printing application can clearly be stored in the reference cells and subsequently produced. For example, pre-defined patterns of "round" distorted dots can be stored within the reference cells for subsequent use in creating borders of constant tonal value.

3. Screener Hardware a. Detailed Block Diagram of Screener 30

A detailed block diagram of the circuitry used in screener 30, shown in FIG. 1, is depicted in FIGS. 11A–11G, for which the correct alignment of the drawing sheets for these figures is shown in FIG. 11.

As shown and discussed above, screener 30 is formed of bus interface and contone line buffers 910, image handler 930, control sequencer 940, screen handler 950, font memory 970 and threshold comparator 980. In addition, screener 30 includes system clock 1120 which provides clock signals to all the clocked components in the screener, e.g. register, adders, counters and programmable logic arrays in order to synchronously control their operation. The system clock frequency is illustratively 18 MHz. The clock signal connections have been omitted from several of these components in order to simplify FIGS. 11A–11G; however, these connections would be readily apparent to those skilled in the art. To simplify the following discussion, the specific temporal operation of the PALs and their associated control states and signals will be not be discussed in detail at this point but will be deferred to the discussion of FIGS. 12A, 12B, 13A and 13B below. In addition to the use of highly efficient pipelined processing to provide very high speed operation, as discussed above, integer math is exclusively used throughout the screener to further increase processing speed.

As discussed previously, the overall purpose of bus interface and contone line buffers 910 is to provide a stream of contone values to threshold comparator 980 in order to generate the appropriate output bits on lead 37 for all the micro pixels that form the screened halftone dots. Bus interface and contone line buffers 910 essentially contain bus decode and interface logic 916, line buffers 913 formed of FIFO arrays 9131 and 9135, DMA Controller 914, eight bit multiplexor 918 and eight bit contone data register 919. As noted, FIFO arrays 9131 and 9135, each of which is illustratively a 4K by 8 bit RAM array, respectively store even and odd lines of incoming eight bit contone values and operate in a "ping-pong" configuration. In operation, as described in detail below in conjunction with FIGS. 12A and 12B, these FIFOs simultaneously write and store a line of incoming contone values from host bus 70. One FIFO writes while the other reads. The specific function provided by each FIFO changes at the conclusion of each macro raster. The operation of the FIFOs is controlled by DMA Controller 914 which is preferably implemented using a programmable array logic (PAL) circuit. Bus decode and interface logic 916 controls the initialization of each of the parameter registers located within the screener and also addresses the specific FIFO into which contone values are to be written by the host computer.

Specifically, screener 30 is interfaced to electronic image processing system 10 (see FIG. 1) through host bus 70. This bus, as shown in FIGS. 11A-11G, contains sixteen bit data bus 903, twenty bit address bus 904, bus command leads 1101, I/O WRITE lead 1115, DMA REQUEST 0 and DMA REQUEST 1 leads 9142 and 9144, DMA ACKNOWLEDGE 0 and DMA ACKNOWLEDGE 1 leads 1103 and 1105, SCREEN command lead 1107, DONE signal lead 9415, and POWER ON (BUS) RESET signal lead 1109. Data bus 903 splits into two busses: the full sixteen bit data bus becomes sixteen bit parameter bus 906 which is connected to a sixteen bit data input ($D_{in}$) of each of the twelve parameter registers, and the low order eight bits of the data bus becomes contone bus 909 which is connected to the eight bit data input of each of the FIFOs.

Prior to initiating a screening run, as discussed below, the host computer will initialize one or more of the parameter registers. In addition, during initialization, the host computer will write the first line of contone values into FIFO 9135. However, subsequently, during a screening run, the host computer will only write complete lines of contone values into alternate FIFOs and will generally not change the values stored in any of the parameter registers unless a dynamic change in horizontal and/or vertical writing pitch or screen angle is desired, as discussed above. Now, in general, to initialize any such parameter register or write contone data into either FIFO, the host computer will first apply an appropriate initialize command, that specifies a parameter register or FIFO load operation, onto bus command leads 1101. This command is then routed to bus decode and interface logic 916. Simultaneously therewith, the host computer will also supply an appropriate address onto address bus 904 to identify the esired FIFO or parameter register into which new data is to be written. Thereafter, the host computer will apply the desired data onto data bus 903 and a negative going write pulse to I/O WRITE lead 1115 thereby causing the data to be written into the desired FIFO or parameter register. Specifically, in response to both the initialize command and the address supplied by the host computer, logic 916 first acknowledges their receipt to the host computer by issuing a suitable command acknowledge signal onto lead 9162. Substantially coincident with this acknowledge signal, logic 916 places a low level on a corresponding one of active low select leads 9165. The specific lead that is asserted low is governed by the address then appearing on the address bus. Each lead within select leads 9165, specifically leads (Sel1 not) $9165_1$, (Sel2 not) $9165_2$, (Sel3 not) $9165_3$, (Sel4 not) $9165_4$, . . . , (Sel4 not) $9165_{14}$, is correspondingly connected to an input of OR gate 9168 for FIFO 9135, OR gate 9167 for FIFO 9131, or to an input of OR gates $9160_1$, $9160_2$, $9160_3$, . . . , $9160_{12}$, the latter twelve OR gates collectively forming OR gates 9160. The I/O WRITE signal appearing on lead 1101 is applied, via lead 1115, to the other input of each of these fourteen OR gates. The outputs of OR gates 9167 and 9168 are routed to active low write inputs of FIFOs 9131 and 9135, respectively, to control the writing of contone data into each of these FIFOs. The output of each of OR gates 9160 is routed over a corresponding one of leads 9163 to an active low load input of a corresponding parameter register: LOAD U INIT lead $9163_1$ for U INIT register 9325, LOAD $\Delta U_{REF}$ lead $9163_2$ for $\Delta U_{REF}$ register 9321, LOAD NUM LINES lead $9163_3$ for NUM LINES register 9381; LOAD NUM CELLS lead $9163_4$ for NUM CELLS register 9361; LOAD $\Delta V_{REF}$ lead $9163_5$ for $\Delta V_{REF}$ register 9341; LOAD V INIT lead $9163_6$ for V INIT register 9344; LOAD $\Delta X_{FAST}$ lead $9163_7$ for $\Delta X_{FAST}$ register 9521; LOAD $\Delta X_{SLOW}$ lead $9163_8$ for $\Delta X_{SLOW}$ register 9525; LOAD X INIT lead $9163_9$ for X INIT register 9531; LOAD $\Delta Y_{FAST}$ lead $9163_{10}$ for $\Delta Y_{FAST}$ register 9601; LOAD $\Delta Y_{SLOW}$ lead $9163_{11}$ for $\Delta Y_{FAST}$ register 9605, and LOAD Y INIT lead $9613_{12}$ for Y INIT register 9611. Now, once a particular select lead is asserted low, the host computer will apply both the desired data value onto data bus 903 and an negative going pulse to I/O WRITE lead 1115 thereby writing the contone value or initialization value into the selected FIFO or parameter register, respectively. This process is repeated for each separate data value, whether contone value or initial parameter value, that is being supplied to the screener.

To control the read operation performed by the FIFOs, DMA Controller 914 utilizes as input the status of the V OVERFLOW signal appearing on lead 9349, the CELL CTR TC pulse appearing on lead 9367, the U OVERFLOW signal appearing on lead 9339 and the HOLD signal appearing on lead 9413. In response to the status of these signals, DMA Controller 914 will control which specific FIFO is to read contone data at any given time during a screening run. To read data from FIFO 9131 or 9135, PAL 914 supplies appropriate READ and RETRANSMIT control signals to that FIFOs, specifically READ EVEN and RETRANSMIT EVEN signals, via leads 9141 and 9143, to even FIFO 9131 or READ ODD and RETRANSMIT ODD, via leads 9149 and 9147, to odd FIFO 9135. Now, to specify which specific FIFO is to receive contone information during a screening run, via a DMA process controlled by host computer 40, DMA Controller 914 provides a high level on DMA REQUEST 0 lead 9142 if contone data is to be written into FIFO 9131 or a high level on DMA REQUEST 1 lead if contone data is to be written into FIFO 9135. Corresponding DMA acknowledge signals are provided by the host computer over DMA ACKNOWLEDGE 0 lead 1103 or DMA ACKNOWLEDGE 1 lead 1105. The temporal operation of the READ, RETRANSMIT and DMA REQUEST and DMA ACKNOWLEDGE signals is discussed in detail below in conjunction with FIGS. 12A and 12B which shows the state diagrams implemented within DMA Controller 914.

The contone values provided by the FIFOs are routed over leads 9133 for FIFO 9131 and leads 9137 for FIFO 9135 to respective inputs of 2-by-1 eight bit multiplexor 918. In response to the level of a BANK SELECT signal (also discussed in detail below in conjunction with FIGS. 12A and 12B) appearing on lead 9145 and produced by PAL 914. The level of this signal specifies which FIFO is being read at any given time during a screening run. In response to this signal, the multiplexor routes a eight bit contone value produced by one of the FIFOs to the data inputs of eight bit register 919. The resulting contone value is then loaded into this register at the occurrence of the next V OVERFLOW signal and hence, in turn, supplied over leads 915 as one input (the "A" input) to eight bit threshold comparator 980 for use in screening the macro pixel associated with this contone value.

As discussed above, dot gain compensation is provided by the marking engine. Alternatively, this compensation can be implemented by inserting either a random access or read only memory (not shown but hereinafter referred to as the dot gain memory) in series between multiplexor 918 and register 919 or between this register and font memory 970. The dot gain memory would store one or more pre-defined tables of dot sizes. A desired table would be addressed by the contone value in the separation and would provide a corresponding contone value that has been compensated by a desired amount of dot gain. Each table could provide compensation for a different dot gain profile or a different fixed dot gain value. The particular table could be selected by appropriate signals provided by another parameter register (not shown) that is loaded by the host computer during initialization. As such, during a screening run, the dot gain memory would appropriately modify, typically reduce, through a separate table look-up operation each contone value that will be supplied to the font memory by an associated dot gain value.

As discussed, image handler 930 generates the macro pixel address associated with a contone value presently appearing on leads 915, tracks the address of the current micro pixel being generated within the printed image and generates the V OVERFLOW, U OVERFLOW, CELL CTR TC and LINE CTR TC signals. Specifically, the image handler contains U POSITION register circuit 932, V POSITION register circuit 934, CELL COUNT register circuit 936 and LINE COUNT register circuit 938 that respectively track current values of parameters U POSITION, V POSITION, CELL COUNT and LINE COUNT.

LINE COUNT register circuit 938 contains sixteen bit register 9381 and counter (LINE COUNTER) 9385. The purpose of LINE COUNT register circuit 938 is to track the number of macro rasters that have been screened in the current image and provide a pulse after the last macro raster has been screened. Specifically, register 9381 is loaded during initialization by host computer 40 (see FIG. 1) and via parameter bus 906 with the number of macro rasters, i.e. the value of parameter NUM LINES, that will exist in a screened image. This value will remain in this register and appear at data outout ($D_{OUT}$) lines 9383 until subsequently changed by the host computer. Shortly after a screening run begins and before actual screening occurs, Control Sequencer 940, as described in detail below in conjunction with FIGS. 13A and 13B, aapplies a pulse on LINE COUNTER LOAD lead 9411 which causes the NUM LINES value to be loaded as a terminal count value into counter 9385. This counter contains an internal counter (not shown) which is incremented with every U OVERFLOW pulse applied, via lead 9339, to the COUNT input of counter 9385. Whenever the contents of the internal counter reach the terminal count (NUM LINES) value, i.e. which occurs after the last macro raster in the image has been screened, counter 9385 will produce a line counter terminal count (LINE CTR TC) pulse at its Carry Out ($C_O$) output which, is connected, via lead 9387, to an input of Control Sequencer PAL 940. The internal count is reset (cleared) to zero whenever the Control Sequencer applies a suitable LINE COUNTER RESET pulse to lead 9412.

U POSITION register circuit 932 contaians $\Delta U_{REF}$ register 9321, U INIT register 9325 and U POSITION adder 933. The purpose of U POSITION register circuit is to track the current location of a micro raster within a macro raster and with respect to the slow scan, illustratively vertical, direction. Specifically, during initialization, register 9321 is loaded by host computer 40 (see FIG. 1) and via parameter bus 906 with the value of parameter $\Delta U_{REF}$ which represents the scaled incremental distance occurring between successive micro rasters, in the slow scan direction within any macro pixel in a screened image. In addition, during initialization, register 9325 is loaded with the scaled location, i.e. the value of parameter U INIT, of the top of the macro raster. Inasmuch as the relative position is maintained to a 16 bit resolution, the height of a macro pixel is scaled to the decimal value "65,536". The value of parameters U INIT and V INIT are equal and given by the following equation:

$$U \text{ INIT} = V \text{ INIT} = 2^{N-1}\frac{R}{r} \qquad (6)$$

with coefficients, N, R and r having the values defined above.

U POSITION adder 933 is a registered adder which contains 2 by 1 sixteen bit multiplexor 9331 and sixteen bit accumulator 9335. Multiplexor 9331, in response to the level of a select signal, specifically the U POSITION ADDER MUX SELECT signal appearing on lead 9407 and produced by Control Sequencer 940, will route either the contents of U INIT register 9325 appearing on leads 9327 or the current output of the accumulator appearing on leads 9337 to one input, specifically input B, of the accumulator. The other input, i.e. input A, of the accumulator is connected, via leads 9323, to the data output of $\Delta U_{REF}$ register 9321. Upon receipt of a suitable pulse appearing on the active low LOAD input to the accumulator, the accumulator will add the inputs appearing at its inputs, store the resultant sum in an internal register and apply the sum to its data output pins and therethrough to leads 9337. In this manner, by suitable pulses applied by the Control Sequencer, as discussed below, to the select and load inputs to the adder, the resultant sum produced by the adder, i.e. U POSITION, is initialized during initialization and is then appropriately incremented with each successive micro raster appearing therein. Since V POSITION adder 9347, X START adder 9535, X POSITION adder 9537, Y START adder 9615 and Y POSITION adder 9617 all have substantially the same internal structure as U POSITION adder 933, these five former adders will not be discussed in detail.

Now, whenever accumulator 9335 overflows, i.e. when a micro raster crosses a macro raster boundary in the slow scan direction, the accumulator produces a resultant pulse at its carry out output. This pulse is the U OVERFLOW signal and is connected, via lead 9339 to Control Sequencer 940, to the count input of LINE COUNTER 9385 and to an input of DMA Controller PAL 914. U POSITION adder 933 is loaded by a pulse produced by OR gate 1130 and applied to the load (here "L not") input of accumulator 9335. This gate, with its inputs connected to leads 9367 and 9407, will produce the pulse as the result of either an overflow pulse (CELL CTR TC) produced by CELL COUNT register circuit 936 and appearing on lead 9367 or a U POSITION ADDER LOAD signal appearing on lead 9407 and produced by Control Sequencer PAL 940.

NUM CELLS register circuit 936 contains sixteen bit register 9361 and counter (CELL COUNTER) 9365. The purpose of CELL COUNT register circuit 936 is to track the number of contone values (or macro pixels) that have been screened in a current macro raster and provide a pulse after the last macro pixel in the macro raster has been screened. Specifically, register 9361 is loaded during initialization by host computer 40 (see FIG. 1) and via parameter bus 906 with the number of macro pixels, i.e. the value of parameter NUM CELLS, that will exist across any macro raster in a screened image. This value will remain in this register and appear at data output ($D_{OUT}$) lines 9363 until subsequently changed by the host computer. Shortly after a screening run begins and before actual screening occurs, Control Sequencer 940, as described in detail below in conjunction with FIGS. 13A and 13B, applies a pulse on CELL COUNTER LOAD lead 9405 which causes the NUM CELLS value to be loaded as a terminal count value into counter 9365. This counter contains an internal counter (not shown) which is incremented with every V OVERFLOW pulse applied, via lead 9349, to the COUNT input of counter 9365. Whenever the contents of the internal counter reach the terminal count (NUM CELLS) value, i.e. which occurs after the last macro pixel in a macro raster has been screened, counter 9365 will produce a cell counter terminal count (CELL CTR TC) pulse at its carry out ($C_O$) output which, is connected, via lead 9367, to an input of OR gate 1130, to an input of DMA Controller PAL 914 and to an input of Control Sequencer PAL 940. The internal count is reset (cleared) to zero whenever the Control Sequencer applies a suitable CELL COUNTER RESET pulse to lead 9410.

V POSITION register circuit 934 contains $\Delta V_{REF}$ register 9341, V INIT register 9344 and V POSITION adder 9347. The purpose of V POSITION register circuit is to track the current location of a micro pixel on a micro raster located within a macro raster and with respect to the fast scan, illustratively horizontal, direction. Specifically, during initialization, register 9341 is loaded by host computer 40 and via parameter bus 906 with the value of parameter $\Delta V_{REF}$ which represents the scaled incremental distance in the fast scan direction occurring between adjacent micro pixels located on a micro raster and within a macro pixel. In addition, during initialization, register 9344 is loaded with the scaled location, i.e. the value of parameter V INIT, of the beginning of a micro raster within any macro pixel. Inasmuch as the relative position is maintained to a 16 bit resolution, the width of a macro pixel is scaled to the decimal value "65,536". The value of parameter V INIT is given by equation (6) above. The values of parameters $\Delta V_{REF}$ and V INIT are applied from registers 9341 and 9344, via respective leads 9343 and 9345, to corresponding A and B inputs of V POSITION adder 9347. Through application of suitable pulses from the Control Sequencer, as discussed below, to the select and load inputs to the V POSITION adder, via V POSITION ADDER MUX SELECT lead 9401 and V POSITION ADDER LOAD lead 9403, respectively, the resultant sum produced by the adder, i.e. V POSITION, is initialized during initialization and thereafter at the beginning of every micro raster as it crosses a macro pixel boundary and is then appropriately incremented with each successive micro pixel located on the micro raster and existing within the macro pixel.

Now, whenever V POSITION adder 9347 overflows, i.e. a micro pixel crosses a macro raster boundary in the fast scan direction, adder 9347 produces a resultant pulse at its carry out output. This pulse is the V OVERFLOW signal and is connected, via lead 9349, to Control Sequencer PAL 940, to the count input of CELL COUNTER 9365 and to an input of DMA Controller PAL 914.

Control Sequencer 940, as noted above, first determines when the end of each micro raster is reached. Once this occurs, the control sequencer generates appropriate control signals through leads 935 (see FIG. 9): to temporarily halt the screening process, whenever a macro raster is crossed in the slow scan direction, and thereafter instruct the FIFOs in contone line buffers 913 to switch functions, to cause appropriate ones of register circuits 932, 934, 936 and 938 (see FIGS. 11A–11G) to properly increment their contents and finally restart and to control the screening process to handle the next micro raster. While screening occurs, control sequencer 940 generates appropriate control signals to X POSITION and Y POSITION register circuits 952 and 960 located within screen handler 950 to suitably cause each of these circuits to properly increment its contents at the appropriate times. In particular, Control Sequencer 940 is, as noted, implemented with a programmable array logic circuit that has been suitably programmed to implement pre-defined logical state transitions that relate the status of the signals applied to its various inputs to the desired signals to be produced at its outputs. These state transitions and accompanying required input signals and associated resulting output signals will be discussed below conjunction with FIGS. 13A and 13B. The inputs provided to the control sequencer include: the V OVERFLOW signal appearing on lead 9349, the CELL CTR TC signal appearing on lead 9367, the U OVERFLOW signal appearing on lead 9339, the system clock signals appearing on lead 1140, the LINE CTR TC signal appearing on lead 9387, the SCREEN command appearing on lead 1107, the POWER ON (BUS) RESET signal appearing on lead 1109 and a DATA REQUEST lead (not shown) that forms part of protocol leads 33. The output signals generated by the control sequencer include: the V POSITION ADDER MUX SELECT signal appearing on lead 9401, the V POSITION ADDER LOAD signal appearing on lead 9403, the CELL COUNTER LOAD signal appearing on lead 9405, the U POSITION ADDER LOAD signal appearing on lead 9407, the U POSITION ADDER MUX SELECT signal appearing on lead 9409, CELL CTR RESET signal appearing on lead 9410, the LINE COUNTER LOAD signal appearing on lead 9411, the LINE COUNTER RESET signal appearing in lead 9412, the HOLD signal appearing on lead 9413, the DONE signal appearing on lead 9415, the X START ADDER MUX SELECT signal appearing on lead 9417, the X START ADDER LOAD signal appearing on lead 9419, the X POSITION ADDER MUX SELECT signal appearing on lead 9421, the X POSITION ADDER LOAD signal appearing on lead 9423, the Y START ADDER MUX SELECT signal appearing on lead 9425, the Y START ADDER LOAD signal appearing on lead 9427, the Y POSITION ADDER MUX SELECT signal appearing on lead 9429, the Y POSITION ADDER LOAD signal appearing on lead 9431 and DATA READY and DATA ACKNOWLEDGE signals (not shown) that form part of protocol leads 33. In addition, the control sequencer also generates a pulse on lead 9435 at the end of every micro raster as an END OF LINE (EOL) event for use by pseudo-random number generator 956. The connection of lead 9434 to each of the registers has been omitted from FIGS. 114-11G in order to simplify these figures.

As noted above, screen handler 950 keeps track of where to sample a reference cell by generating a succession of addresses at which a reference cell is to be sampled along a sampling line for each micro raster appearing in the printed image. Since each font is completely stored within one corresponding memory plane as an array of eight bit threshold values that collectively defines each differently sized halftone dot that forms the font, each memory plane can be viewed as a reference cell. The screen handler contains X POSTION and Y POSITION register circuits 952 and 960 and four bit pseudo-random number generator 956. X POSITION register circuit 952 and Y POSITION register circuit 960 respectively maintain the current values of parameters X POSITION and Y POSITION. These values are used as the incremented orthogonal coordinates for the next sampling point in the reference cell. Appropriate initial values are located into the parameter registers within screen handler 950 during initialization and can be dynamically changed, if desired, during a screening run by host computer 40 to alter the screen angle. Dynamically changing the screen angle is not recommended inasmuch as doing so may disadvantageously introduce artifacts into a resulting screened halftone image. Hence, for that reason and for simplification, the following discussion will assume that the screen angle remains fixed during any screening run.

X POSITION register circuit 952 contains $\Delta X_{FAST}$ register 9521, $\Delta X_{SLOW}$ register 9525 and X INIT register 9531. During initialization, registers 9521 and 9525 are loaded by host computer 40 and via parameter bus 906 with the value of parameters $\Delta X_{FAST}$ and $\Delta X_{SLOW}$ which represent the incremental X coordinate distances in the fast and slow scan directions, respectively, that are to occur between successive sampling points. In addition, during initialization, register 9531 is loaded with the location, i.e. the value of parameter X INIT, along a reference cell boundary of the beginning of the current sampling line. The value of parameters X INIT and Y INIT are equal and given by the following equation:

$$X\ INIT = Y\ INIT = 2^{N-n-1} \quad (7)$$

where:
n equals the number of bits, here five, in one direction of the reference cell address and
N has the value defined above.

The values of parameters $\Delta X_{SLOW}$ and X INIT are applied from registers 9525 and 9531, via respective leads 9527 and 9533, to corresponding A and B inputs of X START adder 9535. Through application of suitable pulses from the Control Sequencer, as discussed below, to the select and loads inputs to the X START adder, via X START ADDER MUX SELECT lead 9417 and X START ADDER LOAD lead 9419, respectively, the resultant sum produced by the adder, i.e. X START, is initialized during initialization and is thereafter incremented to reflect the beginning, in terms of the X direction, of each successive sampling line for the current micro raster. The value of X START is applied over leads 9536 to input B of X POSITION adder 9537. The value of parameter $\Delta X_{FAST}$ is applied, via leads 9523 emanating from register 9521, to the other input, i.e. the A input, to adder 9537. Through application of suitable pulse from the Control Sequencer, as discussed below, to the select and load inputs to X POSITION adder 9537, via X POSITION ADDER MUC SELECT lead 9421 and X POSITION ADDER LOAD lead 9423, respectively, the resultant sum produced by the adder, i.e. X POSITION, is initialized during initialization, set to reflect the beginning of each new sampling line and then successively incremented to reflect the X coordinate of each successive sampling point on the current sampling line. The upper five bits of the X POSITION value generated by X POSITION adder 9537 are applied over leads 972 as a partial sampling address, i.e. X ADDR, to font memory 970. The overflow bits (carry out, $C_0$) produced by X START adder 9535 and X POSITION adder 9537 are routed over single bit leads 9538 and 9539, respectively, to appropriate inputs of pseudo-random number generator 956 for use in controlling its operation. In addition, the pseudo-random number generator also requires the value of the most significant bit (MSB) of the parameter $\Delta X_{SLOW}$. As such, the value of this bit is routed from $\Delta X_{SLOW}$ register 9525, via leads 9527 and 9529, to the pseudo-random number generator.

Y POSITION register circuit 960 contains $\Delta Y_{FAST}$ register 9601, $\Delta Y_{SLOW}$ register 9605 and INIT register 9611. During initialization, registers 9601 and 9605 are loaded by host computer 40 an via parameter bus 906 with the value of parameters $\Delta Y_{FAST}$ and $\Delta Y_{SLOW}$ which represent the incremental Y coordinate distance in the fast and slow scan directions, respectively, that is to occur between successive sampling points. In addition, during initialization, register 9611 is loaded with the location, i.e. the value of parameter Y INIT, along a reference cell boundary of the beginning of the current sampling line. The value of parameter Y INIT is given by equation (7) above.

The values of parameters $\Delta Y_{SLOW}$ and Y INIT are applied from registers 9605 and 9611, via respective leads 9607 and 9613, to corresponding A and B inputs of Y START adder 9615. Through application of suitable pulses from the Control Sequencer, as disussed below, to the select and load inputs to the Y START adder, via Y START ADDER MUX SELECT lead 9425 and Y START ADDER LOAD lead 9427, respectively, the resultant sum produced by the adder, i.e. Y START, is initialized during initialization and is thereafter incremented to reflect the beginning, in terms of the Y direction, of each successive sampling line for the current micro raster. The value of Y START is applied over leads 9616 to input B of Y POSITION adder 9617. The value of parameter $\Delta Y_{FAST}$ is applied, via leads 9603 emanating from register 9601, to the other input, i.e. the A input, to adder 9617. Through application of suitable pulses from the Control Seqencer, as discussed below, to the select and load inputs to Y POSITION adder 9617, via Y POSITION ADDER MUX SELECT lead 9429 and Y POSITION ADDER LOAD lead 9431, respectively, the resultant sum produced by the adder, i.e. Y POSITION, is initialized during initialization, set to reflect the beginning of each new sampling line and then successively incremented to reflect the Y coordinate of each successive sampling point on the current sampling line. The upper five bits of the Y POSITION value generated Y POSITION adder 9617 are applied over leads 974 as a partial sampling address, i.e. Y ADDR, to font memory 970. The overflow (carrying out, $C_0$) bits produced by Y START adder 9615 and Y POSITION adder 9617 are routed over single bit leads 9618 and 9619, respectively, to appropriate inputs of pseudo-random number generator 956 for use in controlling its operation. In addition, the pseudo-random number generator also requires the value of the most significant bit (MSB) of the parameter $\Delta Y_{SLOW}$. As such, the value of this bit is routed from $\Delta Y_{SLOW}$ register 9605, via leads 9607 and 9609, to the pseudo-random number generator.

Figure 14:
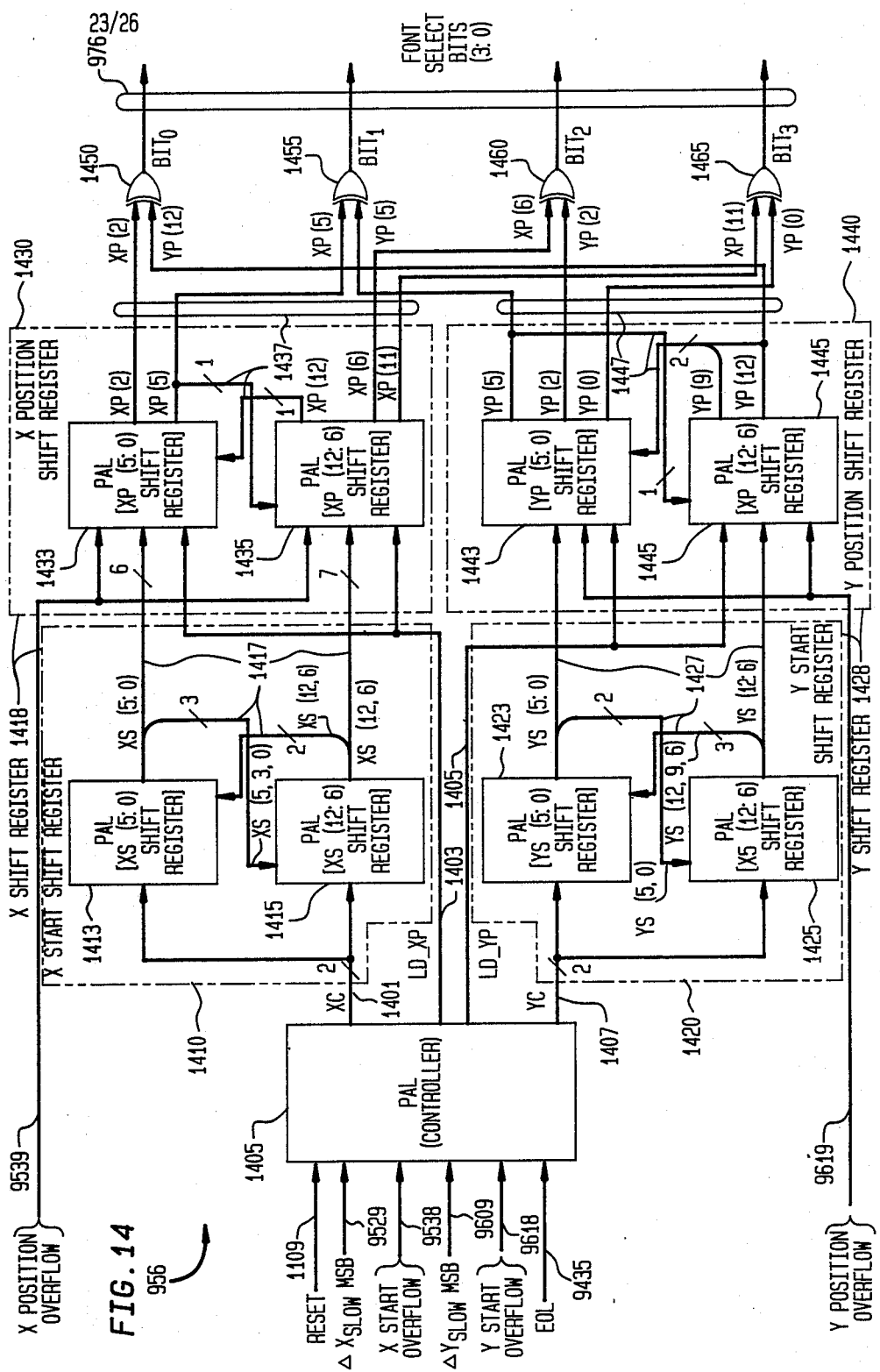
FIG. 14 depicts a block diagram of Pseudo-random Number Generator 956 shown in FIG. 11A–11G.

As noted above, excessively jagged halftone dot edges can be advantageously avoided by randomly varying the dot fonts that are used to write succesive halftone dots. This random dot font selection occurs, as disussed above, by providing a random four-bit number as a partial memory address to font memory 970. This number is used to select one of sixteen different memory planes, in which each plane stores a complete font in terms of eight bit threshold values. In particular, to provide this function, pseudo-random number generator 956 generates a four-bit random number as the FRONT SELECT bits on leads 976. Operation of the pseudo-random number generator, as discussed in detail below in conjunction with FIG. 14, is controlled by the X START, X POSITION, Y START and Y POSITION overflow bits appearing on leads 9538, 9539, 9618 and 9619, respectively; the most significant bits of parameters $\Delta X_{SLOW}$ and $\Delta Y_{SLOW}$ appearing on leads 9529 and 9609; the END OF LINE pulse appearing on lead 9435 and the reset pulse appearing on lead 1109. In operation, the pseudo-random number generator provides a four-bit random number for use in screening each different halftone dot. Once a random number is generator for any halftone dot, the random number generator provides the same random number while this entire dot is being written, thereby assuring that the same font is used to write this entire dot.

As noted previously, a 14 bit address is applied to font memory 970. This address consists of addresssses X ADDR and Y ADDR appearing on leads 972 and 974, respectively, which collectively form 10 bits of address and the four FONT SELECT bits appearing on leads 976 to form the remainder of the address. As discussed above, the FONT SELECT bits select a particular one of 16 different fonts (stored as separate memory planes) with X ADDR and Y ADDR values selecting a particular sampling point located within that font. Thus, as can be readily appreciated, a font is advantageously selected essentially independent of the selection of the particular sampling point located within that font.

To produce a screened micro pixel bit, the resulting eight bit threshold value produced by font memory 970 at its data output connection (DATA OUT) is applied, via leads 978, to the B input of threshold comparator 980. The current eight bit contone value appearing on leads 915 is routed to the other input, i.e. the A input, of this comparator. As discussed above, this comparator produces a thresholded bit having a value dependent upon whether the current controne value for the halftone dot that is presently being screened is greater than (input A>B), or less than or equal to the accessed threshold value. Inasmuch as the value of this thresholded bit forms part of the screened bit-mapped halftone dot that is to be printed by the marking engine, this bit is provided, via lead 37, to marking engine 30.

The access time provided by font memory 970 predominantly dictates the overall speed of screener 30. As shown, font memory 970 contains 16 separate memory planes. To advantageously decrease the access time of the font memory over that available from a particular type of memory circuit and/or technology used in implementing this memory, the font memory can alternatively be implemented with two or more identical sets of memory planes which are accessed on an interleaved basis with respect to each other. Specifically, if font memory 970 contained two identical sets of memory planes, then each set could receive every other successive set of a font selection address appearing on leads 976 and a simultaneously occurring pair of X ADDR and Y ADDR address values appearing on leads 972 and 974. In this manner, a memory technology that provides a 40 nsec (nanosecond) access time would with two fold interleaved operation permit the font memory to be successively addressed every 20 nsec and produce an accessed eight bit threshold value over leads 978 every 20 nsec wherein each of the two sets of memory planes would provide an accessed threshold value output value every 40 nsec with a 20 nsec stagger occurring between the output bits produced by both sets of memory planes. For even faster operation, three or more identical sets of memory planes can be operated on such an interleaved basis.

b. State Diagram of DMA Control PAL 914

FIGS. 12A and 12B depict simplified state diagrams that are implemented by DMA Controller PAL 914 shown in FIGS. 11A-11G and specifically to control contone line buffers 913. As discussed above, each one of FIFOs (RAM arrays) 9131 and 9135 (see FIGS. 11A-11G) which collectively form buffers 913 successively accepts each contone value in a macro raster, through a FIFO write operation, and then provides each value in that stored line through a FIFO read operation. While one FIFO undertakes a FIFO read operation, the other FIFO is performing a FIFO write operation. At the conclusion of screening each macro raster, the function of the individual FIFOs switches to implement "ping-pong" operation. DMA Controller PAL 914 controls the operation of hte individual FIFOs.

FIG. 12A shows the state diagram associated with controlling the filling of a FIFO with incoming contone values; while FIG. 12B shows the state diagram associated with controlling a FIFO swap operation, i.e. reversing the functions perfomed by the individual FIFOs. Inasmuch as both FIFOs accept data in the same fashion, FIG. 12A shows the state diagram associated with only one (the "ping" FIFO) of the FIFOs. Since an identical state diagram is implemented within this PAL for the other FIFO (the "pong" FIFO), its operation will not be discussed.

To understand FIG. 12A, assume for the moment that the ping FIFO has just been completely filled with an incoming line of contone data by the host computer. Once this occurs, this FIFO will be in state 1210. As such, the controller de-asserts the associated DMA request signal associated with this FIFO to prevent the host computer from writing any further data into this FIFO. As long as this FIFO remains full or its contents are being successively read out during processing of the associated line, the FIFO remains in state 1210 as indicated by line 1215. Once this line has been completely screened, as indicated by the occurrence of the V OVERFLOW, CELL CTR TC and U OVERFLOW signals all being high, the ping buffer needs to be filled with the next line of incoming contone values. As such, DMA Controller PAL 914 changes state, via line 1220, to state 1230. When this occurs, PAL 914 asserts the DMA Request signal associated with the ping FIFO in order to obtain new data. Upon receipt of this signal, the host computer will successively write each contone value in the next contone line into this FIFO. As long as this write operation is occurring, PAL 914 remains in state 1230 as indicated by line 1225. The host computer maintains a count of the number of contone values in a line and writes this number of values into the FIFO. As long as additional data remains to be written into the FIFO, the host compouter asserts the DMA Acknowledge signal associated with this FIFO. However, once the host computer has completed writing a line of contone values into the FIFO, the host computer de-asserts the DMA Acknowledge signal which, in turn, indicates that the FIFO is ready to be read. In this case, the state of PAL 914 returns, as indicated by line 1235, to state 1210 to await the beginning of a read operation, and so on.

After a line of contone values have been fully screened, the FIFOs reverse (swap) their functions. FIG. 12B shows the state diagram associated with controlling this operation. To understand this figure, assume for the moment that an odd line of contone data has just been screened. In this case, PAL 914 resides in state 1260 to instruct odd line FIFO 9135 (see FIGS. 11A–11G) to be the ping FIFO and even line FIFO 9131 to be the pong FIFO. To do this, PAL 914 asserts the RETRANSMIT ODD signal to reset an internal read pointer within odd line FIFO 9135 to the first location in preparation for successive FIFO read operations of the line of contone values stored therein. In addition, PAL 914 also asserts the READ ODD signal to instruct odd FIFO 9135 to perform FIFO read operations. Furthermore, PAL 914 sets the BANK SELECT signal to an appropriate level to instruct multiplexor 918 (see FIGS. 11A–11G) to route contone values produced by odd line FIFO 9135 through the remainder of the screener. Coincident with the occurrence of read operations undertaken by odd line FIFO 9135, appropriate control signals are produced by PAL 914 to instruct the host computer to successively write each contone value for the next line into the current pong FIFO, e.g. even line FIFO 9131. Now, as long as the screener has not completed screening all the contone values produced by odd line FIFO 9135, then any or more of the signals V OVERFLOW not, CELL CR TC not or U OVERFLOW not will be high. In this case, PAL 914, as shown in FIG. 12B, remains in state 1260, as indicated by line 1265. However, once a full line of contone values read from the current ping FIFO has been screened, as indicated by the occurrence of the V OVERFLOW and CELL CTR TC and U OVERFLOW singals all being high, then the FIFOs must switch their fuctions, i.e. the odd line FIFO must become the pong FIFO and the even line FIFO must become the ping FIFO. Consequently, at this point, the state of PAL 914 changes, as indicated by line 1270, from state 1260 to state 1280. As soon as this new state is entered, PAL 914 asserts the RETRANSMIT EVEN signal to reset an internal read pointer within even line FIFO 9131 to the first location in preparation for successive FIFO read operations of the line of contone values stored therein. In addition, PAL 914 also asserts the READ EVEN signal to instruct even FIFO 9131 to perform FIFO read operations. Furthermore, PAL 914 sets the BANK SELECT signal to an appropriate level to instruct multiplexor 918 (see FIGS. 11A–11G) to route contone values produced by the even line FIFO through the remainder of the screener. Coincident with the occurrence of read operations undertaken by even line FIFO 9131, appropriate control signals are produced by PAL 914 to instruct the host computer to successively write each contone value for the next line into the current pong FIFO, e.g. odd line FIFO 9135. Now, as long as the screener has not completed screening all the contone values produced by even line FIFO 9131, then any or more of the signals V OVERFLOW not, CELL CR TC not or U OVERFLOW not will be high. In this case, PAL 914, as shown in FIG. 12B, remains in state 1280, as indicated by line 1275. Once the full line of contone values read from the current ping FIFO has been screened, as indicated by the occurrence of the V OVERFLOW, CELL CTR TC and U OVERFLOW signals all being high, then the FIFOs must again switch their functions, i.e. the even line FIFO must become the pong FIFO and the odd line FIFO must become the ping FIFO. Consequently, at this point, the state of PAL 914 changes, as indicated by line 1285, from state 1280 back to state 1265 and so on.

In addition, whenever a high level HOLD signal is asserted on lead 9413 by Control Sequencer PAL 940, PAL 914 merely suspends its operation and remains in a suitable wait state until this singal is de-asserted at which point normal operation resumes. The states associated with the HOLD operation are not shown in FIGS. 12A and 12B in order to simplify these figures but would be readily apparent to anyone skilled in the art.

c. State Diagram of Control Sequencer PAL 940

A simplified state diagram implemented by Control sequencer PAL 940, shown in FIGS. 11A–11G, is collectively depicted in FIGS. 13A and 13B, for which the correct alignment of the drawing sheets for thesee figures is shown in FIG. 13. As discussed above, the Control Sequencer supervises the screening process by setting the V POSITION, X POSITION and Y POSITION registers to initial values at the initiation of a screening run and then appropriately incrementing these registers as screening progresses. Once an entire image has been screened, the Control Sequencer asserts a DONE signal on lead 9415 (see FIGS. 11A–11G) to so notify the host computer. Throughout the following discussion of the this state diagram, simultaneous reference should be made to FIGS. 11A–11G, 13A and 13B.

Specifically, as shown in FIGS. 13A and 13B, a screening run begins once the host computer asserts a high level SCREEN command signal and the marking engine indicates that it is ready to accept data from the screener. The high level SCREEN command appears on lead 1107. The marking engine indicates its readiness to print, i.e. accept data, by asserting a high level DATA REQUEST signal on a corresponding lead (not specifically shown) within protocol leads 33. Until both of these signals occur, Control Sequencer PAL 940 remains, as shown in FIGS. 13A and 13B, in wait state 1310, as indicated by line 1313. During this wait state, the host computer can load initial values into all twelve parameter registers in the manner discussed above. Once this parameter registers are fully loaded and an operator instructs the host computer to initiate a screening run, the host computer will then generate a high level SCREEN command signal and thereafter maintain this high level throughout the screening run. In the event that one or more of the most recently loaded parameter values are to be used for the next screening run, then the host computer will not re-load these specific values inasmuch as they will already exist within their appropriate parameter registers. In any event, once a high level SCREEN command signal and a high level DATA REQUEST signal are both asserted, PAL 940 changes from state 1310 to state 1320, as indicated by line 1316. In this state, PAL 940 generates appropriate control signals to initialize the values of V POSITION, U POSITION, X START, X POSITION, Y START and Y POSITION and to reset the pseudo-random number generator. Specifically, PAL 940 first applies appropriate pulses to the reset (R) inputs of Line Counter 9385, via LINE COUNTER RESET lead 9412, and Cell Counter 9365, via CELL CTR RESET lead 9410, to reset the contents of their respective internal counters to zero. Thereafter, PAL 940 applies appropriate pulse to the load inputs of these counters, via LINE COUNTER LOAD lead 9411 and CELL CTR LOAD lead 9405, to load the initial values held in NUM LINES register 9381 and NUM CELLS register 9361 into corresponding registers within these respective counters. Simultaneously therewith, PAL 940 applies appropraite pulses to the multiplexor select and load inputs of: V POSITION adder 9347, via V POSITION ADDER MUX SELECT lead 9401 and V POSITION ADDER LOAD lead 9403, respectively; X START adder 9535, via X START ADDER MUX SELECT lead 9417 and X START ADDER LOAD lead 9419; X POSITION adder 9537, via X POSITION ADDER MUX SELECT lead 9421 and X POSITION ADDER LOAD lead 9423; Y START adder 9615, via Y START ADDER MUX SELECT lead 9425 and Y START ADDER LOAD lead 9427; and Y POSITION adder 9617, via Y POSITION ADDER MUX SELECT LOAD lead 9429 and Y POSITION ADDER LOAD lead 9431, to route initial parameter values to the inputs of these adders. As a result, at the next clock pulse (illustratively time t=0), the contents of variables V POSITION, X START, X POSITION, Y START and Y POSITION are initialized to the values set forth by the following equations:

$$\text{V POSITION}_0 \leftarrow \text{V INIT} + \Delta V_{REF} \quad (8)$$

$$\text{X START}_0 \leftarrow \text{X INIT} + \alpha X_{SLOW} \quad (9)$$

$$\text{X POSITION}_0 \leftarrow \alpha X_{FAST} + \text{X START}_0 \leftarrow \Delta X_{FAST} \leftarrow + \text{X INIT} + \Delta X_{SLOW} \quad (10)$$

$$\text{Y START}_0 \leftarrow \text{Y INIT} + \Delta Y_{SLOW} \quad (11)$$

$$\text{Y POSITION}_0 \leftarrow \Delta Y_{FAST} + \text{Y START}_0 \leftarrow \Delta Y_{FAST} + \text{Y INIT} + \Delta Y_{SLOW} \quad (12)$$

Once all this initialization has occurred, PAL 940, at the next clock pulse, will apply a reset pulse over lead 1109 to reset the opertion of pseudo-random number generator 956.

After these operations have occurred, Control Sequencer PAL 940 changes from state 1320 to state 1330, as indicated by line 1325. While in state 1330, the current micro raster is screened. As long as this micro raster has not crossed into the next macro pixel or contone values remain to be screened in the current line, indicated by either the V OVERFLOW not or CELL CTR TC not signals being high, screening continues and PAL 940 remains in state 1330 as indicated by line 1333. In this state, the PAL produces appropriate control signals on V POSITION ADDER LOAD, X POSITION ADDER LOAD and Y POSITION ADDER LOAD leads 9403, 9423 and 9431, to repetitively load and increment V POSITION adder 9437, V POSITION adder 9537 and Y POSITION adder 9617 in order to successively increment (at time t=n+1) the V POSITION value by its corresponding increment, $\Delta V_{REF}$, and to successively increment the X POSITION and Y POSITION values by the fast scan increments, as shown by the following equations, until the end of the current micro raster is reached.

$$\text{X POSITION}_{n+1} \leftarrow \text{X POSITION}_n + \Delta X_{FAST} \quad (13)$$

$$\text{Y POSITION}_{n+1} \leftarrow \text{Y POSITION}_n + \Delta Y_{FAST} \quad (14)$$

$$\text{V POSITION}_{n+1} \leftarrow \text{V POSITION}_n + \Delta V_{REF} \quad (15)$$

Now, as soon as the current micro raster has been completely screened but additional macro rasters still remain to be screened as indicated by the V OVERFLOW and CELL CTR TC and LINE CTR TC not signals all being high, then Control Sequencer PAL 940 changes from state 1330 to state 1340, as indicated by line 1336.

In state 1340, PAL 940 sets the X POSITION and Y POSITION values to the new starting position for the next successive sampling line, generates a pluse as an END OF LINE (EOL) event for use by the pseudo-random number generator and then resets the value of V POSITION to its initial value, V INIT, in order the screen the next micro raster. Specifically, upon entry into state 1340, PAL 940 produces appropriate pulses to the load inputs of X START adder 9535, via X START ADDER LOAD lead 9419, and Y START adder 9615, via Y START ADDER LOAD lead 9427, in order to select the prior values of X START and Y START as a corresponding input to each of these respective adders and then to increment the X START and Y START values by the slow scan increments, as shown by the following equations. This sets the values of X START and Y START to the starting location, along the left boundary of the reference cell, of the next successive sampling line.

$$\text{X START}_t \leftarrow \text{X START}_{t-1} + \Delta X_{SLOW} \quad (16)$$

$$\text{Y START}_t \leftarrow \text{Y START}_{t-1} + \Delta Y_{SLOW} \quad (17)$$

Thereafter, at the occurrence of the next clock pluse (time t=t+1), PAL 940 produces a pulse as an END OF LINE event on lead 9435 for use by pseudo-random number generator 956. Thereafter, at the following clock pulse (t=t+2), PAL 940 produces appropriate pulses at the multiplexor select and load inputs of V POSITION adder 9347, via V POSITION ADDER MUX SELECT lead 9401 and V POSITION ADDER LOAD lead 9403; X POSITION adder 9537, via X POSITION ADDER MUX SELECT lead 9421 and X POSITION ADDER LOAD lead 9423; and Y POSI- TION adder 9617, via Y POSITION ADDER MUX SELECT lead 9429 and Y POSITION ADDER LOAD lead 9431, to set the current value of V POSITION equal to its initial value, V INIT, plus its corresponding increment, ΔVREF, and to set the values of X POSITION and Y POSITION equal to the sum of the new X START and Y START values and the fast scan increments thereby locating the first sampling point on this next successive sampling line, all as given by the following equations.

$$X\ POSITION_{t+2} \leftarrow X\ START_t + \Delta X_{FAST} \tag{18}$$

$$Y\ POSITION_{t+2} \leftarrow Y\ START_t + \Delta Y_{FAST} \tag{19}$$

$$V\ POSITION_{t+2} \leftarrow V\ INIT + \Delta V_{REF} \tag{20}$$

Once these operations have occurred, PAL 940 changes from state 1340 back to state 1330, as indicated by line 1345, in order to screen the next micro raster in the image.

Now, as soon as the last micro raster in the image has been screened, as indicated by the V OVERFLOW and CELL CTR TC and LINE TC signals all being high, the image has been completely screened. AS such, PAL 940 changes from state 1330 to state 1350, as indicated by line 1339. In state 1350, the Control Sequencer PAL asserts a high level DONE SIGNAL on lead 945. This signal, connected through host bus 70, informs host computer 40 that the current screening run is now complete. Once this signal is asserted, PAL 940 changes from state 1350 to wait state 1360, as indicated by line 1355. As long as the host computer maintains the SCREEN command signal appearing on lead 1107 high, PAL 940 remains in wait state 1360. The host computer will acknowledge completion of the current screening run by d-asserting the SCREEN command, i.e. taking the command low. Once this command is de-aserted, then PAL 940 changes from state 1360 back to 1310, as indicated by line 1366, to await the next assertion of the SCREEN command to initiate the next screening run, and so on.

In addition, whenever a high level is asserted on POWER ON (BUS) RESET lead 1109 by the host computer, PAL 940 is forced to assume a pre-defined initial state and, in turn, generate appropriate signal levels on leads 9339, 9349 and 9367 that similary force DMA Controller PAL 914 to assume a pre-defined initial state. Furthermore, whenever appropriate signals appear on protocol leads 33 indicating that the marking engine is temporarily unable to accept any more data, then Control Sequencer PAL 940 will temporarily suspend screening until such time as the marking engine is ready to resume printing. Specifically, in response to these signals on leads 33, PAL 940 will cease incrementing any of the adders and will also assert a high level onto HOLD signal lead 9413 to appropriately instruct DMA controller PAL 914 to temporarily suspend screening. PAL 940 will de-assert the high level HOLD signal to resume screening the current image as soon this PAL receives a high level DATA REQUEST signal, over leads 33, from the marking engine. The states associated with the RESET and HOLD operations are not shown in FIGS. 13A and 13B in order to simplify these figures but would be readily apparent to anyone skilled in the art.

d. Pseudo-random Number Generator 956

Operationally speaking, as discussed above, pseudo-random number generator 956 produces a four bit pseudo-random number for use in randomly selecting one of 16 available fonts for use in screening a halftone dot. Once such a selection is made for any halftone dot, the same selection is provided by the pseudo-random number generator for all micro pixels that collectively form this dot. To clearly understand the font selection function performed by the pseude-random number generator and its relationship to individual halftone dot cells, the discussion will first proceed to address the overall operation of the pseudo-random number generator as shown in FIG. 15 followed by a discussion of the block diagram of generation 956 shown in FIG. 14.

Figure 15:
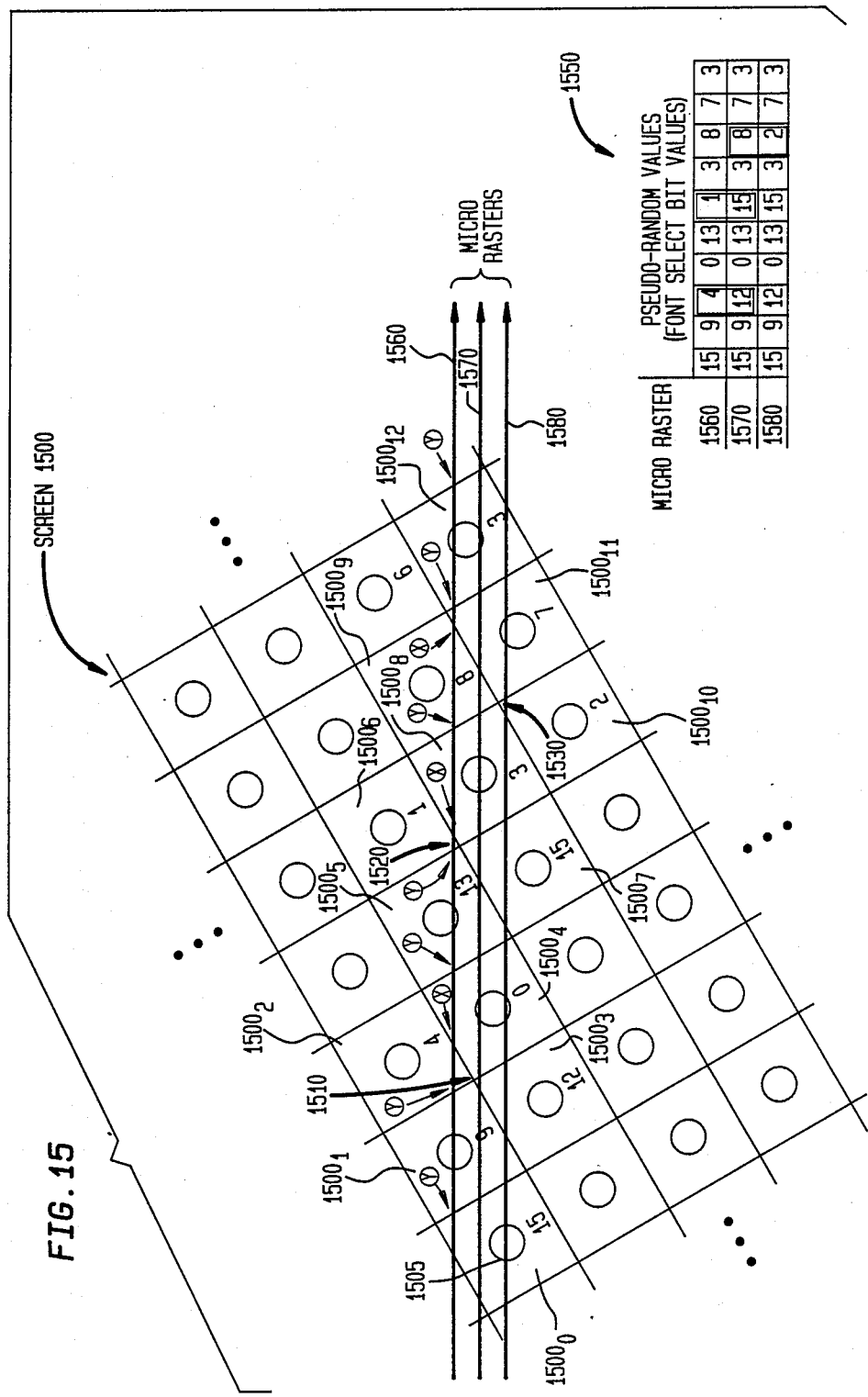
FIG. 15 shows three sequences of FONT SELECT bit values (random numbers) produced by pseudo-random number generator 956 shown in FIG. 14 with respect to halftone dot cells that are traversed by three successive corresponding micro rasters.

FIG. 15 which shows three sequences of FONT SELECT bit values (random numbers) produced by pseudo-random number generator 956 with respect to halftone dot cells that are traversed by three successive corresponding micro rasters. Assume that angled screen portion 1500 containing a regular pattern of halftone dots, such as dot 1505, is being written. Inasmuch as the operation of the pseudo-random noise generator is the same for every micro raster, only three exemplary micro raster and only the halftone dot cells traversed thereby will be considered. Hence, for illustrative purposes, consider three successively occurring micro rasters 1560, 1570 and 1580 that horizontally traverse across the screen. These micro rasters collectively traverse twelve halftone dot cells, specifically $1500_0$, $1500_1$, $1500_2$, ..., $1500_{11}$.

Pseudo-random number generator 956 detects when a current micro raster intersects with either a vertical or horizontal boundary of a halftone dot cell. Each intersection with a vertical boundary is called a Y event and is identified, illustratively for micro raster 1560, by a circled "Y". Similarly, each intersection with a horizontal boundary is called a X event and is identified, illustratively for micro raster 1560, by a circled "X". The pseudo-random number generator contains two groups of shift registers. One group shifts whenever a Y event occurs; while, the other shifts whenever an X event occurs. Each group produces a thirteen bit psesud-random value. Two bits are taken from each group to provide four pseudo-random bits. The shift register groups are implemented to shift as soon as any boundary, in either the vertical or horizontal direction, of a halftone dot cell is crossed for the first time and a generate a new four bit pseudo-random number, and then to retain and generate that same number whenever a successive micro raster crosses into the same halftone dot cell. In this fashion, only one random numbe is repetitively generated for each halftone dot cell regardless of which individual micro rasters subsequently traverse that cell. As shown, for halftone dot cells $1500_0$, $1500_1$, $1500_2$, $1500_3$, $1500_4$, $1500_5$, $1500_6$, $1500_7$, $1500_8$, $1500_9$, $1500_{10}$ and $1500_{11}$, the following illustrative pseudo-random numbers (in decimal form) are correspondingly produced by pseudo-random number generator 956: 15, 9, 4, 12, 0, 13, 1, 15, 3, 8, 12, 7, and 3. Inasmuch as a sequence of appropriate pseudo-random numbers is generated for each successive micro raster as it traverses halftone dot cell boundaries, the sequences of random numbers for micro raster 1560, 1570 and 1580 are shown in table 1550. As can be readily seen, the pseudo-random number generator repeats the same random number for those locations traversed by two successive micro rasters that lie within the same halftone dot cell. For example, the pseudo-random number 15 is generated for those locations on micro rasters 1560, 1570 and 1580 that lie within halftone dot cell 1500$_0$ and so on for the other halftone dot cells. As shown in table 1550, there are three instances, each shown within a box, where the random numbers change between successive micro rasters, i.e. specifically between numbers "4" and "12" and numbers "1" and "15" for micro rasters 1560 and 1570 and between numbers "8" and "2" on micro rasters 1570 and 1580. This change occurs because a micro raster traverses a halftone dot cell at or near its corner; while, the next successive micro raster crosses into an adjacent halftone dot cell located immediately therebelow. Specifically, for the change from pseudo random number "4" to number "12", micro raster 1560 is traversing halftone dot cell 1500$_2$ near corner 1510; while, in the same vicinity, during successively micro raster 1570, this latter micro raster will cross into halftone dot cell 1500$_3$. Similarly, in corner 1520, micro raster 1560 traverses halftone dot cell 1500$_6$; while the next successive micro raster, i.e. micro raster 1570, will in this vicinity cross into halftone dot cell 1500$_7$. Lastly, in corner 1530, micro raster 1570 traverses halftone dot cell 1500$_9$; while the next successive micro raster, i.e. micro raster 1580, will in this vicinity cross into halftone dot cell 1500$_{10}$. Now, since each pseudo-random value is used to select one of 16 different halftone font patterns, each of the halftone dots, e.g. those situated in halftone dot cells 1500$_0$, 1500$_1$, 1500$_2$, 1500$_3$, 1500$_4$, 1500$_5$, 1500$_6$, 1500$_7$, 1500$_8$, 1500$_9$, 1500$_{10}$ and 1500$_{11}$, will be written with a font pattern corresponding to the pseudo-random number that has been generated for this halftone dot cell, e.g. fonts 15, 9, 4, 12, 0, 13, 1, 15, 3, 8, 2, 7, and 3, respectively.

With the explanation of the overall operation of the pseudo-random number generator in mind, the discussion will now address the block diagram of pseudo-random number generator 956 which is collectively depicted in FIGS. 14.

As noted above, pseudo-random number generator 956 contains two independent shift register groups: X Shift Register 1418 and Y Shift Register 1428. Each of these shift registers is implemented with four separate PALs with a fifth PAL, specifically controller 1405, serving to provide overall control. Each PAL is implemented with a programmable array logic circuit that has been suitably programmed to implement predefined logical state transitions that relate the status of the signals applied to its various inputs to the desired signals to be produced at its outputs. The logical equations implemented within these PALs are provided below. Each shift register consists for two individual 13 bit shift registers: a start shift register and a position shift register. The X and Y Start shift registers hold an X Start value, XS, and Y Start value, YS, respectively. These values are initial shift values for the start of each micro raster. By saving these X and Y Start values for use by the current micro raster, each corresponding postion shift register can repeat as much of the pseudo-random number sequence for the prior micro raster, as needed. Given the X and Y Start values the X and Y Position shift registers produce X Position value, XP, and y Position value, YP, resepectively. As each successive horizontal or vertical halftone dot cell boundary is crossed by the current micro raster, either the corrsponding X Position shift register or Y Position shift register will be clocked, via and X Position Overflow pulse appearing on lead 9539 or a Y Position Overflow pulse appearing on lead 9619, respectively, to generate a new 13 bit pseudo-random position number. Four bits are selectively tapped from X Position register 1430 and are paired with four bits that are selectively tapped from Y Position register 1440. Each of the four pairs of bits is logically combined by an exclusive OR operation, specifically through exclusive OR gate 1450, 1455, 1460 or 1465, to yield four separate FONT SELECT bits on leads 976.

controller PAL 1405 provides appropriate control signals to each of the shift registers based upon the status of various input signals: an occurrence of a RESET pulse on lead 1109, the value of the $\Delta X_{SLOW}$ and $\Delta Y_{SLOW}$ most significant bits appearing on leads 9529 and 9609, the X START and Y START overflow bits appearing on leads 9538 and 9618 and an occurrence of a pluse appearing on lead 9435 as the END OF LINE event. In response to the status of these signals, Controller PAL 1405 produces various control signals: XC and YC which are each two bit signals to set the mode of X Start and Y Start shift registers 1410 and 1420, LD_XP which instructs the X Position shift register 1430 and to load in the contents held in the X Start register, and LD_YP which instructs the Y Position shift register 1440 and to load in the contents held in the Y Start register. The XC and YC control signals respectively contain bits XC$_1$ and XC$_2$, and YC$_1$ and YC$_2$. The XC and YC signals can each be set to the value "00" for a hold operation, "01" (e.g. for XC, XC$_1$=0 and XC$_2$=1; the same is true for YC) for a shift down operation, "10" for shift up operation and "11" for a load operation. In particular, Controller PAL 1405 implements the following logical equations, in which an apostrophe is used to indicate negation:

$$XC_0 = RESET + RESET'.\Delta X_{SLOW}(MSB).XS\_OVR'.EOL \quad (21)$$

$$XC_1 = RESET + RESET'.\Delta X_{SLOW}(MBS).XS\_OVR'.EOL \quad (22)$$

$$LD\_XP = XC_0 + XC_1 + EOL \quad (23)$$

$$YC_0 = RESET + RESET'.\Delta Y_{SLOW}(MSB).YS\_OVR'.EOL \quad (24)$$

$$YC_1 = RESET + RESET'.\Delta Y_{SLOW}'(MSB).YS\_OVR.EOL \quad (25)$$

$$LD\_YP = YC_0 + YC_1 + EOL \quad (26)$$

where:
RESET represents a high level on RESET lead 1109;
$\Delta X_{SLOW}(MSB)$ is the most significant bit of $\Delta X_{SLOW}$;
$\Delta Y_{SLOW}(MSB)$ is the most sinificant bit of $\Delta Y_{SLOW}$;
XS_OVR is the X START overflow bit appearing on lead 9538;
YS_OVR is the Y START overflow bit appearing on lead 9618; and
EOl represents a high level END OF LINE event (pulse) lead 9435.

Each of the start and position shift registers, through use of tapped feedback of selective shift locations to the input of the shift register, are configured to produce 8001 13-bit pseudo-random integer values before repeating. Due to the limited capacity of the PALs, two PALs are used to implement each of these shift registers. As shown, X Start Shift Register 1410 is formed of PAL 1413 for the lower six X Start bits, i.e. bits XS(5:0), and PAL 1415 for the upper seven X Start bits, i.e. bits XS(12:6). The thirteen bit value produced by PALs 1413 and 1415 appears on leads 1417. These leads route the entire value into PALs 1433 and 1435 of X Position Shift Register 1430 and also provide feedback of bits XS(5,3,0) from PAL 1413 to respective inputs of PAL 1415 and bits XS(12,6) from PAL 1415 to respective inputs of PAL 1413. Together PALs 1413 and 1415 implement the logical equations (27)–(29) below. In each of the following logical equations (27)–(36), individual bits are denoted by subscripts in order to enhance their readability and an apostrophe is used to indicate negation.

$$XS_0 = XC_1 \cdot XC_0 + XC_1 \cdot XC_0'\cdot(XS_2\cdot XS_{12}' + XS_2'\cdot XS_{12}) + XC_1'\cdot XC_0\cdot XS_1 + XC_1'\cdot XC_0'\cdot XS_0 \quad (27)$$

$$XS_k = XC_1\cdot XC_0'\cdot XS_{k-1} + XC_1'\cdot XC_0\cdot XS_{k+1} + XC_1'\cdot XC_0'\cdot XS_k \text{ (where } 1 \leq k \leq 11) \quad (28)$$

$$XS_{12} = XC_1\cdot XC_0'\cdot XS_{11} + XC_1\cdot XC_0\cdot(XS_0\cdot XS_3' + XS_0'\cdot XS_3) + XC_1'\cdot XC_0'\cdot XS_{12} \quad (29)$$

Similarly, Y Start Shift Register 1420 is formed of PAL 1423 for the lower six Y Start bits, i.e. bits YS(5:0), and PAL 1425 for the upper seven Y Start bits, i.e. bits YS(12:6). The thirteen bit value produced by PALs 1423 and 1425 appears on leads 1427. These leads route the entire value into PALs 1443 and 1445 of X Position Shift Register 1440 and also provide feedback of bits YS(5,0) from PAL 1423 to respective inputs of PAL 1425 and bits YS(12, 9, 6) from PAL 1425 to respective inputs of PAL 1423. Together PALs 1423 and 1425 implement the following logical equations:

$$YS_0 = YC_1\cdot YC_0 + YC_1\cdot YC_0'\cdot(YS_9\cdot YS_{12}' + YS_9'\cdot YS_{12}) + YC_1\cdot YC_6\cdot YS_1 + YC_1'\cdot YC_0'\cdot YS_0 \quad (30)$$

$$YS_k = YC_1\cdot YC_0'\cdot YS_{k-1} + YC_1'\cdot YC_0\cdot YS_{k+1} + YC_1'\cdot YC_0'\cdot YS_k \text{ (where } 1 \leq k \leq 11) \quad (31)$$

$$YS_{12} = YC_1\cdot YC_0'\cdot YS_{11} + YC_1'\cdot YC_0\cdot(YS_0\cdot YS_{10}' + YS_0'\cdot YS_{10}) + YC_1'\cdot YC_0'\cdot YS_{12} \quad (32)$$

X Position Shift Register 1430 is formed to PAL 1433 for the lower six X Position bits, i.e. bits XP(5:0), and PAL 1435 for the upper seven bits X Position bits, i.e. bits XP(12:6). Selected bits of the thirteen bit value produced by PALs 1433 and 1435 appear on leads 1437. These leads route bits XP(2,5,6,11) to one set of respective inputs of exclusive OR gates 1450, 1455, 1460 and 1465. In addition, these leads also provide feedback of bit XP(5) from PAL 1433 to a respective input of PAL 1435 and bit XP(12) from PAL 1435 to a respective input of PAL 1433. Together PALs 1433 and 1435 implement the following logical equations:

$$XP_0 = LD\_XP\cdot XS_0 + LD\_XP'\cdot(XP\_OVR\cdot(XP_2\cdot XP_{12}' + XP_2'\cdot XP_{12}) + XP\_OVR'\cdot XP_0) \quad (33)$$

$$XP_k = LD\_XP\cdot XS_k + LD_{13}\, XP'\cdot(XP\_OVR\cdot XP_{k+1} + XP\_OVR'\cdot XP_k) \text{ (where } 1 \leq k \leq 12) \quad (34)$$

where: XP_OVR is the X POSITION overflow bit appearing on lead 9539.

Lastly, Y POSITION Shift Register 1440 is formed of PAL 1443 for the lower six X Position bit, i.e. bits YP(5:0), and PAL 1445 for the upper seven bits Y Position bits, i.e. bits YP(12:6). Selected bits of the thirteen bit value produced by PALs 1443 and 1445 appear on leads 1447. These leads route bits YP(0,2,5,12) to the other set of respective inputs of exclusive OR gates 1450, 1455, 1460 and 1465. In addition, these leads also provide feedback of bit YP(5) from PAL 1443 to a respective input of PAL 1445 and bits YP(9,12) from PAL 1445 to respective inputs of PAL 1443. Together PALs 1443 and 1445 implement the following logical equations:

$$YP_0 = LD\_YP\cdot YS_0 + LD\_YP\cdot(YP\_OVR\cdot(YP_9\cdot YP_{12}' + YP_9'\cdot YP_{12}) + YP\_OVR'\cdot YP_0) \quad (35)$$

$$YP_k = LD\_YP\cdot YS_k + LD_{13}\, YP'\cdot(YP\_OVR\cdot YP_{k-1} + YP\_OVR'\cdot YP_k) \text{ (where } 1 \leq k \leq 12) \quad (36)$$

where: YP_OVR is the Y POSITION overflow bit appearing on lead 9619.

4. Font Selection Using Constrained Randomization

Figure 16:
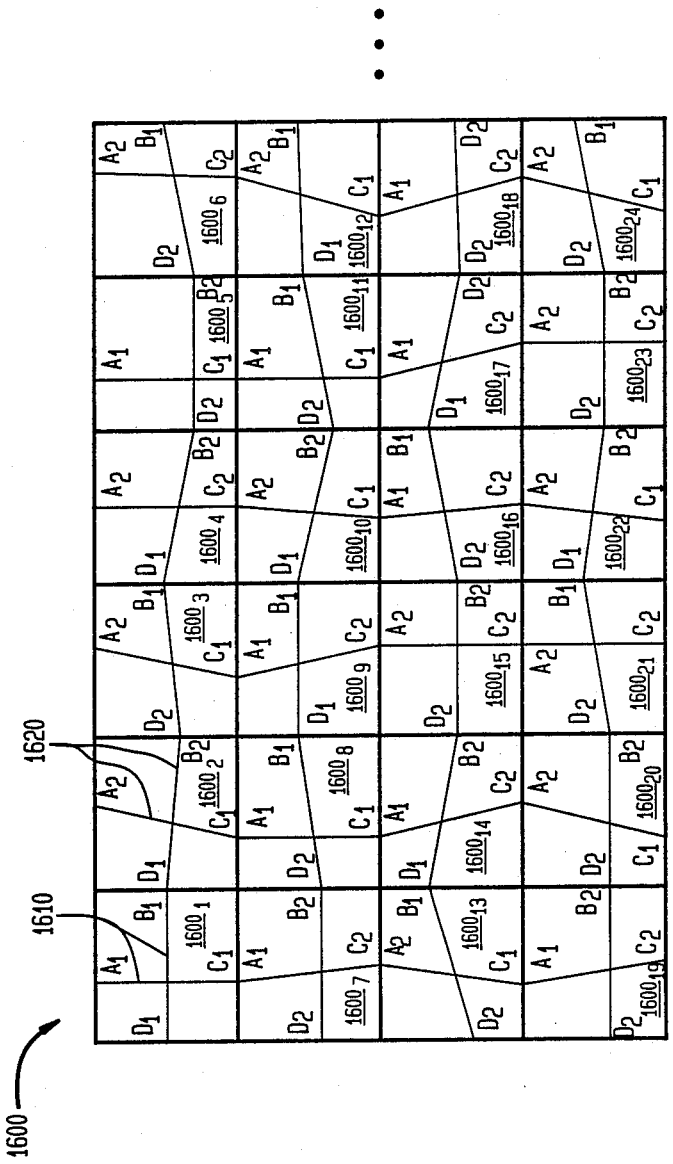
FIG. 16 graphically shows how constrained randomization is used to determine the location of the axes associated with each screened halftone dot cell in a screened image portion.

As an alternative to pseudo-random selection of halftone dot fonts as described above in which no correlation exists between the font chosen for a dot and that chosen for any of its neighbors, these fonts can also be selected through a method of constrained randomization in which a two-dimensional connectivity is defined between the dots. This alternate process is also quite effective in suppressing Moire patterns arising from periodicities in a stored halftone dot font description. FIG. 16 graphically illustrates this process for halftone dot cells existing within screened image portion 1600. Although experimental observations indicate that this method disadvantageously produces somewhat less visually appealing dots and injects some visual noise into the screened image than does the pseudo-random selection process described above, this method advantageously finds use with printers that require absolute connectivity between adjacent dots.

Sepcifically, screened image portion 1600 illustratively consists of an array of halftone dot cells $1600_1$, $1600_2$, ..., $1600_{24}$. One of the axes distorted fonts, as shown in FIG. 10A and described in conjunction therewith, is chosen to write the halftone dot in each cell. To simplify FIG. 16, only the axes and their associated end points, e.g. $A_1$, $B_1$, $C_1$ and $D_1$, are shown for each halftone cell. Given the orientation of the axes within each cell, the corresponding halftone dot font that would exist therein is provided in FIG. 10A.

Now, rather than permitting the end point of each of the two axes (horizontal and vertical) for any halftone cell to randomly vary between two values (between $A_1$ and $A_2$, and between $C_1$ and $C_2$ for the horizontal axis; and between $B_1$ and $B_2$, and between $D_1$ and $D_2$ for the vertical axis) as illustratively shown in FIG. 10A, in constrained randomization, as illustrated in FIG. 16, one end point of both the horizontal and vertical axes is fixed, at its last value in respectively a horizontally and vertically adjacent halftone cell, while the other point on both of the axes can randomly vary between two values.

In particular, the location of the right side end point ($B_1$ or $B_2$), here $B_1$, of the horizontal axis of a cell, e.g. cell $1600_1$, located immediately to the left of the current cell, e.g. cell $1600_2$, becomes the location of the left side end point ($D_1$ or $D_2$) e.g. here $D_1$, of the horizontal axis in the current halftone cell. The opposing end point located along the right side of the current cell is allowed to randomly take on one of two positions ($B_1$ or $B_2$), here $B_2$ in cell $1600_2$, and as such distort the position of the horizontal axis, such as within axes 1620 in cell $1600_2$. In a similar fashion, the location of the bottom end point ($C_1$ or $C_2$), here $C_1$, of the vertical axis of a cell, e.g. cell $1600_1$, located immediately above the current cell, e.g. cell $1600_7$, becomes the location of the top end point ($A_1$ or $A_2$), e.g. here $A_1$, of the vertical axis in the current halftone cell. The opposing end point located along the bottom of the current cell is allowed to randomly take on one of two positions ($C_1$ or $C_2$), here $C_2$ in cell $1600_7$, and as such distort the position of the vertical axis, such as within axes 1630 in cell $1600_7$, and so on for each of the other cells in the screened image portion. Arbitrary pseudo-random end points for either the horizontal or vertical axis are picked for the halftone cells that will be situated along the top row and leftmost column, respectively, in the screened image. The axes in the cells are distorted starting for the cell in the upper left hand corner, e.g. cell $1600_1$, and progresses to the cell in the lower right hand corner, e.g. cell $1600_{24}$, thereby defining a two-dimensional connectivity between the distorted axes in all the cells. As a result, the axes associated with each of the cells, such as axes 1610, 1620 and 1630 for cells $1600_1$, $1600_2$ and $1600_7$, and the corresponding fonts chosen to write a halftone dot in each cell will randomly vary in a constrained two-dimensional fashion as illustrated in FIG. 16 for screened image portion 1600.

This alternative method of halftone dot font selection using constrained radomization can be readily implemented by modifying the programming of the PALs in pseudo-random number generator 956, discussed above and shown in detail in FIG. 14, in a manner readily apparent to those skilled in the art in order to implement the needed functionality as described above.

5. Sheared Fonts

In lieu of using axes distortion to generate each different halftone dot font pattern, undistorted center weight halftone dots can be sheared through randomly selected directions to yield an array of distorted ("sheared") halftone dots. The shape of each distorted dot would form a common pattern for one of 16 different halftone dot fonts. With these fonts stored in memory, such as through appropriate bit-maps or multi-bit threshold values, a pre-defined font section method that provides suitable two-dimensional connectivity among all the screened halftone dots would then be used, during screening, to select the particular pattern that would be used to write any particular dot in a screened image. This method is also effective in suppressing Moire resulting from periodicities in the stored font descriptions. Experimental observations indicate that this metod does impart some visual noise into the screened image and for the reason it is not now preferred to the pseudo-random selection method described above.

In particular, to understand shearing in general, first consider isolated halftone dot cell 1700 shown in FIG. 17A that contains halftone dot 1710. This dot has four degrees of freedom each having two possible values, i.e. corners 1701 and 1705 of this cell can be moved up or down as indicated by corresponding arrows 1711 and 1715, and corners 1701 and 1708 of the same cell can be moved left or right as indicated by corresponding arrows 1721 and 1725. As such, each halftone dot can be sheared in 16 different directions. Once one or more corners of the dot have been moved, typically by a pre-defined incremental amount, such as illustratively the height or width of one or more micro rasters, the shape of the resulting distorted dot, that has been elongated or compressed along the shear direction(s), defines the shape of one of the 16 distorted halftone dot font patterns.

Now, as shown in FIG. 17B, to generate an array of differently sheared halftone dots, shear directions are randomly chosen for each vertical and horizontal boundary of an array, such as array 1730, of identical center weighted halftone dots, e.g. halftone dots $1730_1$, $1730_2$, ..., $1730_9$. To generate 16 different fonts a 4-by-4 array of identical halftone dot cells would be used; however to simlify this figure and reduce its size only a 3-by-3 array of these cells is depicted. As shown, successive vertical boundaries are sheared in the directions collectively indicated by arrows 1735 and individually indicated by arrows $1735_1$, $1735_2$, $1735_3$ and $1735_4$. Similarly, successive horizontal boundaries in this array are sheared in the directions collectively indicated by arrows 1740 and individually indicated by arrows $1740_1$, $7140_2$, $1740_3$ and $1740_4$. As such, each corner of the cells, such as corners 1733 and 1738, have components of motion in the directions shown by the arrows emanating therefrom.

As a result of shearing array 1730 of identical undistorted center weighted halftone dots in the directions shown in FIG. 17B, this array becomes distorted into sheared array 1750 of sheared halftone dots, as shown in FIG. 17C. This array contains sheared halftone dots $1750_1$, $1750_2$, ..., $1750_9$ that correspond to center weighted dots $1730_1$, $1730_2$, ..., $1730_9$ shown in FIG. 17B. As stated above, the shape of each individually sheared halftone dot in this array, such as illustratively halftone dot $1750_1$, forms a common pattern for a corresponding distorted halftone dot font. As such, sixteen differently sheared halftone dots, formed by shearing a 4-by-4 matrix, define the shapes of sixteen individual halftone dot fonts.

To assure that the sheared dots are written without any gaps in the screened image, two-dimensional connectively, such as that occurring in array 1750, would need to be provided among adjacent shearch halftone dot cells that form within the screened image. Specifically, the fonts must be chosen, with appropriate FONT SELECT bit values, such that this connectivity occurs throughout the screened image. Moreover, the same sheared font pattern would be used in writing an entire halftone cell. As such, the pseudo-random number generator, as occurs above, would need to select fonts that provide two-dimensional connectivity and also provide the same FONT SELECT bits for all of those micro pixel locations traversed by successive micro rasters that lie within the same halftone dot cell. Thus, to implement these functions, the programming of the PALs that form pseudo-random number generator 956, discussed above and shown in detail in FIG. 14, would therefore need to be appropriately modified, from that described in detail above, in a manner, after reading the foregoing description, that is readily apparent to those skilled in the art.

By now it should be evident to one skilled in the art that screener 30 achieves a high throughput by the use of highly efficient pipelined operation. The throughput can be increased by increasing the degree of parallel processing. Specifically, screener 30 can be duplicated with one screener writing the micro pixels situated at odd locations along a micro raster and the other screener writing the micro pixels situated at even locations on the micro raster. Inasmuch as both screeners would be writing portions of the same halftone dot, then both screeners would need to select the same halftone dot font. In this case, both screeners could share a common pseudo-random number generator. With this arrangement, both screeners could feed a common writing head in the marking engine. In this case, the screeners would operate in an interleaved fashion to approximately double the overall throughput with certain values stored in teh parameter registers set during initialization to provide increments that have twice their respective values for a single screener implementation. Alternatively, each of the two interleaved screeners could drive a separate marking head in the same writing engine. In this case, staggered writing heads, that are contained in a common assembly that moves across the image but are offset to the writing direction by the relative amount of skew occurring between the screeners, could be used. Nearly any geometry of multiple writing heads can be accommodated by appropriately varying certain of the values that will be stored in the parameter registers during initialization. Alternatively, one screener could process the contone values situated at even locations on an incoming line while the other screener processes the contone values situated at odd locations along that line, with the resulting bit streams being sent to different staggered writing heads in a common assembly. Since, with this alternative arrangement, both screeners would not write portions of the same halftone dot, then preferably both screeners would randomly select halftone dot fonts independently of each other for use in writing corresponding halftone dots. With these examples in mind, other forms of parallel processing can be easily devised by those skilled in the art. In any case, the degree of parallel processing needed in any particular implementation will be primarily dictated by the type of memory circuitry used to implement the font memories, the number of marking heads that is available on the marking engine and the desired overall throughput of screened images.

Furthermore, although the inventive screener has been described as using eight bit contone data with correspondingly 256 different halftone dot sizes, the inventive screener can be easily modified by, inter alia, appropriately changing the size of the registers and data paths to handle contone values having a different number of bits, e.g. 12 or 16 bits that correspondingly produce 4096 or 65,536 different halftone dot sizes.

Clearly, one skilled in the art will also recognize that the inventive method of randomly selecting among several hafltone dot fonts to avoid writing excessively jagged halftone dots, is applicable to any apllication, not just screening, where a quantized halftone dot font pattern, stored either in bit-mapped form or as an array of threshold values, is being sampled to generate a halftone dot by a marking engine.

Although various embodiments of the present invention on have been shown and described in detail herein, many other varied embodiments that incorporate the teachings of the present invention may be easily constructed by those skilled in the art.

INDUSTRIAL APPLICABILITY AND ADVANTAGES

The present invention is useful in electronic screeners and particularly those destined for use in electronic image processing systems. In particular, use of the invention in such a screener advantageously produces relatively smooth halftone dots and suppresses a substantial amount of screener induced Moire in a halftoned image thereby providing such an image that more closely replicates an original artwork than that heretofore possible with electronic screeners known in the art. As such, an electronic image processing system that utilizes such a screener is particularly suited for use in graphic arts applications and specifically in a graphic arts production environment.

I claim:

1. In a system for generating a raster based writing pattern for use in producing a visual depiction of a stored halftone dot pattern within an image, wherein said visual depiction will be formed of separate pixels having a pre-defined spacing occurring therebetween, apparatus for suppressing a Moire pattern occurring in said image, said apparatus comprising:

means for storing a plurality of different halftone dot fonts, wherein each one of said fonts contains a halftone dot pattern that varies from a corresponding pattern contained in every other one of said fonts;

means for generating a coordinate position of a desired location within any of said fonts residing in said storing means;

means for generating a substantially random value as font selection bits and for applying said font selection bits and said coordinate position to said storing means as adress to select only a corresponding one of said fonts for use in forming a depiction of an entire halftone dot as part of an image and to access a value from said storing means and stored at said location within said corresponding font; and means, operative in response to said accessed value, for generating a bit that forms a part of a raster based writing pattern that forms said depiction of said entire halftone dot.

2. The apparatus in claim 1 wherein said generating and applying means comprises:

a pseudo-random number generator for providing said font selection bits; and means for maintaining the value of said font selection bits at the same value in order to select only said corresponding one of said fonts while all pixels contained within the depiction of said entire halftone dot are being produced by said system.

3. The apparatus in claim 2 wherein said generating and applying means further comprises means for generating said random number as a number having a predefined constrained random variation so as to provide two dimensional connectivity between adjacent depictions of successively located halftone dots that form said image.

4. The apparatus in claim 3 wherein each one of said different halftone dot font patterns is formed by either axes distortion or shearing.

5. The apparatus in claim 4 wherein each of said halftone dot fonts is formed of a array of multi-bit threshold values or a plurality of separate bit-maps.

6. The apparatus in claim 5 wherein said storing means comprises a separate memory plane to store each separate one of said halftone dot fonts.

7. The apparatus in claim 5 wherein said bit generating means comprises means for comparing said accessed value against a corresponding incoming continuous tone value in order to yield a single output bit having a state dependent upon whether the continuous tone value exceeds the accessed value.

8. The apparatus in claim 7 wherein sid storing means comprises a separate memory plane to store each separate one of said halftone dot fonts.

9. The apparatus in claim 8 wherein said storing means contains 16 different halftone dot fonts and said font selection bits contains four bits.

10. In a system for generating a raster based writing pattern for use in producing a visual depiction of a stored halftone dot pattern within an image, wherein said visual depiction will be formed of separate pixels having a pre-defined spacing occurring therebetween, apparatus for suppressing a Moire pattern occurring in said image, said apparatus comprising:
    means for storing a plurality of different halftone dot fonts, wherein each one of said fonts contains a halftone dot pattern that varies from a corresponding pattern contained in every other one of said fonts;
    means for generating a coordinate position of a desired location within any of said fonts residing in said storing means;
    means for generating a substantially random value as font selection bits and for applying said font selection bits and said coordinate position to said storing means as and address to select only a corresponding one of said fonts for use in forming a depiction of an entire halftone dot as part of an image and to access a value from said storing means and stored at said location within said corresponding font, wherein said generating and applying means comprises:
        a pseudo-random number generator for providing said font selection bits; and
        means for maintaining the value of said font selection bits at the same value in order to select only said corresponding one of said fonts while all pixels contained within the depiction of said entire halftone dot are being produced by said system; and
    means, operative in response to said accessed value, for generating a bit that forms a part of a raster based writing pattern that forms said depiction of said entire halftone dot.

11. The apparatus in claim 10 wherein said generating and applying means further comprises: means for generating said random number as a number having a pre-defined constrained random variation so as to provide two dimensional connectivity between adjacent depictions of successively located halftone dots that form said image.

12. The apparatus in claim 11 wherein each one of said different halftone dot font patterns is formed by either axes distortion or shearing.

13. The apparatus in claim 12 wherein each of said halftone dot fonts is formed of an array of multi-bit threshold values and said bit generating means comprises means for comparing said accessed value against a corresponding incoming continuous tone value in order to yield a single output bit having a state dependent upon whether the continuous tone value exceeds the accessed value.

14. The apparatus in claim 13 wherein said storing means comprises a separate memory plane to store each separate one of said halftone dot fonts.

15. In a system for generating a raster based writing pattern for use in producing a visual depiction of a stored halftone dot pattern within an image, wherein aid visual depiction will be formed of separate pixels having a pre-defined spacing occurring therebetween, a method for suppressing a Moire pattern occurring in said image, said method comprising steps of:
    storing a plurality of different halftone dot fonts in a memory, wherein each one of said fonts contains a halftone dot pattern that varies from a corresponding pattern contained in every other one of said fonts;
    generating a coordinate position of a desired location within any of said fonts residing in said memory;
    generating a substantially random value as font selection bits;
    applying said font selection bits and said coordinate position to said memory as an address to select only a corresponding one of said fonts for use in forming a depiction of an entire halftone dot as part of an image;
    accessing, in response to said address, a value from said memory and stored at said location within said corresponding font; and
    generating, in response to said accessed value, a bit that forms a part of a raster based writing pattern that forms said depiction of said entire halftone dot.

16. The method in claim 15 wherein the substantially random value generating step comprises the steps of:
    providing a pseudo-random number as said font selection bits; and
    maintaining the value of said font selection bits at the same value in order to select only said corresponding one of said fonts while all pixels contained within the depiction of said entire halftone dot are being produced by said system.

17. The method in claim 16 wherein said substantially random value generating step further comprises the step of generating said random number as a number having a pre-defined constrained random variation so as to provide two dimensional connectivity between adjacent depictions of successively located halftone dots that form said image.

18. The method in claim 17 further comprises the step of forming each one of said different halftone dot font patterns by either axes distortion or shearing.

19. The method in claim 18 wherein the storing step further comprises the step of storing each separate one of said halftone dot fonts in a separate memory plane within said memory.

20. The method in claim 19 wherein the storing step further comprises the step of forming each of halftone dot font patterns by an array of multi-bit threshold values.

21. The method in claim 20 wherein said bit generating step further comprises the step of comparing said accessed value against a corresponding incoming continuous tone value in order to yield a single output bit having a state dependent upon whether the continuous tone value exceeds the accessed value.

* * * * *